US 11,580,088 B2

(12) United States Patent
Novak et al.

(10) Patent No.: US 11,580,088 B2
(45) Date of Patent: Feb. 14, 2023

(54) CREATION, MANAGEMENT, AND TRANSFER OF INTERACTION REPRESENTATION SETS

(71) Applicant: Microsoft Technology Licensing, LLC, Redmond, WA (US)

(72) Inventors: Michael J. Novak, Redmond, WA (US); Brian R. Meyers, Issaquah, WA (US); Anshul Rawat, Kirkland, WA (US); Valerie L. Wang, Bellevue, WA (US); John C. Whytock, Portland, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/824,865

(22) Filed: Nov. 28, 2017

(65) Prior Publication Data
US 2019/0050440 A1 Feb. 14, 2019

Related U.S. Application Data

(60) Provisional application No. 62/544,625, filed on Aug. 11, 2017.

(51) Int. Cl.
*G06F 3/0482* (2013.01)
*G06F 16/23* (2019.01)
(Continued)

(52) U.S. Cl.
CPC .......... *G06F 16/235* (2019.01); *G06F 3/0482* (2013.01); *G06F 11/3438* (2013.01);
(Continued)

(58) Field of Classification Search
CPC .......... G06F 16/9535; G06F 2201/865; G06F 9/542; G06F 11/3438; G06F 16/44;
(Continued)

(56) References Cited

U.S. PATENT DOCUMENTS 5,463,774 A 10/1995 Jenness
5,943,496 A 8/1999 Li et al.
(Continued)

FOREIGN PATENT DOCUMENTS

CN 1599432 A 3/2005
CN 101401401 A 4/2009
(Continued)

OTHER PUBLICATIONS

"Add rich card attachments to messages," retrieved from https://docs.microsoft.com/en-us/bot-framework/nodejs/bot-builder-nodejs-send-rich-cards, on or before Nov. 2017, 8 pages.
(Continued)

*Primary Examiner* — Yuk Ting Choi
(74) *Attorney, Agent, or Firm* — NovoTechIP International PLLC

(57) ABSTRACT

Technologies are described for generating, acquiring, transferring, and manipulating sets of interaction representations, where an interaction representation represents user interaction with content on a computer device, typically using a software application. The set can be represented as an interaction representation. To facilitate set creation, including adding items to a set, a request can be sent to an application to provide an interaction representation, such as an interaction representation of a current state of user-content interaction associated with the software application. Sets can be associated with different types, where the set type can determine whether, and what types, of interaction representations can be added to a set. Sets can be associated with expiration events, where the interaction representation for the set, and in some cases the component interaction representations, can be deleted upon the occurrence of the expiration event. In some cases, a set can be designated not to expire.

21 Claims, 16 Drawing Sheets

(51) Int. Cl.
*G06F 11/34* (2006.01)
*G06Q 10/10* (2012.01)
*G06F 16/9038* (2019.01)

(52) U.S. Cl.
CPC ......... *G06F 16/9038* (2019.01); *G06Q 10/10* (2013.01); *G06Q 10/103* (2013.01)

(58) Field of Classification Search
CPC ........ G06F 9/451; G06F 3/067; G06F 16/148; G06F 16/90335; G06F 3/0662; G06F 16/583; G06F 16/683; G06N 20/00; G06N 3/08; G06N 5/022; G06N 5/02; G06N 5/025
See application file for complete search history.

(56) References Cited

U.S. PATENT DOCUMENTS

| | | |
|---|---|---|
| 6,018,743 A | 1/2000 | Xu |
| 6,044,374 A | 3/2000 | Nesamoney et al. |
| 6,085,205 A | 7/2000 | Peairs et al. |
| 6,085,247 A | 7/2000 | Parsons et al. |
| 6,093,216 A | 7/2000 | Adl-Tabatabai et al. |
| 6,253,252 B1 | 6/2001 | Schofield |
| 6,697,877 B1 | 2/2004 | Martin et al. |
| 6,772,216 B1 | 8/2004 | Ankireddipally et al. |
| 6,826,760 B1 | 11/2004 | Hunt et al. |
| 6,957,395 B1 | 10/2005 | Jobs et al. |
| 6,993,723 B1 | 1/2006 | Danielsen et al. |
| 7,051,042 B2 | 5/2006 | Krishnaprasad et al. |
| 7,802,205 B2 | 9/2010 | Bedingfield |
| 7,970,240 B1 | 6/2011 | Chao et al. |
| 3,020,111 A1 | 9/2011 | Horvitz et al. |
| 8,037,046 B2 | 10/2011 | Udezue et al. |
| 8,065,732 B1 | 11/2011 | Ward et al. |
| 8,364,514 B2 | 1/2013 | Macbeth et al. |
| 8,612,435 B2 | 12/2013 | Sambrani et al. |
| 8,782,218 B1 | 7/2014 | Graham et al. |
| 8,789,014 B2 | 7/2014 | Robison et al. |
| 9,054,919 B2 | 6/2015 | Kiang et al. |
| 9,100,337 B1 | 8/2015 | Battre et al. |
| 9,125,015 B2 | 9/2015 | Pennanen et al. |
| 9,191,355 B2 | 11/2015 | Yerli |
| 9,230,027 B2 | 1/2016 | Greene |
| 9,288,175 B2 | 3/2016 | Eisenberg et al. |
| 9,317,390 B2 | 4/2016 | Chisa et al. |
| 9,342,209 B1 | 5/2016 | Hwang et al. |
| 9,363,634 B1 | 6/2016 | Kirmse et al. |
| 9,720,888 B1 | 8/2017 | Jain et al. |
| 9,779,063 B1 | 10/2017 | Dykema |
| 9,824,363 B1 | 11/2017 | Wang et al. |
| 10,025,702 B1 | 7/2018 | Karppanen |
| 10,467,230 B2 | 11/2019 | Alphin, III et al. |
| 10,671,245 B2 | 6/2020 | Alphin, III et al. |
| 10,693,748 B2 | 6/2020 | Doggett et al. |
| 10,732,796 B2 | 8/2020 | Alphin, III et al. |
| 10,853,220 B2 | 12/2020 | Doggett et al. |
| 2002/0174134 A1 | 11/2002 | Goykhman |
| 2002/0184507 A1 | 12/2002 | Makower et al. |
| 2004/0103426 A1 | 5/2004 | Ludvig et al. |
| 2004/0133848 A1 | 7/2004 | Hunt et al. |
| 2004/0193616 A1 | 9/2004 | Pharies et al. |
| 2004/0220946 A1 | 11/2004 | Krishnaprasad et al. |
| 2005/0044089 A1 | 2/2005 | Wu et al. |
| 2005/0102675 A1* | 5/2005 | Parkyn ................. G06F 9/5038 718/102 |
| 2005/0234986 A1 | 10/2005 | Terek et al. |
| 2005/0235206 A1 | 10/2005 | Arend et al. |
| 2006/0004705 A1 | 1/2006 | Horvitz et al. |
| 2006/0036935 A1 | 2/2006 | Warner et al. |
| 2006/0074732 A1 | 4/2006 | Shukla et al. |
| 2006/0155723 A1 | 7/2006 | Kumar et al. |
| 2006/0190440 A1 | 8/2006 | Horvitz et al. |
| 2006/0224583 A1 | 10/2006 | Fikes et al. |
| 2007/0016553 A1 | 1/2007 | Dumais et al. |
| 2007/0143123 A1 | 6/2007 | Goldberg et al. |
| 2007/0211871 A1 | 9/2007 | Sjolander et al. |
| 2007/0297590 A1 | 12/2007 | Macbeth et al. |
| 2007/0299631 A1 | 12/2007 | Macbeth et al. |
| 2007/0299795 A1 | 12/2007 | Macbeth et al. |
| 2007/0299796 A1 | 12/2007 | Macbeth et al. |
| 2007/0300174 A1 | 12/2007 | Macbeth et al. |
| 2008/0046218 A1 | 2/2008 | Dontcheva et al. |
| 2008/0049714 A1 | 2/2008 | Commarford et al. |
| 2008/0127108 A1 | 5/2008 | Ivanov et al. |
| 2008/0127109 A1 | 5/2008 | Simeon |
| 2008/0133287 A1 | 6/2008 | Slattery |
| 2008/0276179 A1 | 11/2008 | Borenstein et al. |
| 2008/0295003 A1 | 11/2008 | Behl |
| 2008/0300055 A1 | 12/2008 | Lutnick et al. |
| 2008/0313227 A1 | 12/2008 | Shafton et al. |
| 2009/0043646 A1 | 2/2009 | Pingali et al. |
| 2009/0150423 A1 | 6/2009 | Spanton et al. |
| 2009/0172101 A1 | 7/2009 | Arthursson |
| 2009/0228427 A1 | 3/2009 | Friesenhahn et al. |
| 2009/0241048 A1 | 9/2009 | Augustine et al. |
| 2009/0313304 A1* | 12/2009 | Goodger ............... G06F 16/986 707/608 |
| 2009/0319472 A1 | 12/2009 | Jain et al. |
| 2010/0058172 A1 | 3/2010 | Soldan et al. |
| 2010/0162225 A1 | 6/2010 | Huang et al. |
| 2010/0235306 A1 | 9/2010 | Wagoner |
| 2010/0235829 A1 | 9/2010 | Shukla et al. |
| 2010/0250322 A1 | 9/2010 | Norwood |
| 2011/0040990 A1 | 2/2011 | Chan et al. |
| 2011/0126050 A1 | 5/2011 | Begole et al. |
| 2011/0173525 A1 | 7/2011 | Mukhopadhyay et al. |
| 2011/0289117 A1 | 11/2011 | Agrawal et al. |
| 2012/0084248 A1 | 4/2012 | Gavrilescu |
| 2012/0109801 A1* | 5/2012 | Clark, Jr. ............... G06Q 40/00 705/35 |
| 2012/0110511 A1 | 5/2012 | Howard |
| 2012/0143923 A1 | 6/2012 | Whitney et al. |
| 2012/0144416 A1 | 6/2012 | Wetzer et al. |
| 2012/0159515 A1 | 6/2012 | Calderon et al. |
| 2012/0159564 A1 | 6/2012 | Spektor et al. |
| 2012/0174120 A1* | 7/2012 | Malkiman ........... G06F 11/3419 719/313 |
| 2012/0246344 A1 | 9/2012 | Vargas et al. |
| 2012/0246551 A1 | 9/2012 | Patton et al. |
| 2012/0254100 A1 | 10/2012 | Grokop et al. |
| 2012/0271867 A1 | 10/2012 | Grossman et al. |
| 2012/0272230 A1 | 10/2012 | Lee |
| 2012/0311447 A1 | 12/2012 | Chisa et al. |
| 2012/0331408 A1 | 12/2012 | Ainslie et al. |
| 2013/0013560 A1 | 1/2013 | Goldberg et al. |
| 2013/0013642 A1 | 1/2013 | Klein et al. |
| 2013/0013689 A1 | 1/2013 | Crawford |
| 2013/0067346 A1 | 3/2013 | Rosenstein et al. |
| 2013/0073389 A1 | 3/2013 | Heath |
| 2013/0080266 A1 | 3/2013 | Molyneux et al. |
| 2013/0086214 A1 | 4/2013 | Jung et al. |
| 2013/0103699 A1 | 4/2013 | Perantatos et al. |
| 2013/0110623 A1 | 5/2013 | Kilroy et al. |
| 2013/0110894 A1 | 5/2013 | Beaverson et al. |
| 2013/0139113 A1 | 5/2013 | Choudhary et al. |
| 2013/0219065 A1 | 8/2013 | Chor |
| 2013/0262439 A1 | 10/2013 | Hao et al. |
| 2013/0263289 A1 | 10/2013 | Vijayan et al. |
| 2013/0275509 A1 | 10/2013 | Micucci et al. |
| 2013/0275994 A1 | 10/2013 | Uola et al. |
| 2013/0346482 A1 | 12/2013 | Holmes |
| 2013/0347078 A1 | 12/2013 | Agarwal et al. |
| 2014/0012574 A1 | 1/2014 | Pasupalak et al. |
| 2014/0033291 A1 | 1/2014 | Liu |
| 2014/0068443 A1 | 3/2014 | Eng et al. |
| 2014/0089512 A1 | 3/2014 | Zhao et al. |
| 2014/0095624 A1 | 4/2014 | Quan |
| 2014/0098127 A1 | 4/2014 | Fein et al. |
| 2014/0099937 A1* | 4/2014 | Fukuzato ............... H04W 4/00 455/420 |
| 2014/0108585 A1 | 4/2014 | Barton et al. |
| 2014/0122697 A1 | 5/2014 | Liu et al. |
| 2014/0162793 A1 | 6/2014 | Quan et al. |

(56) References Cited

U.S. PATENT DOCUMENTS

| | | | |
|---|---|---|---|
| 2014/0207730 A1* | 7/2014 | Spataro | G06F 16/93 707/608 |
| 2014/0207962 A1 | 7/2014 | Makofsky | |
| 2014/0229391 A1 | 8/2014 | East et al. | |
| 2014/0229462 A1 | 8/2014 | Lo | |
| 2014/0325070 A1 | 10/2014 | Philip et al. | |
| 2014/0337339 A1 | 11/2014 | Li | |
| 2015/0004998 A1 | 1/2015 | Pennanen et al. | |
| 2015/0074407 A1 | 3/2015 | Palmeri et al. | |
| 2015/0081633 A1 | 3/2015 | Su et al. | |
| 2015/0128162 A1 | 5/2015 | Ionescu | |
| 2015/0163530 A1 | 6/2015 | Bayer et al. | |
| 2015/0235258 A1 | 8/2015 | Shah et al. | |
| 2015/0235275 A1 | 8/2015 | Shah et al. | |
| 2015/0256423 A1 | 9/2015 | Stearns | |
| 2015/0268811 A1* | 9/2015 | Min | G06F 3/0488 715/765 |
| 2015/0286694 A1 | 10/2015 | Kaplinger et al. | |
| 2015/0294634 A1 | 10/2015 | Jung et al. | |
| 2015/0339374 A1 | 11/2015 | Smarr et al. | |
| 2015/0350106 A1 | 12/2015 | Whalley et al. | |
| 2015/0365453 A1 | 12/2015 | Cheng | |
| 2015/0370765 A1 | 12/2015 | Kim et al. | |
| 2016/0026611 A1 | 1/2016 | Liu et al. | |
| 2016/0048418 A1* | 2/2016 | Le | H04W 4/50 714/37 |
| 2016/0092107 A1 | 3/2016 | Bruner et al. | |
| 2016/0110313 A1 | 4/2016 | Prakash et al. | |
| 2016/0162370 A1 | 6/2016 | Mehta et al. | |
| 2016/0239896 A1 | 8/2016 | Chay | |
| 2016/0261709 A1 | 9/2016 | Sacks et al. | |
| 2016/0294916 A1 | 10/2016 | Daher et al. | |
| 2016/0296798 A1 | 10/2016 | Balakrishnan et al. | |
| 2016/0302166 A1 | 10/2016 | Dang et al. | |
| 2016/0352846 A9 | 12/2016 | Gauglitz et al. | |
| 2017/0017638 A1 | 1/2017 | Satyavarta et al. | |
| 2017/0094635 A1 | 3/2017 | Liu | |
| 2017/0169403 A1 | 6/2017 | Zhang | |
| 2017/0222865 A1 | 8/2017 | Koorapati et al. | |
| 2017/0293893 A1* | 10/2017 | Pierce | G06Q 10/1095 707/608 |
| 2017/0336960 A1 | 11/2017 | Chaudhri et al. | |
| 2018/0248820 A1* | 8/2018 | Milyakov | G06F 16/23 714/37 |
| 2018/0309804 A1 | 10/2018 | Nagy et al. | |
| 2019/0020673 A1 | 1/2019 | Weinstein et al. | |
| 2019/0050378 A1 | 2/2019 | Novak et al. | |

FOREIGN PATENT DOCUMENTS

| | | |
|---|---|---|
| CN | 102087615 A | 6/2011 |
| CN | 103155604 A | 6/2013 |
| CN | 103348693 A | 10/2013 |
| CN | 104301203 A | 1/2015 |
| CN | 105324754 A | 2/2016 |
| CN | 105718267 A | 6/2016 |
| EP | 1155366 | 11/2001 |
| EP | 2608472 | 6/2013 |
| EP | 2851857 | 3/2015 |
| WO | WO 2005/072191 | 8/2005 |
| WO | 2008021478 A2 | 2/2008 |
| WO | WO 2013192564 | 12/2013 |
| WO | WO 2014102698 | 7/2014 |

OTHER PUBLICATIONS

"Applet", retrieved from https://en.wikipedia.org/wiki/Applet, on or before Nov. 2017, 4 pages.

"Class Object," retrieved from https://docs.oracle.com/javase/7/docs/api/java/lang/Object.html, Published on: 1993, 9 pages.

"Comparison of data serialization formats", retrieved from https://en.wikipedia.org/wiki/Comparison_of_data_serialization_formats, on or before Nov. 2017, 11 pages.

Dalorzo, Edwin, "Java Optional Objects," retrieved from https://dzone.com/articles/java-optional-objects, Published on: Apr. 17, 2013, 11 pages.

"DataPackage Class", retrieved from https://docs.microsoft.com/en-us/uwp/api/windows.applicationmodel.datatransfer.datapackage, on or before Nov. 2017, 19 pages.

"DataPackagePropertySet Class", retrieved from https://docs.microsoft.com/en-us/uwp/api/windows.applicationmodel.datatransfer.datapackagepropertyset, on or before Nov. 2017, 16 pages.

"Document file format", retrieved from https://en.wikipedia.org/wiki/Document_file_format, on or before Nov. 2017, 3 pages.

Finley, K., "Software Containers Are Bringing the Tech Giants Together", retrieved from https://www.wired.com/2015/06/software-containers-bringing-tech-giants-together/, on or before Nov. 2017, 3 pages.

Hogg, S., "Software Containers: Used More Frequently than Most Realize", retrieved from https://www.networkworld.com/article/2226996/cisco-subnet/software-containers--used-more-frequently-than-most-realize.html, on or before Nov. 2017, 4 pages.

Horvitz, et al., "Learning Predictive Models of Memory Landmarks," Proceedings of the Annual Meeting of the Cognitive Science Society, vol. 26, Jan. 2004, 7 pages.

"How to: Add Data to the Clipboard", retrieved from https://docs.microsoft.com/en-us/dotnet/framework/winforms/advanced/how-to-add-data-to-the-clipboard, on or before Nov. 2017, 5 pages.

"HRESULT", retrieved from https://en.wikipedia.org/wiki/HRESULT, on or before Nov. 2017, 3 pages.

"HString Class", retrieved from https://msdn.microsoft.com/en-us/library/hh771141.aspx, on or before Nov. 2017, 3 pages.

"In Java, are static class members shared among programs?" retrieved from https://stackoverflow.com/questions/686079/in-java-are-static-class-members-shared-among-programs, on or before Jun. 28, 2017, 3 pages.

"JavaScript Tutorial—Adding JavaScript to a page", retrieved from http://www.howtocreate.co.uk/tutorials/javascript/incorporate, on or before Nov. 2017, 5 pages.

"JSON", retrieved from https://en.wikipedia.org/wiki/JSON, on or before Nov. 2017, 13 pages.

Kapitza, et al., "Platform-Independent Object Migration in CORBA," Proceedings of the Confederated International Conference on the Move to Meaningful Internet System, pp. 900-917, 2005, 18 pages.

Lardinois, F., "WTF is a container?", retrieved from https://techcrunch.com/2016/10/16/wtf-is-a-container/, on or before Nov. 2017, 6 pages.

"Movie", retrieved from http://schema.org/Movie, on or before Nov. 2017, 10 pages.

"Observing The Activity Of A Device", https://doc.nexthink.com/Documentation/Nexthink/V5.0/UserManual/Observingtheactivityofadevice, Retrieved on: Dec. 8, 2016, 4 pages.

"OEmbed", retrieved from https://oembed.com/, on or before Nov. 2017, 22 pages.

"Organization of Schemas" retrieved from http://schema.org/docs/schemas.html, on or before Nov. 2017, 2 pages.

"Out attribute", retrieved from https://msdn.microsoft.com/en-us/library/windows/desktop/aa367136(v=vs.85).aspx, on or before Nov. 2017, 3 pages.

Paul, Ian, "Top 15 Cloud Storage Tips and Tasks," http://www.pcworld.com/article/255072/top_15_cloud_storage_tips_and_tasks.html, Published on: May 6, 2012, 4 pages.

"Propget attribute", retrieved from https://msdn.microsoft.com/en-us/library/windows/desktop/aa367145(v=vs.85).aspx, on or before Nov. 2017, 2 pages.

"Retval attribute", retrieved from https://msdn.microsoft.com/en-us/library/windows/desktop/aa367158(v=vs.85).aspx, on or before Nov. 2017, 2 pages.

"Serialization", retrieved from https://en.wikipedia.org/wiki/Serialization, on or before Nov. 2017, 9 pages.

"Standard Clipboard Formats", retrieved from https://msdn.microsoft.com/en-us/library/windows/desktop/ff729168(v=vs.85).aspx, on or before Nov. 2017, 5 pages.

"StandardDataFormats Class", retrieved from https://docs.microsoft.com/en-us/uwp/api/windows.applicationmodel.datatransfer.

(56) References Cited

OTHER PUBLICATIONS standarddataformats#Windows_ApplicationModel_DataTransfer_StandardDataFormats_Texthttps://css-tricks.com/dom/, on or before Nov. 2017, 12 pages.
Strassner, T., "XML vs JSON", retrieved from http://www.cs.tufts.edu/comp/150IDS/final_papers/tstras01.1/FinalReport/FinalReport.html, on or before Nov. 2017, 6 pages.
"Uniform Resource Identifier," retrieved from https://en.wikipedia.org/wiki/Uniform_Resource_Identifier, on or before Nov. 2017, 9 pages.
"XML", retrieved from https://en.wikipedia.org/wiki/XML, on or before Nov. 2017, 15 pages.
Wolff, Franck, "JSON-R: A JSON Extension That Deals With Object References (Circular And Others)," retrieved from https://dzone.com/articles/json-r-json-extension-deals, on or before Jul. 26, 2013, 6 pages.
"Learn How People Use Your App—An App Analytics Tools Round-Up", Retrieved from http://web.archive.org/web/20170427042015/https://www.apptamin.com/blog/app-analytics-tools/, Retrieved on Apr. 27, 2017, 26 Pages.
"Metadata", Retrieved from https://en.wikipedia.org/wiki/Metadata, Retrieved on Jul. 31, 2018, 15 Pages.
"Tracking the Same Person across Different Devices with Google Analytic", Retrieved from http://www.seerinteractive.com/blog/real-cross-device-management!, May 8, 2014, 9 Pages.
"Non Final Office Action Issued in U.S. Appl. No. 15/825,904", dated Aug. 9, 2018, 42 Pages.
Chen, et al., "Inferring Human Activity in Mobile Devices by Computing Multiple Contexts.", In Journal of Sensors, vol. 15, Issue 9, Aug. 28, 2015, 20 Pages.
Kapusta, Stephen, "Google AdWords Cross-Device Reporting & Attribution", Retrieved from https://www.lunametrics.com/blog/2016/11/08/google-adwords-cross-device-reporting-attribution/, Nov. 8, 2016, 7 Pages.
"International Search Report and Written Opinion Issued in PCT Application No. PCT/US2018/023672", dated Jun. 6, 2018, 13 Pages.
"International Search Report and Written Opinion Issued in PCT Application No. PCT/US18/025775", dated Jul. 9, 2018, 12 Pages.
"International Search Report and Written Opinion Issued in PCT Application No. PCT/US18/025776", dated Jul. 3, 2018, 10 Pages.
"International Search Report and Written Opinion Issued in PCT Application No. PCT/US2018/018575", dated Apr. 17, 2018, 11 Pages.
"International Search Report & Written Opinion Issued in PCT Application No. PCT/US2018/038386", dated Sep. 5, 2018, 13 Pages.
International Search Report & Written Opinion Issued in PCT Application No. PCT/US2018/038389, dated Sep. 5, 2018, 12 Pages.
"Non Final Office Action Issued in U.S. Appl. No. 15/590,858", dated Dec. 31, 2018, 15 Pages.
"Non Final Office Action Issued in U.S. Appl. No. 15/590,895", dated Nov. 1, 2018, 9 Pages.
"Non Final Office Action Issued In U.S. Appl. No. 15/590,858", dated Sep. 24, 2019, 19 Pages.
"Non Final Office Action Issued in U.S. Appl. No. 15/662,057", dated Feb. 26, 2019, 49 Pages.
"Final Office Action Issued in U.S. Appl. No. 15/825,904", dated Feb. 21, 2019, 62 Pages.
"Final Office Action Issued in U.S. Appl. No. 15/590,895", dated May 13, 2019, 8 Pages.
"International Search Report and Written Opinion Issued in PCT Application No. PCT/US18/023673", dated May 18, 2018, 12 Pages.
"What is ActivTrak? : What Customers Say", Retrieved from https://web.archive.org/web/20170324061743/https://activtrak.com/faq, Mar. 24, 2017, 10 Pages.
Frank, et al., "A Hybrid Preference Learning and Context Refinement Architecture", In Proceedings of Workshop on Intelligent Pervasive Environments, Apr. 9, 2009, 7 Pages.
"Final Office Action Issued In U.S. Appl. No. 15/590,858", dated Jun. 5, 2019, 18 pages.
Toyama, et al., "Geographic Location Tags on Digital Images", In Proceedings of the Eleventh ACM International Conference on Multimedia, Nov. 2, 2003, pp. 156-166.
"Non Final Office Action Issued in U.S. Appl. No. 15/661,981", dated Sep. 6, 2019, 21 Pages.
"Final Office Action Issued in U.S. Appl. No. 15/662,057", dated Jul. 18, 2019, 59 Pages.
Cao, et al., "Image Annotation Within the Context of Personal Photo Collections Using Hierarchical Event and Scene Models", In Proceedings of the IEEE Transactions on Multimedia, vol. 11, No. 2, Feb. 2009, pp. 208-219.
Gemmell, et al., "MylifeBits: A Personal Database for Everything", Microsoft Bay Area Research Center, MSRR-TR 2006-23, Feb. 20, 2006, pp. 1-18.
Mills, et al., "Managing Photos with AT&T Shoebox", In Proceedings of the 23rd Annual International ACM SIGIR Conference on Research and Development in Information Retrieval, Jul. 24, 2000, p. 390.
"Non Final Office Action Issued in U.S. Appl. No. 15/825,904", dated Oct. 25, 2019, 32 Pages.
"Notice of Allowance issued in U.S. Appl. No. 15/590,858", dated Feb. 13, 2020, 8 Pages.
"Final Office Action Issued in U.S. Appl. No. 15/825,904", dated Apr. 24, 2020, 34 Pages.
"Final Office Action Issued in U.S. Appl. No. 15/825,904", dated Apr. 2, 2021, 47 Pages.
"Office Action Issued in European Patent Application No. 18743620.9", dated Apr. 16, 2021, 6 Pages.
"Office Action Issued in European Patent Application No. 18743621.7", dated Apr. 21, 2021, 6 Pages.
"First Office Action and Search Report Issued in Chinese Patent Application No. 201880024505.8", dated Aug. 4, 2021, 16 Pages.
"Second Office Action and Search Report Issued in Chinese Patent Application No. 201880024505.8", dated Feb. 23, 2022, 11 Pages.
"Notice of Allowance Issued in European Patent Application No. 18722777.2", dated Jun. 22, 2022, 8 Pages.
"Notice of Allowance Issued in Chinese Patent Application No. 201880024505.8", dated Jun. 20, 2022, 4 Pages.
"Office Action Issued in European Patent Application No. 18722777.2", dated Jul. 5, 2021, 6 Pages.
"Non Final Office Action Issued in U.S. Appl. No. 15/825,904", dated Aug. 19, 2020, 38 Pages.
"Summons to Attend Oral Proceedings Issued in European Patent Application No. 18743620.9", Mailed Date: Oct. 4, 2021, 6 Pages.
"Summons to Attend Oral Proceedings Issued in European Patent Application No. 18743621.7", Mailed Date: Oct. 1, 2021, 6 Pages.
"Non Final Office Action Issued in U.S. Appl. No. 15/825,904", dated Sep. 30, 2022, 22 Pages.
"Summons to Attend Oral Proceedings Issued in European Patent Application No. 18743620.9", dated Oct. 4, 2021, 6 Pages.
"Summons to Attend Oral Proceedings Issued in European Patent Application No. 18743621.7", dated Oct. 4, 2021, 6 Pages.
"Office Action and Search Report Issued in Chinese Patent Application No. 201880022925.2", dated Aug. 25, 2022, 23 Pages.
"Notice of Allowance Issued in European Patent Application No. 18722777.2", dated Dec. 8, 2022, 2 Pages.
"Notice of Allowance Issued in European Patent Application No. 18722777.2", dated Oct. 20, 2022, 8 Pages.

* cited by examiner

| 348 | |
|---|---|
| HistoryID | 349 |
| Type | 350 |
| ActivityReferenced | 352 |
| EventPeriod | 354 |
| ActiveTime | 356 |
| ReportingSource | 358 |
| DeviceID | 360 |
| DisplayText | 362 |
| ReportTime | 364 |
| LocalRelevance | 366 |
| NavigationalMnemonicIDs | 368 |

| 372 | |
|---|---|
| NavigationalMnemonicID | 374 |
| ReportingSource | 376 |
| Time | 378 |
| NavigationalMnemonicType | 380 |
| AssociatedTasks | 382 |
| AssociatedActivities | 384 |
| AssociatedHistoryRecords | 386 |
| AscNavigationalMnemonics | 388 |
| ActivationTarget | 390 |
| Properties | 392 |
| DisplayText | 394 |
| Image | 396 |

| 300 | |
|---|---|
| TaskID | 302 |
| ActivityIDs | 304 |
| DisplayText | 306 |
| Image | 308 |
| GlobalRelevance | 310 |
| NavigationalMnemonicIDs | 312 |
| CollaboratorIDs | 314 |
| SchemaID | 316 |

| 318 | |
|---|---|
| ActivityID | 320 |
| AppActivityID | 322 |
| ActivationTarget | 324 |
| ContentTarget | 326 |
| DisplayText | 328 |
| Image | 330 |
| Properties | 332 |
| ContentType | 334 |
| ApplicationID | 336 |
| AppDisplayName | 338 |
| AppIcon | 340 |
| GlobalRelevance | 342 |
| NavigationalMnemonicIDs | 344 |
| CollaboratorIDs | 346 |

FIG. 3

```
{
    "type": "ObectReference",
    "Visuals":
    {
        "displayText":"Lorem Ipsum",
        "description":"Lorem Ipsum",
        "imageIcon":"http://www.xyz.com/foobar.jpg",
        "adaptiveContent": {
                "type": "AdaptiveCard","body": [{"type": "Container","speak": "Lorem Ipsum","items":
[{"type": "TextBlock","text": "Lorem Ipsum","weight": "bolder","size": "medium"},{"type": "ColumnSet","columns":
[{"type": "Column","size": "auto","items": [{"type": "Image","url": "http://connectorsdemo.azurewebsites.net/images/
MSC12_Oscar_002.jpg","size": "small","style": "person"}]},{"type": "Column","size": "stretch","items": [{"type":
"TextBlock","text": "Miguel Garcia","wrap": true},{"type": "TextBlock","separation": "none","text": "Created
{{DATE(2017-02-14T06:08:39Z,Long)}} {{TIME(2017-02-14T06:08:39Z)}}","isSubtle": true,"wrap": true}]}]}]},{"type":
"Container","items": [{"type": "TextBlock","text": "Lorem Ipsum","speak": "","wrap": true},{"type": "FactSet","speak":
"Lorem Ipsum","facts": [{"title": "Board:","value": "Adaptive Card"},{"title": "List:","value": "Lorem Ipsum"},{"title": "Lorem
Ipsum","value": "Lorem Ipsum"},{"title": "Lorem Ipsum","value": "Lorem Ipsum"}]}],"actions": [{"type":
"Action.ShowCard","title": "Lorem Ipsum","card": {"type": "AdaptiveCard","body": [{"type": "Input.Text","style":
"date","id": "dueDate","title": "Select due date"}],"actions": [{"type": "Action.Http","method": "POST","title": "OK","url":
"http://xyz.com?dueDate={{dueDate}}"}]}},{"type": "Action.ShowCard","title": "Comment","card": {"type":
"AdaptiveCard","body": [{"type": "Input.Text","id": "comment","isMultiline": true,"title": "Enter your
comment"}],"actions": [{"type": "Action.Http","method": "POST","title": "OK","url": "http://xyz.com","headers": {"content-
type": "application/json"},"body": "{ 'comment' : '{{comment}}' }"}]}},{"type": "Action.OpenUrl","title": "View","url":
"http://foo.com"}]}]
        }
    },
    "activation": {
        "activationUri":"http://www.fakerssreader.com/article?id=12345",
        "fallbackUri":"http://www.fakerssreader.com/article?id=12345",
        "contentUri":"http://www.fakerssreader.com/article?id=12345",
        "appId":{
            "packageFamilyName": "Facebook.FacebookBeta_8xx8rvfyw5nnt",
            "androidPackage": "com.facebook.katana",
            "iOSappId": "12345",
            "microsoftAppId": "db2a3fd5-f3b8-43a3-a98f-34ae4e4dfd96"
        }
    },
    "metadata": {
        "contentMetadata":{
            "@context":"http://schema.org",
            "@type":"Article",
            "author":"John Doe",
            "name":"How to Tie a Reef Knot"
        }
    }
}
```

FIG. 5

CREATION, MANAGEMENT, AND TRANSFER OF INTERACTION REPRESENTATION SETS

CROSS REFERENCE TO RELATED APPLICATION

This application claims the benefit of, and incorporates by reference, U.S. Provisional Patent Application No. 62/544,625, filed Aug. 11, 2017.

BACKGROUND

Computer devices are becoming ever more ubiquitous, and more and more of people's day-to-day activities involve computer devices. During the course of a day, a user may carry out many activities using one or more computer devices—such as watching videos, listening to music, browsing the web, using a chat or communication program, working on a document or presentation, or playing a game, among others. Over time, a user may wish to resume or revisit an activity they previously engaged in. However, it may be difficult for a user to remember all of the details necessary to resume that activity.

In many cases, a user may be concurrently carrying out multiple activities using even a single computer device. Increasingly, people desire and need to carry out activities involving, and between, multiple computer devices. For example, a user may work on a single task, or multiple interrelated tasks, such as a work project, using multiple different computer devices, such as a smartphone, work desktop computer, laptop computer, and home desktop computer. A user may start watching an entertainment program or playing a game on their laptop computer, but may wish to continue watching or playing on their smartphone or tablet computer at a later time. A user may start researching a topic on the web at work on their desktop computer, and continue their research on a smartphone or tablet computer during their commute home.

As computer devices are used for a larger number of tasks, and become more integrated into people's lives, it can become challenging for a user to track their activities and associated content. For example, a user may wish to access a web page the user browsed two days earlier, but may not remember the address of the web page, or how they found it, or even which browser or device there were using to view the page. A user may have been listening to a song on their computer device, or watching a video, but may no longer remember the title of the song or video. A user may have been working on a document, but may no longer remember where that document was stored, or how to access it again.

In some cases, a computer device, such as an individual application running on the computer device or an operating system of the computer device, may provide some limited functionality for a user to try and trace their activity. For example, an operating system component may allow the user to view a list of recently created or modified files. A web browser may allow a user to access a history of web pages visited by the user. However, such functionality is typically limited to a single application or domain.

However, at least certain information regarding activities, such as files opened by a user, but not modified by the user, may not be available to the user. Even when information is available, the specific information in which the user is interested may be intermixed with voluminous amounts of other information. For instance, the address of a web page a user wants to find may be intermixed with information for scores of other web pages the user visited on a particular day. If the user cannot remember the particular day they visited the web page, the task becomes even more challenging and frustrating.

Commonly, users engage in multiple activities with one or more computer devices in order to accomplish a particular task. For a work project, a user may carry out activities using a web browser, a word processor, a spreadsheet program, and a presentation authoring program, among others. Many of these activities may be carried out concurrently. Thus, in order to resume work on a project, a user may need to resume a prior state of multiple different activities, compounding the problems noted above. In addition, the use of multiple applications to carry out tasks can complicate trying to engage in the task on different computer devices.

For instance, to continue work on a task that the user originally engaged in on a desktop computer on a laptop computer, a user may have to manually find the relevant files, transfer them from the desktop computer, open each application, and then return to the point where they left off working for each application—such as a particular slide of a presentation, or page of a document, the user was creating or editing. This scenario further assumes that the relevant applications are already installed on the laptop computer. Thus, room for improvement remains for tracking a user's tasks and activities on one or more computer devices, making the information easily and intelligently accessible to the user, and allowing a user to easily resume a task or activity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for generating, acquiring, transferring, and manipulating sets of interaction representations, where an interaction representation represents user interaction with content on a computer device, typically using a software application. To facilitate the creation of sets, including adding items to a set, a request can be sent to an application to provide an interaction representation, such as an interaction representation of a current state of user-content interaction associated with the software application. Sets can be associated with different types, where the set type can determine whether, and what types, of interaction representations can be added to a set. Sets can be associated with expiration events, where the interaction representation for the set, and in some cases the component interaction representations, can be deleted upon the occurrence of the expiration event. In some cases, a set can be designated not to expire.

According to an embodiment, a computer device is provided that includes a processing unit and memory. The computer device is coded to perform operations for requesting an interaction representation from a first software application for use in creating an interaction representation for a set of interaction representations. A first request is received to create a first interaction representation associated with a first software application. A second request is sent to the first software application. The second request is for at least a second interaction representation, which can represent a current user-content interaction associated with the first software application. The at least a second interaction representation is received. The at least a second interaction representation includes an identifier for the at least a second interaction representation, an identifier of the first software application, and an identifier of content. The identifier of the at least a second interaction representation is stored in the first interaction representation.

In another embodiment, a method is provided for creating an interaction representation for a set of interaction representations, the set is associated with a type, where the type can determine what interaction representations can be added to the set. A request is received to create a first interaction representation of a set having at least a second interaction representation. A type associated with the first interaction representation is determined. The first interaction representation is created with an indicator of the type.

In a further embodiment, a method is provided for creating an interaction representation for a set of interaction representations, the set associated with an expiration event. A first interaction representation of a set of interaction representations is created that references at least a second interaction representation. The first interaction representation is associated with an expiration event. It is determined that the expiration event has occurred. The first interaction representation is deleted.

The present disclosure also includes computing systems and computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 3 is a diagram illustrating data that can be included in task records, activity records, and history records, summarizing user actions on one or more computer devices, and in navigational mnemonic records.

FIG. 5 presents an example serialized interaction representation in JSON format.

DETAILED DESCRIPTION

Overview

Figure 1:
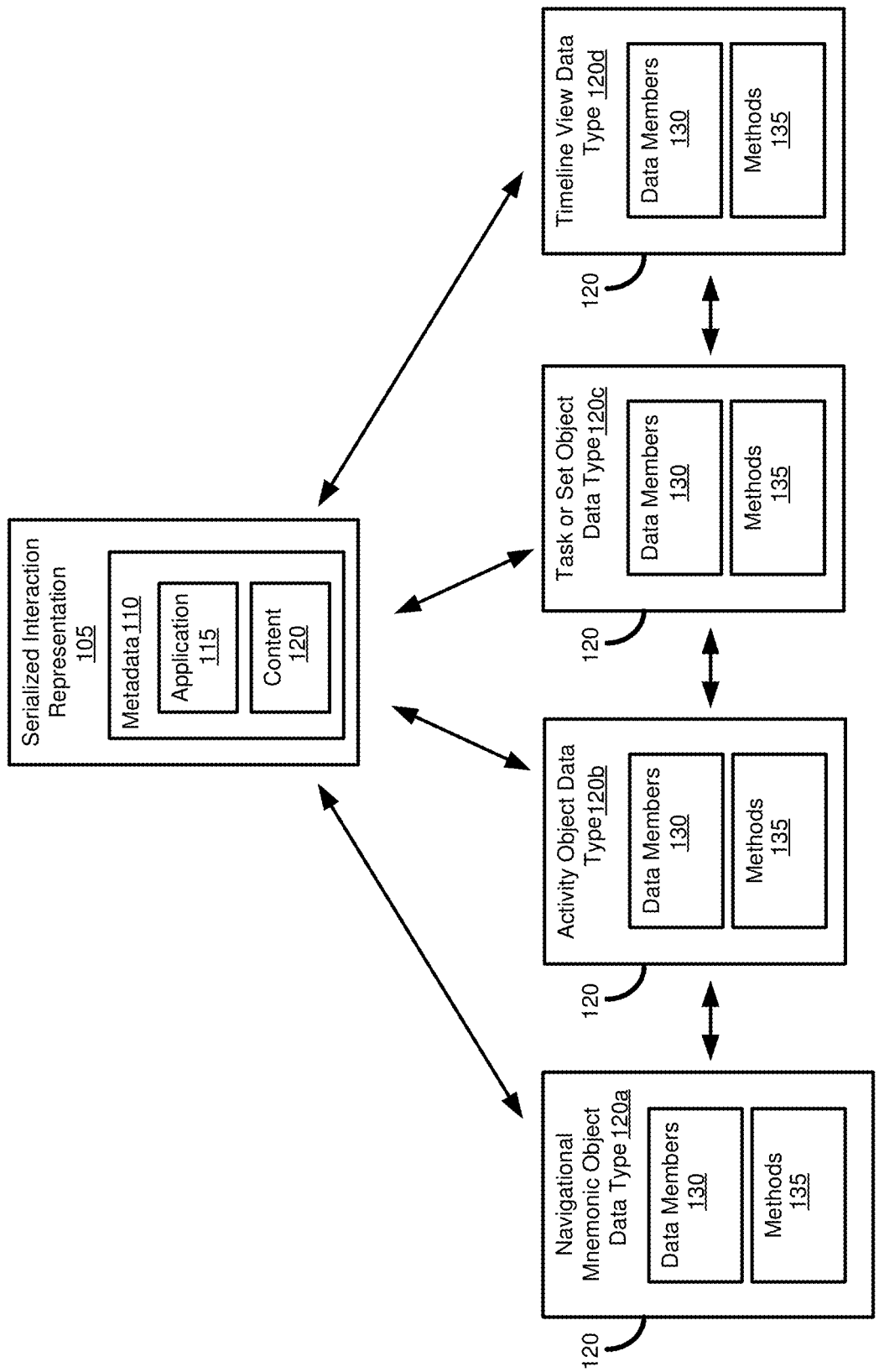
FIG. 1 is a block diagram illustrating how a serialized interaction representation can be interconverted between various interaction representation data types.

Computer devices are becoming ever more ubiquitous, and more and more of people's day-to-day activities involve computer devices. During the course of a day, a user may carry out many activities using one or more computer devices—such as watching videos, listening to music, browsing the web, using a chat or communication program, working on a document or presentation, or playing a game, among others. Over time, a user may wish to resume or revisit an activity they previously engaged in. However, it may be difficult for a user to remember all of the details necessary to resume that activity. For example, a user may not remember a website they visited, the location of a file they opened, a particular song they like, etc.

In many cases, a user may be concurrently carrying out multiple activities using even a single computer device. Increasingly, people desire and need to carry out activities involving, and between, multiple computer devices. For example, a user may work on a single task, or multiple interrelated tasks, such as a work project, using multiple different computer devices, such as a smartphone, work desktop computer, laptop computer, and home desktop computer. A user may start watching an entertainment program or playing a game on their laptop computer, but may wish to continue watching or playing on their smartphone or tablet computer at a later time. A user may start researching a topic on the web at work on their desktop computer, and continue their research on a smartphone or tablet computer during their commute home.

As computer devices are used for a larger number of tasks, and become more integrated into people's lives, it can become challenging for a user to track their activities and associated content. For example, a user may wish to access a web page they viewed two days earlier, but may not remember the address of the web page, or how they found it, or even which browser or device they were using to view the page. A user may have been listening to a song on their computer device, or watching a video, but may no longer remember the title of the song or video. A user may have been working on a document, but may no longer remember where the document was stored, or how to access it again. This situation can be made even more difficult when a user's activities are distributed across multiple devices.

In some cases, a computer device, such as an individual application running on the computer device or an operating system of the computer device, may provide some limited functionality allowing a user to try and trace their activity. For example, an operating system component may allow the user to be able to view a list of recently created or modified files. A web browser may allow a user to access a history of web pages visited by the user. However, such functionality is typically limited to a single application or domain. Some applications or domains may not provide functionality to aid a user to resume activities. Even when applications do provide such functionality, it can be cumbersome for a user to know how to use the different functionalities of different applications, and to interact with a different application for every activity they may wish to resume. Also, being limited to a particular application or domain does not provide the ability to relate different types of activities together, which can better allow a user to locate and resume a prior activity.

However, at least certain information regarding activities, such as files opened but not modified by a user, may not be available to the user. Even when information is available, the specific information in which the user is interested may be intermixed with voluminous amounts of other information. For instance, the web page a user wants to find may be intermixed with information for scores of other web pages the user visited on a particular day. If the user cannot remember the particular day they visited the web page, the task becomes even more challenging and frustrating.

Commonly, users engage in multiple activities with one or more computer devices in order to accomplish a particular task. For a work project, a user may carry out activities using a web browser, a word processor, a spreadsheet program, and a presentation authoring program, among others. Many of these activities may be carried out concurrently. Thus, in order to resume work on a project, a user may need to resume a prior state for multiple different activities, compounding the problems noted above. In addition, the use of multiple applications to carry out tasks can complicate trying to engage in the task on different computer devices.

For instance, to continue work on a task that the user originally engaged in on a desktop computer on a laptop computer, a user may have to manually find the relevant files, transfer them from the desktop computer, open each application, and then return to the point where they left off working on each application—such as a particular slide of a presentation, or page of a document, the user was creating or editing. This scenario further assumes that the relevant applications are already installed on the laptop computer. Thus, room for improvement remains for tracking a user's tasks and activities on one or more computer devices, making the information easily and intelligently accessible to the user, and allowing a user to easily resume a task or activity.

The present disclosure provides technologies that can allow a user to more easily track their tasks and activities on a computer device, and, in particular embodiments, across multiple computer devices. More generally, the present disclosure provides technologies for tracking content-interactions through interaction representations. An interaction representation is a structured collection of properties that can be used to describe, and optionally visualize or activate, a unit of user-engagement with discrete content using a computing system or device, including a particular application used to access the content. The content can be internal content to an application (e.g., a movie viewed using an online streaming service) or external content (e.g., the viewed movie is stored on a computer device in a file). In particular examples, the application and/or content can be identified using a URI.

An interaction representation can be represented as a data type, including a data type that represents a particular type of user interaction (e.g., an activity, or a task, which can be a collection of activities). Data types can be useful for particular applications using interaction representations, including providing particular user interfaces/views of user interactions with relevant content. An interaction representation can be a serialized interaction representation, where the serialized interaction representation is a serialized representation of a user's interaction with content, which can be useful in sending the information to other applications or other computer devices. A serialized interaction representation, in particular examples, can be in XML or JSON format.

In some aspects, the present disclosure provides that interaction representations, such as a serialized interaction representation, can be supplied by an application (or a component of an operating system) in response to an external request. The external request can be a request from another software application or from an operating system. Providing interactions representations in response to external requests can facilitate user interface modalities such as cut and paste or drag and drop, including in the creation of sets of activity representations. When content is transferred from an application, it can be annotated with an interaction representation generated by the application (or operating system component) in response to the external request (e.g., generated by a user-interface command).

Interaction representations, in some cases, can be updateable. Updates can be provided by an application that created an interaction representation or another application. Updates can be pushed by an application, or can be requested from an application.

As will be described in more detail, the disclosed technologies relate to collecting data regarding user interactions with content, organizing the information, such as associating user actions with a single activity, rather than as a series of isolated actions and grouping one or more interaction representations in a set (which can represent a task), and providing user interfaces that enable the user to review interaction representations to find information of interest, and to resume a particular activity or set of activities (e.g., the activities associated with a task). Additional details regarding user activity information and displays associated therewith are disclosed in copending application Ser. No. 15/442,399, filed Feb. 24, 2017, Ser. No. 15/662,057, filed Jul. 27, 2017, Ser. No. 15/661,981, filed Jul. 27, 2017, Ser. No. 15/590,858, filed May 9, 2017, and Ser. No. 15/590,895, filed May 9, 2017, each of which is incorporated by reference herein in its entirety. In order to further assist an individual in locating a particular content interaction, or to otherwise provide context to an individual regarding user activities, the disclosed technologies include displaying interaction representations in association with navigational mnemonics.

The disclosed technologies also relate to collections, or sets, of one or more interaction representations. Such collections or sets can also be referred to as tasks. For convenience, the term "task" is generally used in the following discussion, where the term can refer to a collection or set of one or more interaction representations. In particular implementations, a task includes (or is capable of including) multiple interaction representations. Typically, the activities of the collection or set are related in some manner, such as to achieve a particular purpose (e.g. the "task"). However, no particular relationship between interaction representations in the set or collection for the "task" is required. That is, for example, a user may arbitrarily select activities to be included in a set or collection and, as the term is used herein, may still be referred to as a "task."

Although a task typically includes a plurality of interaction representations, a task can include a single interaction representation. A task can include other tasks or sets. Each task is typically a separate entity (e.g., a separate instance of an abstract or composite data type for an interaction representation) from the component interaction representation. For instance, a user may start a task with a particular interaction representation, but may add additional interaction representations to the task as the user works on the task. In general, interaction representations can be added or removed from a task over time. In some cases, the adding and removing can be automatic, while in other cases the adding and removing is manually carried out by a user (including in response to a suggestion by a computer device to add or remove an interaction representation). Similarly, the creation of tasks can be automatic, or tasks can be instantiated by a user in particular ways. For instance, a software component can monitor user activities and suggest the creation of a task that includes interaction representations the software component believes may be related to a common purpose. The software component can employ various rules, including heuristics, or machine learning in suggesting possible tasks to be created, or interaction representations to be added to an existing task.

In some aspects, in addition to organizing component interaction representations, tasks can have additional properties that can assist a user. For example, the task may be represented by a user interface element that can be "pinned" or associated with various aspects of a graphical user interface—such as being pinned to a start menu, an application dock or taskbar, or a desktop. In addition, a user may choose to share tasks, or particular interaction representations of a task, such as in order to collaborate with other users to accomplish the task.

Sets can be associated with particular types, where a type can determine how sets are created and modified, and what information is included in a set. For instance, the set type can determine whether duplicate interaction representations (e.g. interaction representations associated with the same content, or the same content and the same application) can be added to a set, whether sets can be modified by a user, and whether information associated with an order or position of interaction representations in the set (e.g., a display position of content on a display device). A set type can also be used to determine what types of applications are allowed to use or modify the set (e.g., selecting to open a set may launch a different application, or application functionality, depending on the set type).

Sets, and interaction representations more generally, can also be associated with an expiration event (which could be the occurrence of a particular date or time, or the passage of a determined amount of time), after which the set or interaction representation is deleted.

In order to further assist an individual in locating a particular interaction representation or task, or to otherwise provide context to an individual regarding user tasks and interaction representations, the disclosed technologies include displaying task and interaction representation information in association with navigational mnemonics. As used herein, a navigational mnemonic is information that is likely to be highly memorable to a user, and can aid a user in determining whether tasks and interaction representations associated with the navigational mnemonic are, or are not, likely to be related to information they are seeking, or otherwise provide context to a display of task and interaction representation information. For instance, a user may associate a navigational mnemonic with tasks and content interactions carried out by the user in temporal proximity to a time associated with the navigational mnemonic. The time may be a time the navigational mnemonic occurred, or a time that the user associates with the navigational mnemonic. The navigational mnemonic may be a significant news or entertainment event, such as the release date of a new blockbuster movie or the date of a presidential election.

Although the present disclosure generally describes navigational mnemonics used to locate past tasks and content interactions, navigational mnemonics can be provided regarding prospective tasks and interaction representations. For instance, images of a person or a location can be provided as navigational mnemonics proximate upcoming calendar items for a task or interaction representation.

As an example of a navigational mnemonic that is relevant to a particular user, a location, such as where the individual took a vacation, may be particularly memorable to the individual at various times, such as when they booked their vacation, or when they left for, or returned from, their vacation. Thus, some potential navigational mnemonics, such as news stories, may be relevant to a large number of individuals, while other navigational mnemonics may be relevant to a single individual, or may be relevant in different ways to different users. In various embodiments, a computer device (for example, an operating system of a computer device, or a component thereof), can select navigational mnemonics based on heuristics, user behavior (including a particular user or a collection of users), using a determined feed service, using promotional sources, based on applications or services used or designated by a user, or combinations thereof.

Navigational mnemonics can be displayed proximate information regarding tasks and interaction representations that a user is likely to associate with the navigational mnemonic. If the individual recalls the task or activity they are looking for as not associated with a displayed navigational mnemonic, the user can scroll more quickly through the displayed tasks and interaction representations, including until the user recognizes a navigational mnemonic associated with the task or interaction representation they are seeking. If the user associates a displayed navigational mnemonic with a task or interaction representation of interest, the user can look more closely at associated tasks and interaction representations, including selecting to display more detailed information for tasks or interaction representation associated with the navigational mnemonic.

In at least some cases, interaction representations displayed to a user can include features that enable the user to provide input to resume the task or content interaction. For example, if the interaction representation represents watching a movie, the user can be presented with information regarding that activity, and, if the user selects the activity, the user may be taken to an application capable of displaying the movie (such as the application on which the movie was originally viewed), the movie can be loaded into the application, can be forwarded to the position where the user left off watching the movie, and playback can be resumed. For tasks, one or more of the constituent activities of the set of activities associated with the task can be resumed. In the scenario of a user resuming a work related task, resuming the task might involve navigating to a particular web page using a web browser, loading a document in a word processing program, and loading a presentation in a presentation authoring program.

In some aspects, a task or activity (including one or more activities associated with a task) can be resumed at a device other than a device on which the task or activity was originally (or last) conducted, or the task or activity can be initiated at a device other than a device at which the task or activity will be resumed. Similarly, navigational mnemonics can be provided on one device that are associated with another device, including user tasks and activities on the other device.

Information regarding user tasks, interaction representations, and navigational mnemonics can be collected across multiple devices and distributed to devices other than the device on which the task or interaction representation was generated, including through an intermediate service or one of the computer devices that serves as a master repository for user data, or directly between devices. In particular cases, an intermediate service, such as a cloud-based service, collects interaction representation information from multiple computer devices of a user, and reconciles any differences between task and interaction representation information, and navigational mnemonics, from the devices. The intermediate service (or master device) can thus serve as an arbiter of "truth," and can distribute task and interaction representation information, and navigational mnemonics, to the user's devices, including such that a particular device may be provided with interaction representation information and navigational mnemonics for other user devices, or updated information can be provided for the particular devices. In this way, displays can be provided that allow a user to view their activity, in association with one or more navigational mnemonics, across multiple computer devices. In a similar manner, the intermediate service can allow information to be shared between multiple users (each of which may be associated with multiple computer devices).

Thus, the disclosed technologies can provide a number of advantages, including:
  interaction representations that can be generated by applications during their normal execution or in response to an external request;
  interaction representations that can be converted between data type representations and serialized interaction representations;
  modifying system data types (e.g., shareable data types) to support user interface actions such as copy and paste and drag and drop, including annotating content with information regarding associated interaction representations and transfer of interaction representations using such system data types;
  interaction representations that include entity metadata, visualization information, and activation information;
  interaction representations that can be associated with metadata schema of one or more types;
  interaction representations that can include visualization information having various degrees of complexity;
  interactions representations to which additional metadata fields can be associated, and metadata values modified;
  interaction representations that can be shared across different devices and platforms, including between different operating systems;
  interaction representations having updatable content or application information, which can help representations stay synchronized or up to date;
  interaction representations that can represent collections of interaction representations;
  collections of interaction representations having different types, where a type can be associated with particular properties or rules; and
  collections of interaction representations, where the collection, or a member thereof, is associated with an expiration event.

These technologies relate to the technical field of computer science, as they collect, distribute, and arbitrate information relating to a user's tasks and content interactions on one or more computer devices and facilitate further user interaction. The disclosed serializable interaction representation can facilitate sharing information regarding user content interactions between applications and computing device. The disclosed technologies also provide for an application to generate an activity representation on demand, which can facilitate forming sets of interaction representations and supporting user interface actions such as drag and drop and copy and paste.

Serialized Interaction Representations

FIG. 1 illustrates a serialized interaction representation 105 that can be provided and used according to at least certain disclosed technologies. The serialized interaction representation 105 can include metadata 110, including application metadata 115 and content metadata 120. The application metadata 115 and content metadata 120 can represent the interaction of a user with one or more software applications and one or more content items. In at least some cases, the application metadata 115 and the content metadata 120 can include information sufficient to allow a user to interact with the associated applications and content items. For instance, if a serialized interaction representation 105 represented a user editing a document with a word processing program, the application metadata 115 and content metadata 120 can include information sufficient to allow the user to open the document with the word processor. As will be further described, the metadata 110 can include other types of information, and the type of information can depend on a type of application associated with the serialized interaction representation or a type of content associated with the serialized interaction representation.

The serialized interaction representation 105 can be embodied in a serialized format, such as a data interchange format. For example, and without limitation, the serialized interaction representation 105 can be in the XML (Extensible Markup Language) format or the JSON (JavaScript Object Notation) format. In at least some cases, a serialized format can be a format that facilitates storage (such as in a file or memory buffer) or transfer (e.g., transmission over a network), and can be a standardized serialized format. Typically, standardized serialized formats are architecture, platform, and programming language independent. Being expressed in a serialized format can facilitate transport of a serialized interaction representation 105, for example between software applications or between computer devices, including computer devices using different operating systems (e.g., a desktop computer running Microsoft Windows and a smartphone running Apple iOS).

Serialized interaction representations 105 can be interconverted between data types 120 (e.g., data types 120a, 120b, 120c, 120d). Data types 120 can be abstract data types or composite data types (e.g., classes or structs), or other types of objects in an object-oriented programming paradigm. The data type 120 can include data members 130 (or their equivalent) and methods 135 (or their equivalent). When a serialized interaction representation 105 is converted to a data type 120, metadata 110 can be used to populate at least a portion of the data members 130 of the data type. Typically, the data type 120 is configured to deserialize a serialized interaction representation 105 such that the metadata 110 is appropriately assigned to the data members 130, and the methods 135 produce the intended results. When a data type 120 is serialized to a serialized interaction representation 105, the serialization process is typically configured to convert at least a portion of the data members 120 into a serialized format, including metadata 110, which can have a particular structure or schema.

In various cases, a serialized interaction representation 105 can have more, less, or different information that a data type 120 representation of information in the serialized interaction representation. In addition, in some aspects, once a serialized interaction representation 105 is formed from a data type 120 representation, the serialized interaction representation may not have sufficient data to be fully converted back to the data type 120 representation. Similarly, in some aspects, once a data type 120 representation is formed from a serialized interaction representation 105, the data type representation may not have sufficient data to be fully converted back to the serialized interaction representation.

Figure 2:
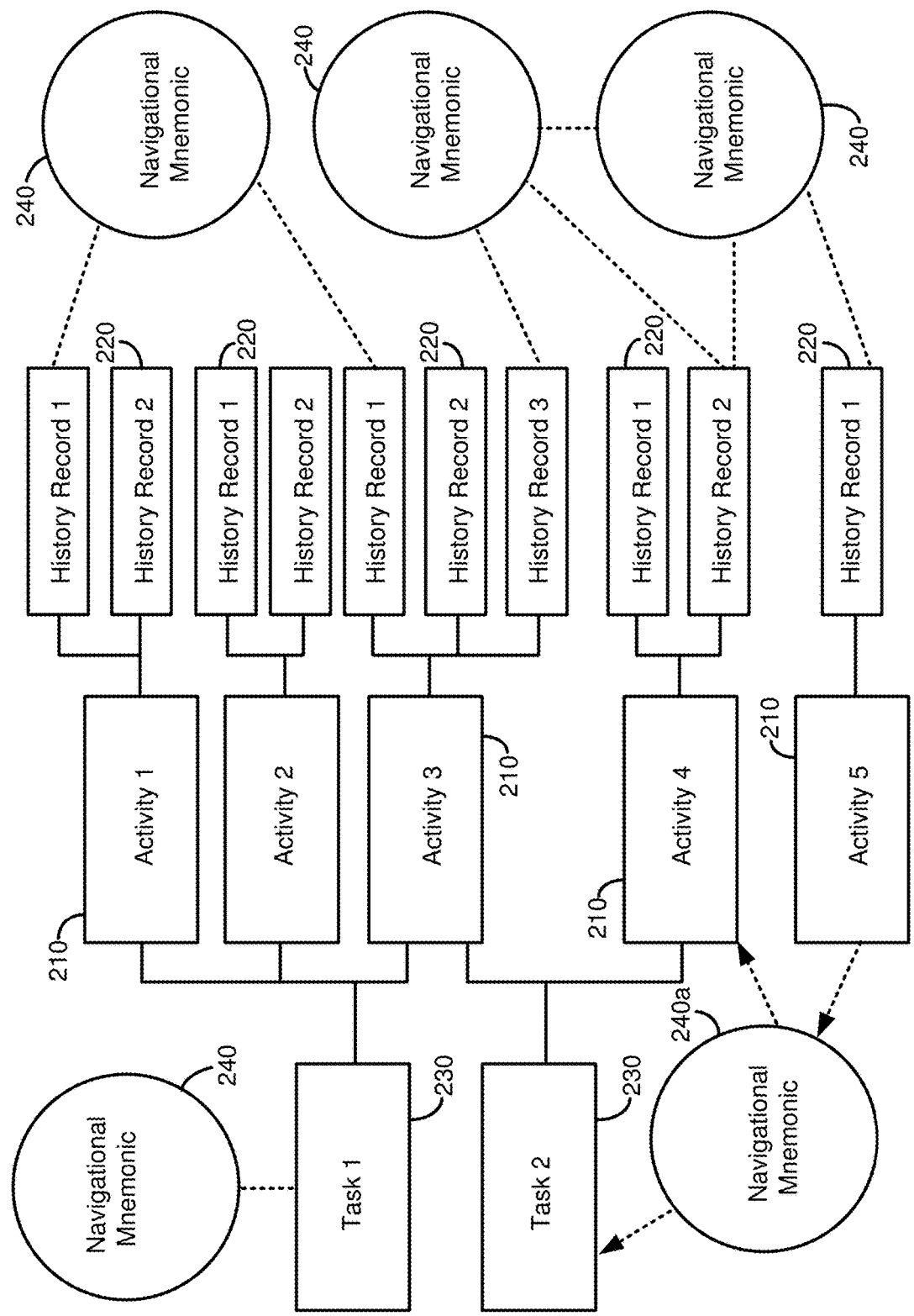
FIG. 2 is a diagram illustrating relationships between tasks, activities, and history interaction representations, corresponding to user actions on one or more computer devices, and navigational mnemonics.

Typically, a serialized interaction representation 105 can be converted into multiple data types 120. The data types 120 may be for a similar purposes, but configured for a specific application or operating system, or can be configured for different purposes. For instance, FIG. 1 illustrates a data type 120*a* representing a navigation mnemonic, a data type 120*b* representing an activity data type, and a data type 120*c* representing a task (or set) of activity data types. FIG. 2 also illustrates a timeline view data type 120*d*, which can be, for example, a special or alternative case of an activity data type 120*b* or a task activity data type 120*c*. In some cases, the data types 120*a*-120*d* can be the same, while in other cases they can be different. In the case of the data type 120*c* representing a set, in some cases the data type for the set can be the same as the data type for its components (e.g., navigational mnemonic object data type 120*a* instances, activity object data type 120*b* instances, other instances of the set object data type, timeline view data type 120*d* instances, or combinations thereof). Similarly, the serialized interaction representation 105 can at least partially represent any of the data types 120*a*-120*d*, including having the serialized interaction representation be used to represent both a set and objects in a set (including other sets).

The use of a serialized interaction representation 105 can be beneficial, as it can facilitate the transfer of the information in a serialized interaction representation without being tied to a particular data type, data structure, or end use schema. Data types 120 can be designed to use the information in a serialized interaction representation 105 for a desired purpose in a desired way, and an appropriate interconversion process supplied. Thus, different applications can use the information in a serialized interaction representation 105 without being aware, for example, of what data type 120 the serialized interaction representation may have originally been produced from, or the details of the data type. Similarly, the serialized interaction representation 105 can be updated and expanded (e.g., metadata 110 added, removed, or modified) by multiple applications, including across different platforms, which can increase the utility of the serialized interaction representation to multiple applications that may use a particular instance of a serialized interaction representation.

In at least some cases, in addition to being interconvertible between a data type 120 and a serialized interaction representation 105, the underlying information may be interconverted between data types (e.g., without a first data type being serialized to a serialized interaction representation, which is then deserialized to a second data type). A particular application can use multiple data types 120, and interconvert between them, or a first data type can be converted to a second data type to be used by another application. However, as the specifications of the relevant data types 120 are typically needed, direct conversion between data types can be of less general use than conversion using the serialized interaction representation 105.

Relationship Between User History Records, Activities, Tasks, and Navigational Mnemonics An interaction representation can represent user interaction with a particular content item using one or more software applications on one or more occasions. In some aspects of the present disclosure, user activity associated with one or more computer devices is monitored, including interactions with content (e.g., interaction representations) that are associated with tasks. A task can represent a group of interaction representations having some common relationship (which can be, in some cases, merely the user's indication that the interaction representations are to be considered as related). Thus, a task can be a more specific example of a set of interaction representations (where the set may not necessarily represent an identifiable or discrete "task"). Sets (including tasks) and interaction representations can be associated with navigational mnemonics, which can be information that a user may mentally associate with an interaction representation or set of interaction representations.

FIG. 2 generally describes tasks, activities, navigational mnemonics, and history records as data types. However, in some cases at least tasks (or sets, more generally), activities, navigational mnemonics, or a combination, thereof may instead be serialized interaction representations that include metadata that can be used to describe tasks, activities, and navigational mnemonics, including that can be interconverted between the serialized interaction representation and a suitable data type. When information regarding tasks, activities, and navigational mnemonics is generated or stored, it can be initially stored in a data type, in a serialized interaction representation (e.g., in JSON or XML format), or both. Although not specifically described as being interconverted between a data type and a serialized interaction representation, in some cases, history records (e.g., individual instances of a user interaction with a software application and particular content) can be represented as serialized interaction representations, and can be interconverted between a data type or record for the history record and the serialized interaction representation.

FIG. 2 illustrates how user activities 210 can have one or more history records 220 indicating a discrete instance of the activity, or an event associated with the activity, and how tasks 230 can be sets or collections of one or more activities. Activities 210 are typically associated with a software application and one or more particular content items (e.g., a document, a movie, a music file) that a user accesses or interacts with using the software application. Examples of software applications and associated content can be a word processing program and a particular file that was created, modified or accessed, a music program and a song or album the user listened to, a video playback program and a particular video the user watched, a social media application and particular individuals or entities the user viewed or contacted, and a web browser and particular web pages visited by the user.

In some cases, a user may engage in an activity 210 on a single occasion. In other cases, a user may engage in the same activity 210 on multiple occasions. For instance, in writing a document, a user may create the document and then edit it on multiple different occasions. At some point, the user may be finished with the document, and may not access it again, or may not access it again for a long period of time.

Each discrete occasion during which a user engages in an activity 210, or particular events associated with an activity (e.g., printing a document, forwarding an email, bookmarking a web page) can be represented, and summarized, by a history record 220. A history record 220 can be associated with a time the user began a particular instance of the activity 210 (or a time an event occurred), a time the instance ended, a duration the user was actively engaged in the activity, and other information.

History records 220 can include information that can be used to provide an indication of the importance of an activity (or instance or event thereof) relative to other activities (or instances or events thereof) a user may have engaged in over a time period. Relevance information can be a measure of how important the activity is likely to be to the user compared with other contemporaneous activities in which the user engaged using the same computer device, or among activities carried out by the user using multiple computer devices. For example, a user may listen to music using their smartphone at the same time they are editing a document on their laptop computer. Over the same time period, the user may send text messages using their smartphone, and have a web browser open on their laptop.

Activities 210 carried out using a single computer device may have differing relevance, or importance to the user. For instance, in the example above, although the user had a web browser open on their laptop, the most important activity to them may have been the document they were editing. On the smartphone, the text messages sent by the user may have a greater relevance to the user than the music they were listening to. Among all the activities being carried out by the user over a time period, editing the document may have been the most relevant activity. As will be further described, relevance can be determined in a number of ways based on various parameters. In addition, relevance can be calculated or measured using different schemas. For instance, a user may indicate that they want to view the most relevant work activities or the most relevant non-work activities.

Relevance can be determined by a single factor or a combination of multiple factors. One factor can include the amount of time a user was actively engaged in an activity 210. Another factor can relate to significant actions a user performed while engaging in the activity 210. In some cases, significant actions can be defined and reported by a particular application—for example, an application may report forwarding an email or "liking" a social media post as a significant action. In other cases, significant actions can be determined in other manners, such as by user actions tracked by an operating system. For instance, the act of printing an object, such as a file or web page, can be designated as a significant action and used to help determine a relevance value for the activity 210 (or a particular history record 220 or instance of the activity), or otherwise associated with the activity (such as being noted in an appropriate history record for the activity).

Different applications, and their corresponding activities 210, can be associated with higher or lower relevance factors, including depending on a type of application (e.g., a word processor may be assigned a higher relevance than a music playback application, web browser "A" may be assigned higher relevance than web browser "B", an "entertainment" application may be assigned a lower relevance than a "productivity" application). The relevance of an activity associated with an application may also depend on what other activities a user was simultaneously performing. For instance, word processing might be ranked as more relevant than web browsing, when performed concurrently, but web browsing might be ranked as more relevant than concurrent music playback.

In particular aspects, relevance can be determined with respect to a specific temporal period, or relevance be determined without respect to a specific temporal period. For instance, editing a work-related document may be associated with a higher relevance to the user than editing a shopping list, regardless of whether both editing activities ever occurred concurrently. In particular examples, one activity can have a higher priority than another activity with respect to a particular time period, but a lower priority than the other activity when not tied to the temporal period. Continuing with the editing scenario described above, if a user is actively editing the shopping list over a period of time, but not actively editing the work document, the shopping list activity may have a higher priority with respect to that particular time period, but a lower priority overall than the work document activity.

Relevance can be determined, or refined, using machine learning techniques. For instance, if activities 210 are marked as relevant, but a user instead views information regarding other activities, the definition of relevance, or assigned relevance values, can be modified. Similarly, heuristics can be used to create or adjust relevance values. For example, patterns of user activities (e.g., a user likes to listen to music while reading the news on a website) or context (e.g., time of day, day of the week) can be recognized, and relevance indicators created or adjusted. When multiple factors are used to determine relevance values, or assign an overall relevance score to an activity 210 (or history record 220 or task 230), the factors can be weighted, or assigned confidence values, and the weightings or confidence values periodically adjusted, such as using machine learning, heuristics, or other techniques. When relevance is adjusted, such as based on machine learning or heuristics, the adjustments can be based on data associated with the particular user associated with an interaction representation, or a collection of users (including, in some cases, a group of users that are associated with a common interaction representation, such as a common task and its associated activities).

History records 220 can be generated by software applications with which the user interacts. In some cases, a software application, such as through an interface (e.g. calling a method of an API to create or modify a history record 220), can provide information for a history record. History records 220 can be created or modified, for example, when a user starts an application, when the user creates, modifies, or accesses new content using the application, when the user closes the application or particular content, or upon the occurrence of particular events in the application (e.g., saving a file, sending an email, printing a document).

In an example scenario, when a user watches a video, such as with a streaming video application or a website that provides streaming video, the application, or website, can call a method (e.g., of an API) to create or modify a history record 220. The call can include as arguments information such as an identifier of the application or website (or application and website), an identifier associated with the user, an identifier associated with the video being watched by the user, a time the user accessed the video (or started the application), a duration the user watched the video, and the playback position when the user stopped watching the video (or when the call was made).

In other cases, history records 220 (and in at least some cases, activities 210) can be generated by another application, or an operating system component, that monitors a user's activities. For instance, a monitoring component may track what applications, and optionally associated content (e.g., an operating system determines that a user has opened a file with a particular software application), a user opens, the duration the application was open, the duration the user was actively using the application (e.g., using measures such as the duration the application was in focus in a user interface, or the primarily active application, or other measures of user activity, such as input provided to the application through a keyboard or pointing device), files opened, modified, or created by the user, and significant actions taken by the user in association with the application (e.g., printing a document or downloading a file). The history records 220 so generated can be associated with an existing activity 210, or if an existing activity is not found, the history records can be used to generate new activities. In at least some aspects, a user can directly generate or specify an activity 210, a history record 220, a task 230, a navigational mnemonic 240, or combinations thereof, and/or can interrelate such activities, history records, tasks, and navigational mnemonics.

Typically, a filtering mechanism is applied to user activity, or at least user activity reporting by a monitoring component, such that not all user activity results in a history record 220. That is, some user actions may not be significant, in the sense that they are not likely to be related to activities that a user would later like to review or resume. As an example, if a user opens, and then quickly closes, a series of files, it may indicate that the user is looking for a file having particular contents, and the opened and closed files are files that the user determined not to be the correct file. Thus, it may not be likely that the user would later want to review those activities (and, in fact, showing those activities may hinder the user in finding information they seek), and so they may not result in the generation of history records 220. However, if after opening and closing a series of file, the user opened a file, printed the contents, and then quickly closed it again, that could indicate that the printed file was significant, and may be something the user would be interested in reviewing or resuming at a later date, and thus could be associated with a history record 220.

In some aspects, whether a history record 220 is created can depend, at least in part, on whether user actions can be associated with an existing activity 210. Typically, user actions are more likely to be relevant if they can be associated with a discrete activity 210 that the user has already carried out one or more times. For example, opening and closing a file may be more significant if the user has recently accessed the file on other occasions.

As will be further described, the present disclosure provides technologies for displaying information regarding a user's activities to the user, including individual instances (e.g., particular history records 220) when the user engaged in an activity 210. In some cases, more history records 220 can be created than are shown to the user. For example, a history record 220 may be generated and used to help determine the relevance of the activity 210 associated with the history record 220, or other history records. If a user accesses a document, even for a brief time, for instance, that may indicate that the activity 210 was somewhat more relevant to the user than other activities in which the user engaged during a relevant time period.

Activities 210 may be analyzed to determine which history records 220 to display to the user. For example, a user may only want to look at the most recent history record 220 for the top five most relevant activities 210 the user engaged in during a particular time period. Activity relevance can be determined, for example, using multiple history records 220 associated with the activity 210, even though the information eventually displayed to the user may be from only the most recent history record.

Each activity 210 can, but need not, be associated with one, or in some cases, multiple, tasks 230. A task 230 can represent a higher-level endeavor of the user that involves multiple activities 210. As an example, a task 230 may be a user preparing for an annual departmental review. As part of the annual review, the user may undertake activities 210 such as preparing a report, preparing a presentation, creating graphs and figures, and emailing colleagues. If desired, tasks 230 and activities 210 can have additional levels of organization. For example, preparing a report can also be a task 230, with preparing the report document and preparing graphics, figures, and images for the report all being underlying activities 210.

In some cases, tasks 230 can be created based on user input. For instance, a user may select one or more activities 210 and request that the activities be grouped together, or associated, as a task. In other cases, tasks 230 can be created automatically, such as by monitoring user activities to determine whether multiple activities may be related to a common purpose. As tasks 230 are associated with activities 210 (and in turn, history records 220 for the activities), tasks can access information associated with activities. Information associated with activities 210 for a task 230 can be displayed to the user in conjunction with the task, and can be used to allow a user to resume all or a portion of the activities for the task.

Tasks 230 can be dynamic, in that they can be created, modified by adding or removing activities 210 from the task, and deleted. In at least some cases, when a task 230 is deleted, or an activity 210 is removed from the task, the activities associated with the task, or removed from the task, are not deleted—the association between the task and the activity is simply removed.

One or more of activities 210, history records 220, and tasks 230 can be associated with one or more navigational mnemonics 240. Although activities 210, history records 220, and tasks 230 are shown as associated with different navigational mnemonics 240, in at least some aspects, a particular navigational mnemonic can be associated with a combination of these elements. For instance, a news story acting as a navigational mnemonic 240 may be particularly relevant to particular history records 220 associated with a particular instance of an activity 210 carried out on the date the news story appeared. A person can be a navigational mnemonic 240, and associated with an activity 210, including any history records 220 associated with the activity. The same navigational mnemonic 240 may also be associated with a task 230 that includes the activity 210.

In some cases a task 230 or an activity 210 can serve as a navigational mnemonic for other tasks or activities. That is, a user may recall a particular activity or task based on a mental association with another activity or task. As shown in FIG. 2, navigational mnemonic 240a can be formed from activity 5, and can serve as a navigational mnemonic for task 2 and activity 4.

FIG. 2 illustrates how navigational mnemonics 240 can aid a user in locating particular activities 210, history records 220, and tasks 230. For instance, a user may not remember a particular time they engaged in an activity 210 (associated with a particular history record 220), however, the navigational mnemonic 240 may be more memorable to the user. The user may remember that the navigational mnemonic 240 is associated with the history record 220 they are looking for (e.g. "I know I worked on the document after I spoke with Tom" or "I watched the movie on the day this event happened"). Thus, when looking for a history record 220, instead of reviewing each history record in detail, the user can scroll through history records until they see a navigational mnemonic 240 they associate with the history record, and then look at the history records associated with the navigational mnemonic in more detail (e.g., following the dashed lines shown in FIG. 2) to locate the activity they are looking for.

FIG. 2 also illustrates how navigational mnemonics 240 can provide relevance criteria that can be used to organize information regarding activities 210, history records 220, and tasks 230. For example, a display may initially present a chronological listing of history records 220, with interspersed depictions of navigational mnemonics 240. If a user selects a navigational mnemonic 240, the display can present activities 210, history records 220, tasks 230, or combinations thereof, that are associated with the selected navigational mnemonic (e.g. those to which the navigational mnemonic is connected by a dashed line).

In particular aspects, a navigational mnemonic 240 can be associated with one or more other navigational mnemonics. These associations can facilitate cascaded retrieval of information, or search, by a user, where a user can explore associations between navigational mnemonics in order to find information they are seeking. For instance, a navigational mnemonic 240 of a location may associated with a navigational mnemonic of a person, such as a person with whom the user interacted at the location. An activity record 220 of interest to the user may be associated with the person, but the user may not have initially remembered the person, or that particular navigational mnemonic 240 may not have been originally displayed to the user.

Although FIG. 2 illustrates activities 210, history records 220, and tasks 230, including particular arrangements and interrelationships of such components, navigational mnemonics 240 can be implemented in another manner. For example, an implementation can omit one or more of activities 210, history records 220, and tasks 230.

Data Model for Task Records, Activity Records, History Records, and Navigational Mnemonic Records FIG. 3 illustrates example data members that can be included in data types for a task (or, more generally, a set of activities) 300, an activity 318, a history record 348, and a navigation mnemonic 372. The data members can also represent specific metadata items that can be included in a serialized interaction representation of the information (including a specific instance of one of the data types). For instance, the data members can be included in the metadata 110 of a serialized interaction representation 105 of FIG. 1. The following description of the data members can apply to the information stored as metadata in a serialized interaction representation. In various implementations, a serialized interaction representation can include more, fewer, or different metadata items than data members contained in a data type to which the serialized interaction representation may be interconverted.

Although FIG. 3 illustrates particular, specific implementations of interaction representations, interaction representations can be configured in other manners. In some aspects, interaction representations can include data that includes metadata describing the particular interaction representation (e.g., describing the nature of the content and/or associated application), data that can be used to provide a visual representation of the interaction representation, and activation data that can be used to resume interaction with particular content associated with the interaction representation. Interaction representations can also include information that describes to what software components an interaction representation should be visible, such as being visible to an operating system only, to applications only, or to both an operating system and applications.

FIG. 3 illustrates various properties that may be included in a task record 300, such as a record for the task 230 of FIG. 2. In particular examples, a task record 300 can be implemented as an abstract or composite data type, such as a class or a struct.

Each task record 300 is typically associated with a unique task identifier 302 ("TaskID"), such as an integer value. The task identifier 302 can be used by programs, or a computer device running a program, to uniquely name and identify a particular task. Each task record 300 can include one or more activity identifiers 304 ("ActivityIDs") that identify unique activities that are associated with the task record. In a particular example, the activity identifiers 304 can be one or more integers (e.g., an integer identifier for each component activity of the task record 300). In some cases, the activity identifiers 304 can include task identifiers 302 for other tasks 300. In this way one task can be a parent task to one or more additional tasks (which are, in effect, subtasks of the main or parent task).

Each task record 300 can be associated with text 306 ("DisplayText") to be displayed to identify or describe the task. The text 306 can provide a human-readable description of the task. In some cases, the text 306 can supplied by a user, in other cases, default text can be supplied, such as based on the nature of one or more activities associated with the task record 300. In other cases, the title 306 can be automatically provided, such as by an application through an interface or by a software component that creates and edits task records 300. Any default or automatically assigned value for the title 306 can be changed by a user.

Similarly, each task record 300 can be associated with an image or an icon 308 ("Image," which can be a URI, such as a URI that specifies a file path or web location for an image), which can be assigned by a user or can be supplied automatically by a program (e.g., a program providing for creation and management of task records 300, or by a program that supplies information for a task record, an activity, or an individual history record of an activity, such as through an API). In a specific example, the image 308 can be an image of one or more content items associated with an activity of the task record 300.

In a specific example, the image 308 can be an image of one or more content items associated with an activity of the task record 300. In some aspects, the target specified by Image 308 can be a set of visual content, such as a set specified in a markup language, such as HTML, JSON, or XML. The target can be, at least in some examples, dynamically modifiable, such that additional visual content may be added, visual content removed, or visual content otherwise modified. The visual content associated with the images 308 of a task record 300 can serve, at least in some implementations, as navigational mnemonics, including for other task records 300 or for activity records 318.

Each task record 300 can also include a global relevance indicator 310 ("GlobalRelevance"). The global relevance indicator 310 can be a value representing the predicted or estimated relevance, or importance, of a task 300 to a user relative to other tasks the user may have contemporaneously engaged in (e.g., during a time within the period defined by the earliest and latest history records of an activity associated with the task, bound by the earliest and latest history records over a time period, or at another selected time period that embraces the task and one or more additional tasks). The global relevance indicator 310 can be used, for example, to rank task records 300 (or activity records 318) by relative importance. In at least some aspects, the global relevance identifier 310 can rank tasks 300 by relevance across multiple computer devices (e.g., an activity on a smartphone can be ranked relative to an activity on a desktop computer).

In some cases, a task record 300 can include one or more navigational mnemonic identifiers 312 ("NavigationalMnemonicIDs") for any navigational mnemonic identifiers that have been associated with the task. The navigational mnemonic identifiers 312 can be used to select navigational mnemonics to be displayed in conjunction with the task associated with the task record 300. The navigational mnemonic identifiers 312 can also be used to retrieve task records 300 that are associated with a navigational mnemonic.

In some aspects, tasks can be shared between users. Accordingly, a task record 300 can include identifiers 314 ("CollaboratorIDs") for any users with whom the task record 300 can be shared. For instance, the identifier 314 may be associated with an account at a remote service (e.g., a cloud based service) for the other user. In some cases, new task records 300, and changes to tasks records, can be automatically sent to the cloud service, and computer devices for the appropriate collaborators updated. The identifier 314 can be associated with permissions for any collaborators, including by including another field in the task record 300. The permissions can specify, for instance, whether a collaborator has read-only privileges for the task record 300, or may make changes to the task record, which can then be propagated back to the original task record.

A task record 300 can also be associated with a particular display schema 316 ("SchemaID"). The display schema 316 can include display layout or style information for the task record 300, including how associated activities (e.g., associated through the activity identifiers 316) are displayed. The display schema 316 can include, or can identify, a color that will be displayed in association with information of the task record 300.

The task record 300 can include more, less, or different information than shown in FIG. 3. For example, the task record 300 can include information that is extracted from information that is maintained for activities associated with the task record, or with their underlying history records. The information can include identifiers for applications or computer devices used to carry out the task associated with the task record 300. In some cases, instead of, or in addition to the global relevance identifier 310, a task record 300 can have a field having one or more values representing predicted or estimated relevance, or importance, of a task record 300 relative to other tasks carried out on particular computer device(s) (e.g., a local relevance identifier).

Tasks records 300 can also include additional information that can be used to associate task records with other tasks records, with activity records 318, with history records 348, or with navigation mnemonic records 372. Such information can include people associated with the task (e.g., contacts, collaborators), one or more locations associated with the task (such as determined using a hardware sensor of a computer device), times associated with the task, or content associated with the task. Task records 300 can also be associated with an indicator of a type, such as task records for sets of activity records 318 for user-curated sets, non user-curated sets, and sets of search results, where different types of sets may be displayed differently or have different rules governing the creation or modification of sets, including what types of activities can be added to a set and the information maintained in a set.

FIG. 3 also illustrates various properties that may be included in an activity record 318, such as a record for an activity 210 of FIG. 2. In particular examples, activity records 318 can be implemented as an abstract or composite data type, such as a class or a struct.

Each activity record 318 is typically associated with a unique activity identifier 320 ("ActivityID"), such as an integer value. The activity identifier 320 can be used by programs, or a computer device running a program, to uniquely name and identify a particular activity. The activity identifier 320 can be used to as the source of the activity identifiers 304 of a task record 300.

Each activity record 318 can include an application activity identifier 322 ("AppActivityID"). The application activity identifier 322 can be supplied to an application associated with the activity record 318 and can allow the application to identify the indicated activity, such as to resume the activity. Thus, the application activity identifier 322 can represent state or context information of the application, and can be referred to as activation information.

In at least some cases, the application activity identifier 322 can be supplied by an application that was used to carry out the activity associated with the activity record 318. For instance, for a video application, the video application may create an identifier than indicates a particular video a user was watching, and the playback position within the video. If the activity associated with the corresponding activity record 318 is selected to be resumed, the application can be provided with the application activity identifier 322, which the application can use to locate and resume the user's prior session.

Each activity record 318 can also include an activation target identifier 324 ("ActivationTarget"). The activation target identifier 324 can be used to locate, such as to execute, a particular application associated with the activity record 318. In some cases, the value of the activation target identifier 324 can identify a specific application, such as a specific application on a particular computer device (e.g., a file path for an executable file associated with the application).

In other cases, the value of the activation target identifier 324 can be used to identify a particular application, but not a specific application on a specific computer device. For instance, if a user has a desktop computer, a laptop computer, a tablet computer, and a smartphone, in some cases, the value of the activation target identifier 324 can identify a specific application of a specific computer device, such as the laptop computer. In other cases, the value of the activation target identifier 324 can identify a particular application, such as a particular media player, and the activated application can depend on the identity of the device on which the activity record 318 is located, or the device on which the activity of the activity record is to be resumed. That is, if the activity for the activity record 318 is selected from the tablet computer device to be resumed, the application for the tablet computer device can be executed, while the application for the desktop computer is executed if it is used to resume the activity. In some cases, a disambiguation service can translate the activation target identifier 324 to indicate a particular application (e.g., the location of an executable file) based on the identity of the device from which the activity is to be resumed. In particular aspects, if an activity for an activity record 318 is to be resumed at a device, and the necessary application is not installed on the device, the appropriate application can be determined and installed, or the user can be prompted to install the application.

The activity record 318 can include a content identifier 326 ("ContentTarget") that can be used to identify a particular content item (e.g., document file, video file, music file, image file, web page, etc.). In some cases, this information can be independently maintained by the associated application, such as in association with a session or context information indicated by the application activity identifier 322.

In some implementations or record instances, an activity record 318 may not have a value for the application activity identifier 322, or the value may not be sufficient to resume the context using the appropriate application. As an example, for activities created through monitoring of user actions, rather than activities directly created by an application (e.g., through an API), the associated application may not have state information that can be accessed by a value of the application activity identifier 322. If the monitoring that created the activity record 318 is able to determine the content used by the application as part of the activity, an identifier of the content (e.g., a file location or web address) can be stored as a value of the content identifier 326.

Even if an application includes state information that can be accessed by a value of the application activity identifier 322, the activity record 318 can still include the content target identifier 326. For instance, before an activity is resumed after being selected by a user, it can be determined whether the content associated with the content target identifier 326 is available. If the content is not available, the user can be presented with an error message, presented with an option to manually locate the content, or the content can be automatically located and downloaded to the computer device (including automatically when a device receives an activity record 318 referencing content not present on the device). Or, the value of the content target identifier 326 can be used to access the content to provide an image or preview of the content.

A human-readable title 328 ("DisplayText") can be included in the activity record 318. In some cases, the title 328 can be selected by a user. In other cases, the title 328 can be automatically provided, such as by an application through an interface or by a software component that creates and edits activity records 318. Any default or automatically assigned value for the title 328 can be changed by a user.

An image identifier 330 ("Image") can be used to identify an image (e.g., by a file path) that is associated with the activity record 318. In some cases, the image identifier 330 does not include a value. If the image identifier 330 is empty, no image is associated with the activity, in some aspects. In other aspects, if the image identifier 330 is empty, a default image, such as a content preview using the value of the content target identifier 326, or an image or icon of the application associated with the activity record 318, can be used as an image to be displayed in conjunction with other information of a particular activity record.

In some aspects, the target specified by Image 330 can be a set of visual content, such as a set specified in a markup language, such as HTML, JSON, or XML. The target can be, at least in some examples, dynamically modifiable, such that additional visual content may be added, visual content removed, or visual content otherwise modified. The visual content associated with the images 330 of an activity record 318 can serve, at least in some implementations, as navigational mnemonics, including for other activity records 318 or for task records 300.

Properties data 332 ("Properties") can be used to store additional information associated with an activity record 318. For instance, the properties data 332 can include additional information to be supplied to an application to resume a prior state of the application and the relevant context, such as settings for the application. In particular cases, the properties data 332 can be stored as key-value pairs, with the key indicating a particular property or variable and the value indicating the value that should be supplied for the property or variable.

Properties data 332 can include other, or additional, information. For instance, properties data 332 can specify information about an activity associated with an activity record 318. As a particular example, when an activity record 318 represents a movie, properties data 332 could include information such as the title of the movie, the director of a movie, prominent actors or actresses featured in the movie, a genre for a movie, etc. When an activity record 318 is an event, the properties data can specify information such as a type of the event (e.g., a parade, a protest, or a concert), a date the event occurred, sponsors of the event, etc. Including such information in properties 332 can provide enhanced search capabilities, as well as provide for enhanced analysis (such as using machine learning) about what kind of activities a user engages in, and activities that are likely to occur together in a task (which in turn can allow for improved suggestions as to which activities may be associated with a common task).

An activity record 318 can be associated with a content type, such as a document, a web page, audio, video, photos, and the like. The content type can be indicated by a content type identifier 334 ("ContentType"). The value of the content type identifier 334 can be used, for example, to sort activity records, or to allow activity records 318 to be searched by content type. The content identifier 334 can also be used to select display parameters for the activity record 318, such as a particular layout or style information.

Each activity record 318 can be associated with a particular application, indicated using an application identifier 336 ("ApplicationID"). In some cases, the application identifier 336 can be used to indicate a specific application on a specific computer device, or an application on a specific type or class of computer device (e.g., pc, tablet, smartphone). In other cases, the application identifier 336 can be used to indicate a specific application (e.g., a specific music playback program), but is not specific to a particular computer device. Each activity record 318 can also include a human-readable name 338 ("AppDisplayName") for the application, and an icon 340 ("AppIcon") representing the application.

Each activity record 318 can include a global relevance identifier 342 ("GlobalRelevance"). The Global Relevance identifier 342 can be a value representing the predicted or estimated relevance, or importance, of an activity to a user relative to other activities (or task records 300) that a user may have contemporaneously engaged in over a time period. The global relevance identifier 342 can be used to rank activities carried out by a user on different computer devices. In some case, instead of, or in addition to, the global relevance identifier 342, an activity record can include a local relevance identifier, indicating the relevance of the activity at one or more specific computer devices (e.g., a value for instances of the activity carried out using a smartphone and a value for instances of the activity carried out at a desktop computer). In other aspects, the Global Relevance identifier 342 can be used for other purposes, such as to rank the relevance of an activity record 318 without regard to a particular time period (e.g., an activity record can include a local relevance identifier that can indicate relevance over a particular time period and the Global Relevance identifier can indicate relevance without respect to a particular time period).

An activity record 318 can include one or more navigational mnemonic identifiers 344 ("NavigationalMnemonicIDs") for any mnemonic identifiers that have been associated with the corresponding activity. The navigational mnemonic identifiers 344 can be used to select navigational mnemonics to be displayed in conjunction with the activity associated with the activity record 318. The navigational mnemonic identifiers 344 can also be used to retrieve activity records 318 that are associated with a navigational mnemonic.

As discussed above, in some aspects, tasks can be shared between users. In some implementations, collaborators can be specified at the level of a task, which all activities for the task being shared or not shared. In other implementations, sharing, or access permissions, can be specified at granularity of activity records 318 using collaboration identifiers 346 ("CollaboratorIDs"). The collaboration identifiers 346 may be used as otherwise described for the collaboration identifiers 314 of the task records 300.

Activity records 318 can include more, less, or different information than shown in FIG. 3. An activity record 318 can include information that associates the underlying activity with more than one application. For instance, a user may carry out the activity using one program (e.g., a particular word processing program) on their laptop, but a different program (e.g., a different word processing program) on their tablet computer. The activity record 318 can store information sufficient for the activity to be resumed using the appropriate application for a particular computer device.

Activity records 318 can also include additional information that can be used to associate activity records with other activity records, with task records 300, with history records 348, or with navigation mnemonic records 372. Such information can include people associated with the activity of the activity record 318 (e.g., contacts, collaborators), one or more locations associated with the activity (such as determined using a hardware sensor of a computer device), times associated with the activity, or content associated with the activity. Activity records 318 can also include identifiers for any task records 300 with which an activity record is associated.

As discussed above, an activity (and an activity record 318 therefor) can be associated with one or more history records, representing a distinct occasion or period where a user was engaged in the activity, or a significant action or event associated with the activity. FIG. 3 illustrates various properties that may be included in a history record 348. In particular examples, history records 348 can be implemented as an abstract or composite data type, such as a class or a struct.

Each history record 348 is typically associated with a unique history record identifier 349 ("HistoryID"), such as an integer value. The history record identifier 349 can be used by programs, or a computer device running a program, to uniquely name and identify a history record 348.

History records 348 can be created by different entities (e.g., components of different devices, or different components for a single device) and for different reasons. Accordingly, each history record 348 can include a type identifier 350 ("Type"). Values of the type identifier 350 can signify or memorialize when a user starts a new activity, when a user finished an activity, periods during which the user actively engaged in an activity, significant user actions regarding the activity (e.g., sending a text or email, sharing a document, printing a document, downloading a file, maximizing a window) or events within the activity (for example, for a game, finishing particular quests or levels). As will be further described, some history records 348 can be generated by an application (e.g., by calling an API that allows the application to create, retrieve, or modify history records, which can be associated with state information maintained by the application regarding the history records), and thus applications can have at least some flexibility to define history records types that are relevant to the particular application. Other types of history records 348 can be generic, or default, and can include history records that can be generated by monitoring user activity, without requiring specific input from an application.

Each history record 348 is associated with a particular activity record 318 using an activity identifier 352 ("ActivityReferenced"), which can, for example, store the value of the activity identifier 320 of the appropriate activity record. For certain types of history records 348, such as those designated by an application, or a monitoring component, as being "new," the creation of the history record 348 can trigger the creation of a new activity record 318 (e.g., can trigger an application or monitoring component to generate an activity record), with the value of the activity identifier 352 of the new activity record being stored as the activity identifier 320.

Each history record 348 can include a time period identifier 354 ("EventPeriod"). In some cases, the time period identifier 354 can include start and end times for the particular user action(s) associated with a particular history record 348. In other cases, the time period identifier 354 can be a duration, such as number of hours, minutes, and/or seconds for which the user engaged in the activity, at some level. If the time period identifier 354 measures a duration, the history record 348 can include another field that records the time the user began the activity reflected in the history record.

Each history record 348 can also include a measure of the time the user was actively engaged in an activity, as opposed to perhaps having an application running, but not actively engaging with the application. This value can be recorded in an active time identifier 356 ("ActiveTime"). The amount of time a user was actively engaged in an activity can be supplied by a reporting application, such as when a history record 348 is created or modified in response to a call by an application, such as to an interface. If the application does not provide a value for the active time identifier 356, or if the history record 348 is created by monitoring user activity, the active time can be determined, for example, by tracking how long the associated application is in focus in a user interface and monitoring user input to the application, such as using a keyboard or a pointing device.

As history records 348 can be created by difference sources, such as a monitoring component or an application, or can be received from another device or a central repository, history records can include a reporting source identifier 358 ("ReportingSource"), indicating what entity was responsible for creating the history record. Similarly, a device identifier 360 ("DeviceID") can be included to indicate on which device the activity associated with the history record 348 occurred.

In at least some cases, at least some individual history records 348, as opposed to summarized information in an activity record 318, can be displayed to a user. A title 362 ("DisplayText") can include text to be displayed to a user in association with the history record 348. The title 362 can be automatically assigned, user-assigned, or default, and can be changed by a user, at least in some cases, as described for the title 306 of the task record 300.

Each history record 348 can be associated with a time at which the history record was created, or, in some cases, updated, such using a report time identifier 364 ("ReportTime"). The value of the report time identifier 364 can be used, among other things, to determine how immediate or recent the history record 348 is. If the value of the report time identifier 364 is recent, it may be more likely that the history record 348 will be updated than if the value is further in the past.

As an example, an application may create a history record 348 indicating that the user is engaging in an activity. The use may be ongoing, and so the duration initially in a history record 348 may be from a period from when the user initiated the activity to a time when the history record was created. Later, the user may stop using the application, and the application may update the history record 348 to reflect the actual time the user spent engaging in the activity. Thus, history records 348 created on a previous day, for example, may be much less likely to be updated than history records created with the past few minutes or hours.

As with task records 300 and activity records 318, history records 348 can have a relevance value that can be used to compare a history record with other activities (or particular history records thereof) a user was contemporaneously engaged in. In at least some cases, as individual instances of an activity are carried out on a single computer device, a history record 348 can include a value of a local relevance identifier 366 ("LocalRelevance") indicating the comparative relevance of the activity instance to other activity instances on the same computer device. By comparing history records 348 for multiple devices, a global relevance value, across multiple computer devices, can be determined and associated with a task record 300 or an activity record 318. However, in other implementations, a global relevance value can be determined for individual history records 348. In other aspects, a global relevance value can be a value that represents a relevance to the user for an activity record 318 or a task record 300 without reference to a specific time period, but which can be determined using information in history records 348 (e.g., a most-relevant activity can be one with history records having the greatest cumulative ActiveTime 356).

A history record 348 can include one or more navigational mnemonic identifiers 368 ("NavigationalMnemonicIDs") for any navigational mnemonic identifiers that have been associated with the corresponding activity instance. The navigational mnemonic identifiers 368 can be used to select navigational mnemonics to be displayed in conjunction with the activity instance associated with the history record 348. The navigational mnemonic identifiers 368 can also be used to retrieve history records 348 that are associated with a navigational mnemonic.

History records 348 can also include additional information that can be used to associate history with other history records, with activity records 318, with task records 300, or with navigation mnemonic records 372. Such information can include people associated with the activity instance (e.g., contacts, collaborators), one or more locations associated with the activity instance (such as determined using a hardware sensor of a computer device), times associated with the activity instance, or content associated with the activity instance.

History records 348 can include more, less, or different information than shown in FIG. 3. History records 348 can include additional information that can be used to associate history records with other history records, with activity records 318, with task records 300, or with navigation mnemonic records 372. Such information can include people associated with the activity instance (e.g., contacts, collaborators), one or more locations associated with the activity instance (such as determined using a hardware sensor of a computer device), times associated with the activity instance, or content associated with the activity instance. History records 348 can also include sharing and permissions information, as described for task records 300.

Navigational mnemonics can be described using navigational mnemonic records 372. In particular examples, navigational mnemonic records 372 can be implemented as an abstract or composite data type, such as a class or a struct.

Each navigational mnemonic record 372 can include a navigational mnemonic identifier 374 ("NavigationalMnemonicID") that uniquely identifies the navigational mnemonic record, such as an integer value. Like history records 348, navigational mnemonic records 372 can be created by various sources, including by an application (e.g., by calling a method of an application program interface), a user activity monitoring service, or a navigational mnemonic feed service, which can be indicated in a report source field 376 ("ReportingSource"). Reporting sources can be used, for example, in selecting or prioritizing navigational mnemonics for use in a display.

A time 378 ("Time") can be included in the navigational mnemonic record 372. The time 378 can be a time the navigational mnemonic record 372 was created or another time that can be used to determine the relevance of tasks, activities, history records, and other navigational mnemonics to a particular navigational mnemonic represented by the navigation mnemonic record. For instance, an application may create a navigational mnemonic record 372 for a significant event (such as news story or well-known event) at a time after the event occurred. Rather than using the creation time of the navigational mnemonic record 372 for the time 378, it may be more appropriate to use the time the significant event occurred. In further aspects, navigational mnemonic records 372 can include fields that allow for both a creation time and one or more other significant times to be recorded. In some cases, a time can be a discrete moment (e.g., a specific instant, such as when a document was saved or a photograph was captured). In other cases, a time can be associated with a duration (e.g., a vacation that lasted for a few days or weeks).

A particular navigational mnemonic can be associated with a type, which can be included in the navigational mnemonic type field 380 ("NavigationalMnemonicType") of a navigational mnemonic record 372. A type 380 of a navigational mnemonic can be, for example, an event, a media item, a person (or other entity), a location, or an object. However, any suitable and desired classification can be used as a type 380, which can be specified at various degrees of granularity. For instance, for some uses, it may be useful to have a type 380 of "person," while in other cases a more suitable type may be "coworkers." Rules can also be defined that retrieve navigational mnemonic records 372 based on types 380 specified at different granularities. For instance, if a type 380 of a navigational mnemonic record 372 is specified as "movie," a search could be specified to obtain navigational mnemonic records of only the type "movie," while another search could be specified to obtain navigational mnemonic records associated with "entertainment content," which could be programmed to retrieve navigational mnemonic records having types of movies, music, books, television programs, etc.

In some cases, a navigational mnemonic record 372 can be associated with one or more specific tasks 382 ("AssociatedTasks"), activities 384 ("AssociatedActivities"), history records 386 ("AssociatedHistoryRecords"), and other navigational mnemonics records ("AscNavigationalMnemonics"), which can be specified using appropriate identifiers. For instance, if a navigational mnemonic record 372 is created by an application, the application may wish to associate the navigational mnemonic record with a specific instance of an activity, represented by a history record, 348, and so a value for the history record identifier 386 can be assigned when the navigational mnemonic record is created.

Navigational mnemonic records 372 can, in at least some cases, include an activation target 390 ("ActivationTarget"), which can be analogous to the activation target 324 of the activity record 318. For instance, if an application creates a navigational mnemonic record 372, it can provide a value for the activation target 390 that launches the application, such as to a particular state, upon detection of appropriate user input, or otherwise displays specified content. In other cases, the activation target 390 can be a command to generate a particular type of display associated with the navigational mnemonic record 372. The navigational mnemonic record 372 can include property information 392 ("Properties"), such as information that allows an application to achieve a particular state after being launched (such as content information).

Title 394 ("DisplayText") and image 396 ("Image") identifiers can provide a human-readable title for the navigational mnemonic of the navigational mnemonic record 372, as well as providing a visual cue for the user to associate with the navigational mnemonic. The value of the image 396 can specify a location or resource for an image, for example, an image of a person, a location, or an event memorialized by the navigational mnemonic record 372.

Navigational mnemonic records 372 can include more, less, or different information than shown in FIG. 3. Navigational mnemonic records 372 can include information that can be used to associate navigational mnemonic records with other navigational mnemonic records, with activity records 318, with history records 348, or with task records 300. Such information can include people associated with the navigational mnemonic (e.g., contacts, collaborators), one or more locations associated with the navigational mnemonic (such as determined using a hardware sensor of a computer device), times associated with the navigational mnemonic, or content associated with the navigational mnemonic. Navigational mnemonic records 372 can also include sharing and permissions information, as described for task records 300.

Collections of tasks records 300, activity records 318, history records 348, and navigational mnemonic records 372 can be maintained in one or more suitable data structures (e.g., queues, lists, heaps, stacks, binary search trees, graphs, and the like), including in a common data structure. As will be further described, such data structures can be searched for members meeting particular criteria (including having a particular relationship with another member), which can then be rendered for display. In addition, an application program interface can provide methods to set and get the various fields of the task records 300, activity records 318, history records 348, and navigational mnemonic records 372.

Example Data Model for Serialized Interaction Representations

Figure 4:
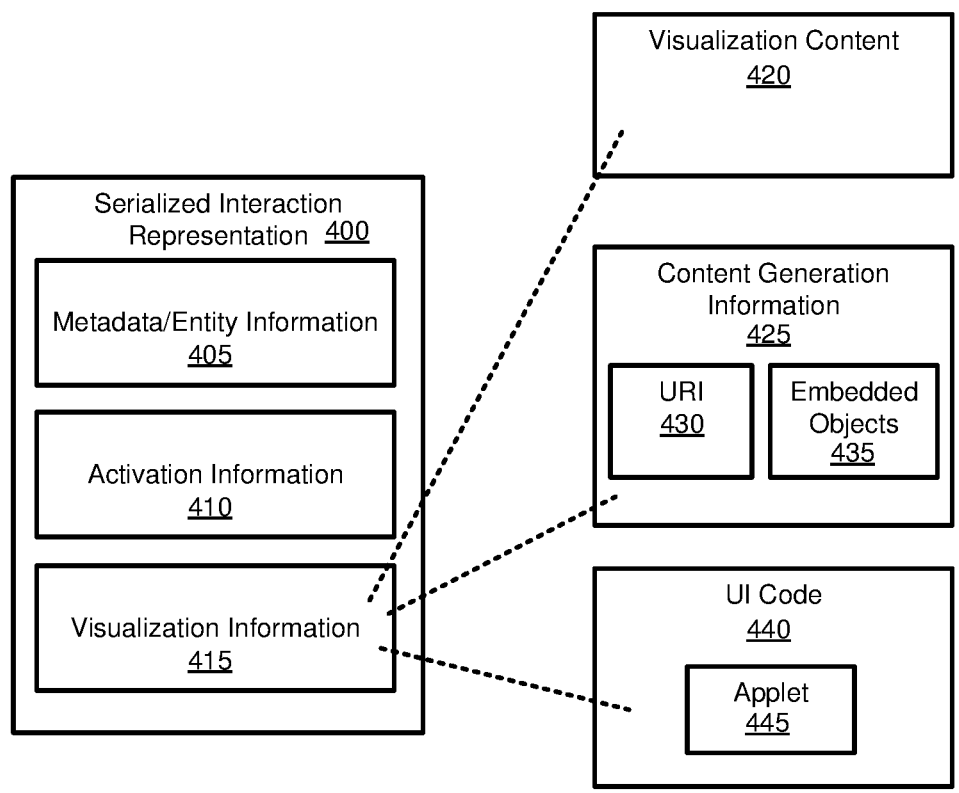
FIG. 4 is a block diagram illustrating an example configuration of a serialized interaction representation.

FIG. 4 illustrates an example data model 400 for a serialized interaction representation according to a disclosed technology. While FIG. 4 provides an example data model 400, in other cases a different data model may be used for a serialized interaction representation without departing from the scope of the disclosed technologies.

The data model 400 includes metadata/entity information 405. The metadata 405 can provide information about a particular instance of the serialized interaction representation, including information about the type of application or content associated with the instance. The metadata 405 can reference one more schema that can be used to interpret the metadata 405, and particular fields and values of the schema.

In further aspects, metadata 405 can be added or modified after an instance of a serialized interaction representation having the data model 400 is created. For example, an application, bot, service, or other source can associate additional metadata fields and/or values with the instance, including metadata fields for an additional or different schema.

In particular cases, schema fields can be included in the metadata 405 for an instance of a serialized interaction representation 400 without having an associated value. For instance, an application that initially generated the serialized interaction representation 400 (or a data type used to generate the serialized interaction representation) may be able to associate the serialized interaction representation with a schema, but may not be able to supply values for all of the associated schema elements. These elements can nevertheless be included in an instance of the data model 405, including so that applications receiving the instance can interconvert the serialized data model 400 to a data type, so that the application is notified that values were not available for the elements, so that an application receiving the instance can supply values for some or all of the elements not originally associated with a value, or so that the instance can receive the values from another source (e.g., an annotation source, such as a source that can be used to supply an ISBN number for serialized interaction representation representing a book, or lyrics or cover art for a serialized interaction representation representing musical content).

The data model 400 can also include activation information 410 (which can be a type of metadata, and optionally included as metadata 405). The activation information 410 can include information regarding a software application used to generate an instance of a serialized interaction representation, or one or more software applications useable to access content associated with the instance. For example, if an instance of a serialized interaction representation 400 represents a web page, the activation information 410 can include information about an application used to generate the instance, and on which the content can be accessed, (e.g. Microsoft Edge), and other applications that may be suitable for accessing the content, including on other devices (e.g., Google Chrome for an Android-based device or Safari for an iOS-based device, or a particular application having different versions for different devices, such as an application for a movie streaming service having different versions of the application for iOS, Windows, Chrome, etc.). The activation information 410 can include information to access content, or an application useable to access the content, such as a URI (Uniform Resource Identifier).

The data model 400 can include visualization information 415. The visualization information 415 (which can be a type of metadata, and optionally included as metadata 405) can include information useable to produce a human-readable representation of an instance of a serialized interaction representation 400 (including after conversion of the instance to an instance of a data type used by an appropriate software application). The visualization information 415 can include textual information describing content associated with the instance, graphical information associated with the instance, information useable to retrieve graphical information associated with the instance, information useable to generate a user interface to interact with the instance, or a combination thereof.

In some cases, the image information 415 can include visualization content 420, which can be content that is contained in the instance of the data model 400 and can be rendered to a user. Visualization content 420 can include text and images, including icons. Visualization content 420 can also include serialized data objects (e.g., data in JSON or XML format) that can include textual and graphical content and information that can be used in formatting or rendering the textual and graphical content. The formatting or rendering information can include user interface elements, such as buttons and input fields. In a particular example, the serialized data object included as visualization content 420 can be a rich card type, such as an AdaptiveCard, of Microsoft Corp. of Redmond, Wash.

Visualization information 415 can include content generation information 425. Content generation information 425 can be information useable to generate or retrieve content. For example, content generation information 425 can include one or more URIs 430, such as a URI that can retrieve a rich card (such as an AdaptiveCard), or one or more embedded objects 435, such as an Open Graph object (which can include or more URIs), or an oEmbed object.

Visualization information 415 can include computer code 440 useable to render a user interface. For instance, the computer code 440 may provide an applet 445 or plugin that provides the user interface functionality. Or, the computer code 440 can be located external to the data model 400 can be referenced by the data model using, for example, a URI. In this scenario, the URI can be used to access (e.g., download) the code 440 upon demand.

In some cases, a particular computing platform (e.g., an operating system, or an operating system combined with particular hardware) or software application may support particular types of visualization information, but not others. The visualization information 415 can include information such that a particular computer device (or application running thereon) can select an appropriate visualization. For instance, the visualization information 415 can include two or more of visualization content 420, content generation information 425, and code 440. A software application receiving an instance of a serialized interaction representation having the data model 400 can select the appropriate visualization information 415 to be used. For instance, if the application is configured to render visualization content 420, but not code 440, the visualization content can be used by the application. For another application, that is capable of rendering the code 440, the code can be used rather than the basic visualization content 420, such as to provide a more attractive display or a greater degree of functionality.

An interaction representation, including an interaction representation data type (such as having data members of FIG. 3) and a serialized interaction representation, can include different information than shown in FIGS. 3 and 4, including additional or alternative information. In some cases, an interaction representation can be associated with an expiration date, or an event that will trigger deletion of the interaction representation. For instance, some interaction representations that are not directly associated with user activity, such as being created by a feed service, can be set to expire after a certain time. Or, interaction representations can be deleted if they have not been accessed by a user within a particular time period.

Interaction representations can also set to be updatable or static. An updateable interaction representation can be updatable, in some cases, by another application modifying data associated with an interaction representation. Or, a user or application may modify a related instance of an interaction representation, and that change can be propagated to related interaction representations. Interaction representations can also be associated with trigger events (including the expiration of a particular time period or occurrence of a particular time), where the interaction representation can change its data, or check for changed data, upon the occurrence of the event. The trigger event can be a request to render or visualize the interaction representation, optionally in combination with another trigger condition (e.g., a request to view the interaction representation after the passage of a certain amount of time or the occurrence of a particular event).

Example Serialized Interaction Representation

FIG. 5 illustrates an example serialized interaction representation instance 500, which can use the data model 400 of FIG. 4. The instance 500 includes the metadata 405, activation information 410, and visualization information 415. In particular, the metadata 405 includes a reference 505 to a particular context that can be used to interpret the data object instance 500. The metadata 405 includes a reference 507 to a particular type (e.g., a particular schema) associated with the context, and field values 510 for at least a portion of the referenced schema. Note that instance 500 does not include all of the elements of the article schema. In at least some cases, schema elements can be added to the instance 500, such as by an application, including an application providing an annotation service.

The activation information 410 includes a primary URI 515 and a secondary, or fallback, URI 520 that can be used, for example, if the primary URI is not available (including not being available because the instance is being used on a different device than a device on which the instance was initially created). In some cases, the fallback URI 520 can be used to install an appropriate software application on the computing device where an interaction representation is to be activated (e.g., if the primary URI specified a Windows application and the device on which the interaction representation is to be viewed is an iOS device). In further cases, the fallback URI 520 can be used to access a resource for accessing the interaction representation, such as accessing a web-based application for viewing the interaction representation when a version of an application originally used to create the interaction representation (and referenced by the primary URI 515) is not available on a device (e.g., a version of an application is not available for the device).

The activation information 410 includes a content URI 525, which can be used to access content to be accessed using the application referenced by the URI 515 or the URI 520. In some cases, the content URI 525 can be the same as the application URIs 515 or 520, while in other cases the content URI can be different. Although a single content URI 525 is shown, if desired, the instance 500 could include multiple content URIs (for instance, a URI to access a local copy of the content and a URI to access a cloud-based copy of the content, or URIs to access the content on different computer devices).

The activation information 410 can also include application identifying data 530. The application identifying data 530 can include a general identifier 535 for an application class (e.g., a class of applications having a particular functionality, or a particular class of applications having different implementations on different platforms, such as different versions of the same word processing program executable on different computing platforms or devices). The application identifying data 530 can include specific application identifiers 535, indicating, for example, specific applications useable to open the associated content on specific computer devices or platforms.

The visualization information 415 includes, with reference to FIG. 4, various types of visualization content 420. The visualization content includes textual information 545 that can be displayed to a user, a URI 550 for an icon that can be displayed, and a JSON object 555 that can provide an AdaptiveCard. Note that the JSON object 555 can duplicate other information provided in the visualization content 420 (or the visualization information 415, more generally). For instance, the JSON object 555 can include information corresponding to the textual information 545 or the URI 550.

Figure 6:
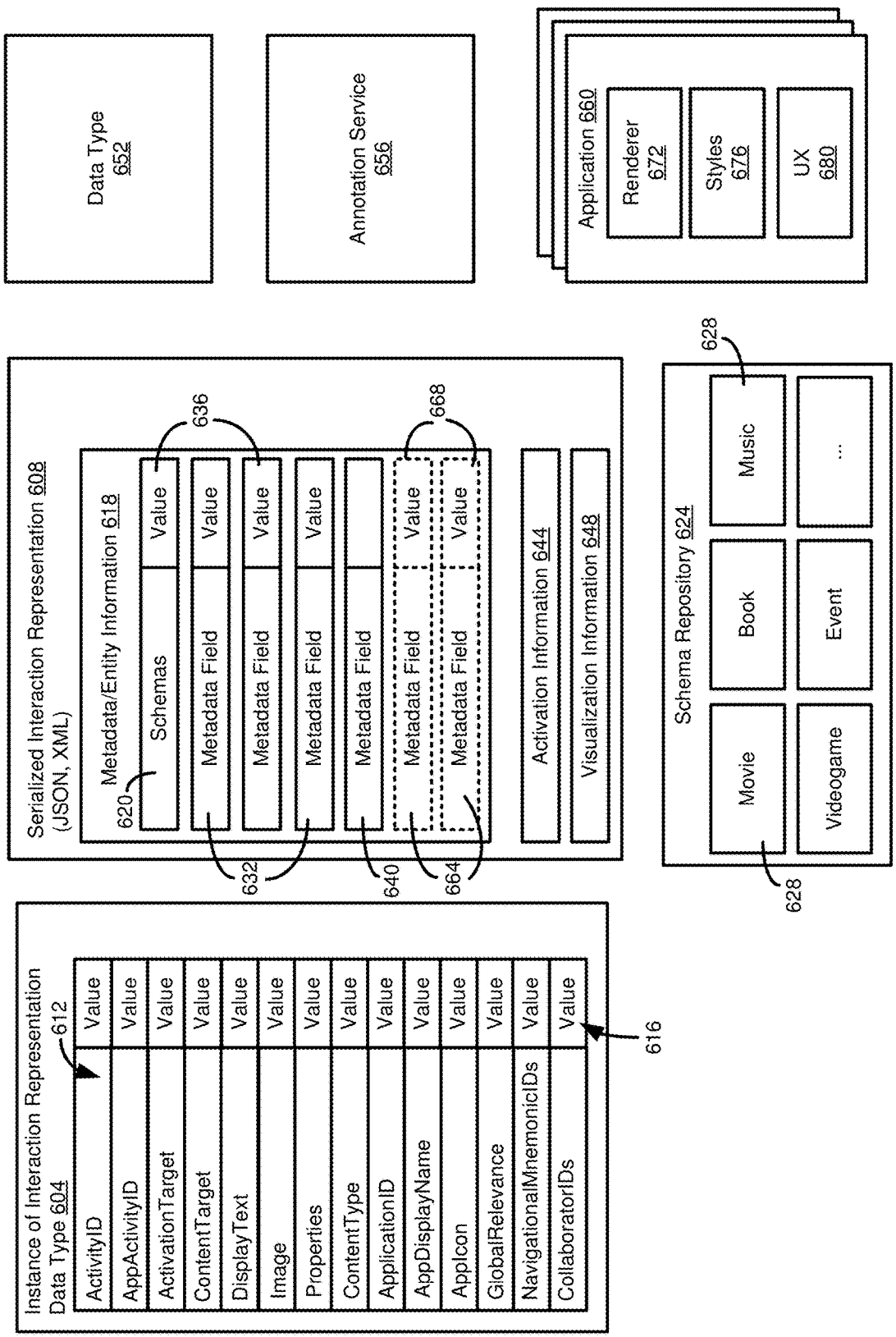
FIG. 6 presents a block diagram illustrating how an interaction representation data type can be converted to a serialized interaction representation, including associating one or more schemas with the serialized interaction representation.

Example Conversion of Interaction Representation Data Type Instance to Serialized Interaction Representation FIG. 6 provides a block diagram illustrating how an interaction representation data type instance 604 can be converted to and from a serialized interaction representation 608. The data type instance 604 can have a plurality of data members 612, which can be associated with one or more values 616. As shown, the data type instance 604 is an activity record, such as the activity record 318 of FIG. 3.

The serialized interaction representation 608 can include an identifier 620 (which can be a type of metadata) for one or more schemas associated with a particular serialized interaction representation. In at least some cases, the identifier 620 may reference an external schema source or repository 624. The schema source 624 can define various types of schema having one or more types 628. Examples of types 628 can be types for a movie, book, musical work, video game, or other types. Each type 628 can be associated with a set of defined metadata fields. The serialized interaction representation 608 can include some or all of the metadata fields of one or more of the types 628, a type specified other than by the schema source 624, or one or more metadata fields that are not associated with, or specified by, a type.

The serialized interaction representation 608 includes metadata 618 having a plurality of metadata fields 632. The metadata fields 632 can be associated with a type (e.g., a type defined by the schema source 624) or not associated with a type. Each metadata field 632 can be associated with a value 636. For example, for a serialized interaction representation 608 that is associated with a type of "book," a metadata field 632 can be associated with an author (e.g., Michael Novak) and another metadata field can be associated with a title (e.g., "My Great New Invention").

The serialized interaction representation 608 can include one or more metadata fields 640 that do not include a value 636. For instance, continuing the "book" example, a metadata field associated with the "book" type can be "ISBN Number." If a book has not been assigned an ISBN number, or the ISBN number is not known, the value of the metadata field 640 can be left blank, or set to a null or similar value indicating that the value is unavailable or not known.

The metadata fields 632, 640 can correspond to the metadata/entity information 405 of FIG. 4. The serialized interaction representation 608 can include activation information 644 and visualization information 648, which can correspond to the activation information 410 and the visualization information 415.

Data associated with the serialized interaction representation 608 can be modified, in at least some cases. For instance, the serialized interaction representation 608 can be dynamically associated with the data type instance 604 (or another serialized interaction representation), such that the serialized interaction representation 608 can be updated when the linked data type instance 604 (or serialized interaction representation) is updated, or can be periodically updated (including upon the occurrence of particular actions or event, or at particular intervals).

The serialized interaction representation 608 can be converted to another data type instance 652, which can be of the same type as the data type instance 604, or of another type. In at least some cases, the data type instance 604 can be converted to the data type instance 652 without passing through the serialized interaction representation 608. For example, the data type instance 604 can be coerced or cast to the data type instance 652, or a method can be called to accomplish the conversion.

The serialized interaction representation 608 can be modified, or updated, in other ways. For instance, the metadata 618 can be modified by an annotation service 656 or application 660 that accesses the serialized interaction representation 608 (e.g., processes or manipulates the serialized interaction representation 608, including another serialized interaction representation instance derived at least in part from the serialized interaction representation 608 or a data type derived at least in part from the serialized interaction representation). The annotation service 656 or application 660 may alter values 636 for metadata fields 632, or add a value for a metadata field 640 that was not previously associated with a value.

The annotation service 656 or application 660 may add additional metadata fields 664 (and/or, optionally, values 668) to the serialized interaction representation 608. The additional fields 664 can represent additional fields from a schema associated with the serialized interaction representation 608 (e.g., metadata fields or values that are associated with a schema for the serialized interaction representation, but whose values were previously not known or otherwise not assigned to the serialized interaction representation). The additional fields can also represent an additional schema type that is to be associated with the serialized interaction representation 608, including a schema type that is related to a currently assigned schema type, such as in a hierarchical relationship. For example, a serialized interaction representation 608 may originally be associated with a "creative work" schema, that can later be refined to "movie" or "book," which can add metadata fields to the "creative work" schema.

FIG. 6 also illustrates that an application 660 (whether or not it updates or modifies data of the serialized interaction representation 608) can include one or more components that can process the visualization information 648 of the serialized interaction representation 608. When the serialized interaction representation 608 includes visualization information 648 that includes visualization content 420, the content (e.g., text or graphical content) can be rendered for display using a renderer component 672. Similarly, when the serialized interaction representation 608 includes content generation information 430, content associated with a URI 430 can be retrieved, or embedded objects 435 processed, and then rendered for display using the renderer component 672.

When the visualization information 648 includes format information, such as a rich card (e.g., an AdaptiveCard), style information 676 (such as defined by a template) can be applied. The style information 676 can cause the visualization information 648 to be formatted to provide a particular look and feel associated with the application 660. Thus, different applications 660 can process the visualization information 648 in different ways to maintain a particular look and feel associated with the application, rather than being limited to a particular defined visual display of the visualization information 648. In at least some cases, the visualization information 648 can specify user interface elements to be provided through a user interface 680 of the application 660, or through user interface code 440 (FIG. 4) associated with the visualization information.

Example Architecture for Exchanging Interaction Representations

Figure 7:
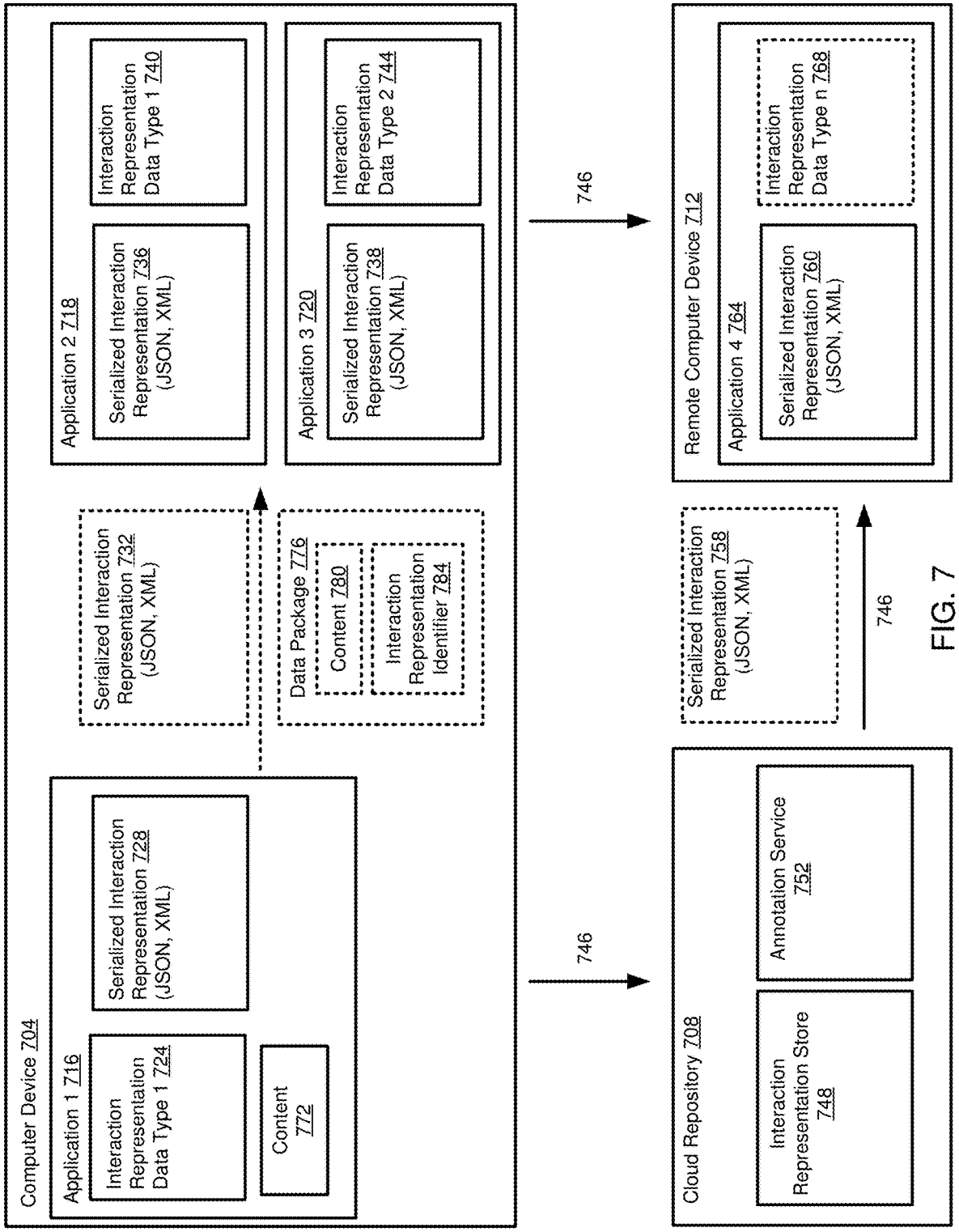
FIG. 7 is a block diagram of an architecture in which applications, and computer devices, can share interaction representations, including as serialized interaction representations and through shareable data types.

FIG. 7 is a block diagram of an architecture 700 illustrating how serialized interaction representations can be transferred between software applications, including software applications on different computer systems or devices. The architecture 700 includes a computer device 704, a cloud repository 708, and a remote computer device 712. In one example scenario, the computer device 704 can represent a desktop or laptop computer of a user and the remote computer device 712 can represent a tablet computer device or smartphone of the user, where serialized interaction representations are synchronized between the computer device and the remote computer device using the cloud repository 708. In another example scenario, the computer device 704 can represent a computer device associated with a first user and the remote computer device 712 can represent a computer device associated with a second user, who may have a relationship with the first user such as a work relationship or a social relationship. Serialized interaction representation instances can be shared, in particular examples, to allow a user to continue to access an interaction representation (and associated content) across different computer devices, or to allow a first user to collaborate with at least a second user. In some cases, in addition to, or instead of, being shared or synchronized using the cloud repository 708, serialized interaction representations can be shared directly between the computer device 704 and the remote computer device 712, or shared in another manner.

The computer device 704 is shown as including a first application 716, a second application 718, and a third application 720. The first application 716 can be associated with a first instance 724 of a first interaction representation data type and a serialized interaction representation 728 of the first instance 724 of the first interaction representation data type. The transportable object representation 728 and the first instance 724 of the first interaction representation data type can be interconverted. In some cases, the first application 716 can generate the serialized interaction representation 728 in order to export data to an operating system or a software application, including based on events of the first application or in response to an external request (e.g., a request from an operating system or another application, which can represent a "shoulder tap" to the first application to provide an interaction representation, including a serialized interaction representation 732).

In at least some aspects, the serialized interaction representation 728 (or an interaction representation, more generally, provided in response to a "shoulder tap") can differ depending on how the representation is generated, such as a different representation being generated in response to an application event than in response to an external request. For instance, an interaction representation generated via an external request may represent a current state of the application and content, and may not be intended for certain kinds of displays, while an interaction representation generated through normal application operation may be intended for a specific view or include information to guide a specific use scenario. In addition, if an interaction representation is initially provided by an application in response to an external request, the application can later provide an updated or replacement interaction representation can be used for the external request, or push other interaction representations based on application events.

An example of a request to an application to generate a serialized interaction representation can be:
[propget] HRESULT ContentMetadata([out, retval] HSTRING* value);
Where the ContentMetadata function returns an entire serialized interaction representation (e.g., an XML or JSON representation). In other cases, one or more functions can be provided for retrieving specific fields to be included in a serialized interaction representation. Retrieving selected fields from an application can be useful, for example, when a serialized interaction representation is to be formed using metadata from multiple applications, including applications at different computer devices.

In another aspect, an interface can be provided to allow an application to specify visualization information for a serialized interaction representation (or other type of interaction representation). An example interface can be:

interface IUserActivityVisualElements : IInspectable
{
   [propget] HRESULT DisplayText([out, retval] HSTRING* value);
   [propget] HRESULT Description([out, retval] HSTRING* value);
   [propget] HRESULT BackgroundColor([out, retval] Windows.UI.Color value);
   [propget] HRESULT ImageIcon([out, retval] Windows.Foundation.Uri** value);
}

The serialized interaction representation 728 can be sent by the first application 716 as serialized interaction representation 732. The serialized interaction representation 732 can be shared with one or more of the second application 718, the third application 720, the cloud repository 708, and the remote computer device 712. Although the first application 716 is shown as including the serialized interaction representation 728, in other cases the first application does not maintain the serialized interaction representation, but generates the representation 732, or causes the representation 732 to be generated.

The serialized interaction representation 732 can be imported by the second application 718 or the third application 720, as serialized interaction representations 736, 738, respectively. The second application 718 is shown as converting the serialized interaction representation 736 into a second instance 740 of the first interaction representation data type. In alternative scenarios, the second application 718 can obtain the second instance 740 from the first instance 724 without having the serialized interaction representation 732 (or any serialized interaction representation) as an intermediate representation. The third application 720 is shown as converting the serialized interaction representation 738 into a first instance 744 of a second data type (which is different than the first interaction representation data type). In alternative scenarios, the third application 720 can obtain the first instance of 744 of the second interaction representation data type from the first instance 724 of the first interaction representation data type without having the serialized interaction representation 732 (or any serialized interaction representation) as an intermediate representation.

Although the serialized interaction representation 732 and the first instance 724 of the first data type have been described as being created and shared by the first application 716, it should be appreciated that the second application 718 and the third application 720 may have data instances or serialized interaction representation instances that are shared with another application.

The cloud repository 708 is configured to receive serialized interaction representations from the computer device 704 and the remote computer device 712. For example, the computer device 704 and the remote computer device 712 can be in communication with the cloud repository 708, and optionally each other, over a network 746, such as the internet, an intranet, or another network. In addition to facilitating the transfer of the serialized interaction representations between the computer device 704 and the remote computer device 712, the cloud repository 708 can store serialized interaction representations (or interaction representation data type instances) in a store 748. The cloud repository 708 can include an annotation service 752. The annotation service 752 can modify serialized interaction representations (or interaction representation data type instances), including adding, removing, or updating metadata, including metadata relating a particular serialized interaction representation to other serialized interaction representations (for example, to establish, remove, or alter relationships between user activities that are represented as serialized interaction representations).

The remote computer device 712 can include a fourth application 764, which can receive the serialized interaction representation 758 as serialized interaction representation 760. The serialized interaction representation 760 can be used by the fourth software application 764, which can optionally convert the representation to a data type 768, which can be the same as interaction representation data type 724 or 744, or can be a different data type.

FIG. 7 also illustrates how content associated with an application can be annotated with a reference for a serialized interaction representation. In particular, the first application 716 is shown as including content 772 (e.g., a file, web page, image, movie, musical work, etc.). Typically, content 772 can be shared between applications (and, in at least some cases, computer device) using a "copy and paste" or "clipboard" paradigm. Typically, content is copied without any, or a significant amount, of metadata regarding its source, or what the content represents. According to an aspect of the present disclosure, content can be exported from an application, such as the first application 716, as a data package 776 (e.g., the data package format of Microsoft Corp. of Redmond, Wash., which is an example of a shareable data type). The data package 776 can include content 780, which is at least a portion of the content 772 (e.g., it can be a selected portion of the content 772). The data package 776 includes a serialized interaction representation identifier 784, which can reference a serialized interaction representation associated with the first application 716 and the content 772. Or, the data package 776 can include the serialized interaction representation.

In at least some aspects, when a request is received to generate a data package 776 (e.g., a "copy and paste" command is received), serialized interaction representation 732 can be generated. In some implementations, such a serialized interaction representation can be generated by the first application 716. In other cases, the serialized interaction representation reference can be generated by an operating system or another program. For instance, some applications may include functionality to generate serialized interaction representations, or data types that can be used to generate serialized interaction representations. For such applications, when a request for a serialized interaction representation (or data type useable to generate a serialized interaction representation) is received, the application can generate the serialized interaction representation (or interaction representation data type instance).

Other applications (such as older or legacy applications) may not include functionality to generate a serialized interaction representation (or related data type instance). In such cases, an operating system, or another program, can generate the serialized interaction representation 736 (or data type instance), although such a serialized interaction representation instance may have less accurate or detailed data than an instance produced by the application itself. In another embodiment, if an application is not configured to generate a serialized interaction representation on request, a program servicing the request (including a component of an operating system) can use a last interaction representation produced by the application (e.g., if the application pushes representations, but does not support pull, the program can use the last pushed representation).

According to another aspect, a serialized interaction representation, or another type of interaction representation (e.g., a particular data type, such as an activity record) can be supported by a shareable format, such as data package, such that one or more interaction representations can be shared between applications. For instance, a user may be able to copy and paste, or drag and drop, a music playlist from a music application to another application, such that the other application can make a view of the playlist available to a user, and provide the ability to activate the playlist (e.g., resume music playback using the music application). The data package may also be used to add serialized interaction representations, or other interaction representations, to a collection (e.g., a set of interaction representations, including a set representing a particular task).

Example Architecture for Forming Interaction Representation Sets

Figure 8:
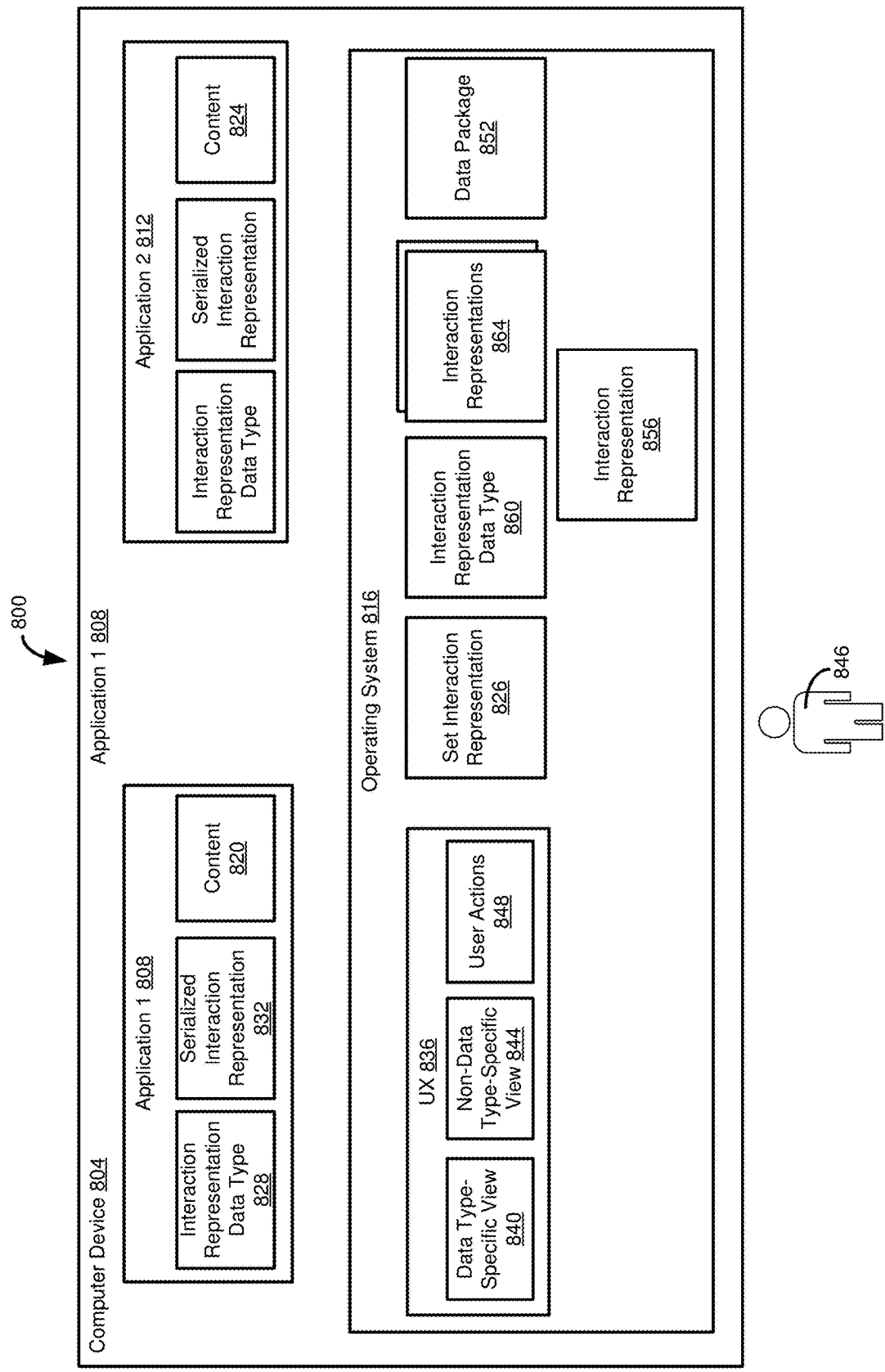
FIG. 8 is a block diagram of an architecture in which one or more interaction representations can be collected in an interaction representation representing a set of interaction representations.

FIG. 8 illustrates an example architecture 800 for a computing system 804 having a first application 808, a second application 812, and an operating system 816. The first application 808 can be associated with first content 820, and the second application 812 can be associated with second content 824. The first application 808 can be capable of generating interaction representation data type instances 828 and/or serialized interaction representations 832.

The first application 808 can periodically generate the interaction representation data type instances 828 or the serialized interaction representations 832. In a particular example, the first application 808 can generate an interaction representation data type instance 828 upon the occurrence of a particular event, including based on a user activity associated with the first application 808 or a temporal event (e.g., the passage of a time interval). At least some of the interaction representation data type instances 828 can be associated with a specific view 840 provided by a user interface 836 of the operating system 816. More particularly, the view 840 can be a view of user-application activity on one or more computer devices.

As another example, a user may copy at least a portion of the first content 820 into the second content 824. As discussed above regarding FIG. 7, such an activity can result in the creating of a data package 852 (e.g., by the operating system 816), and the generation of a serialized interaction representation 856. The data package 852 can be used to transfer the at least a portion of the first content 820 to the second application 812, and to associate the at least a portion of the first content with a serialized interaction representation 856 that the second application 812 can use to obtain additional information regarding the at least a portion of the first content (e.g., if the content is an excerpt of a book, the serialized interaction representation can provide to the second application information regarding the title, author, and publication information for the book).

According to an example scenario, when the user issues a request to cut and paste (or drag and drop) content 820 of the first application 808 into the second application 812, the operating system 816 can issue a request (e.g., through an API method) to the first application 808 to generate a serialized interaction representation 856. The serialized interaction representation 856, or a reference thereto, can be supplied to the second application 812 along with the appropriate content 820.

The user interface 836 can provide other views 844, which are not associated with the interaction representation data type, or the view 840 therefor. For instance, a view 844 can be of a collection of interaction representations that have been organized into a group or set. The group can be created (including by a user 846) because of a particular relationship (e.g., they are related to a particular task), or merely because the user 846 has indicated a desire to group the interaction representations. The user interface 836 can support user actions 848 relate to interaction representations, including the creation and association (e.g., grouping) of interaction representations, which can be represented as interaction representation data types or serialized interaction representations, the creation of instances of interaction representation data types or serialized interaction representations, and the manipulation of the first content 820.

As an example, a user 846 may wish to create an association between the first application 808 and the first content 820 and the second application 812 and the second content 824. The combination of such applications 808, 812, and their respective content 820, 824 can represent, for example, a particular task that a user 846 is working on, some other relationship in the mind of the user. In one scenario, a user may be engaging in a work related project with a word processing program and an associate document and a spreadsheet program and an associated workbook. In another scenario, a user 846 may have been working on a word document while listening to a particular musical playlist, and may wish to resume the combined activity at a later date.

In a particular aspect, an association between two interaction representations can be stored in a serialized interaction representation representing the set. This set serialized interaction representation 826 can be modified (e.g., to add or remove references to other serialized interaction representations), shared (e.g., between applications on the same or different computer devices or between an application and an operating system), converted to an interaction representation data type 860 (e.g., a task, such as the task record 300 of FIG. 3), or deleted. In another aspect, an interaction representation 826 for a set can include the actual component interaction representations 864, rather than merely including a reference useable to identify the component interaction representations.

When an interaction representation for a set is shared with another computer device (or in some cases, another application on the same computer device), the set can be shared in different ways. In a particular aspect, the interaction representation 826 for the set is shared, but not interaction representations 864 for the set members. In another aspect, the interaction representation 826 for the set is shared as well the interaction representations 864 for the set's components. In a further aspect, the interaction representations 826, 864 for the set and its components can be shared, and the underlying content can be shared. Content sharing can be accomplished by sending a copy of the content or making the content available to external users. In some cases, sharing of sets can be carried out progressively, with a smaller amount of information being sent initially and a greater amount of information being retrieved when needed or requested.

Example Set Types

Figure 9:
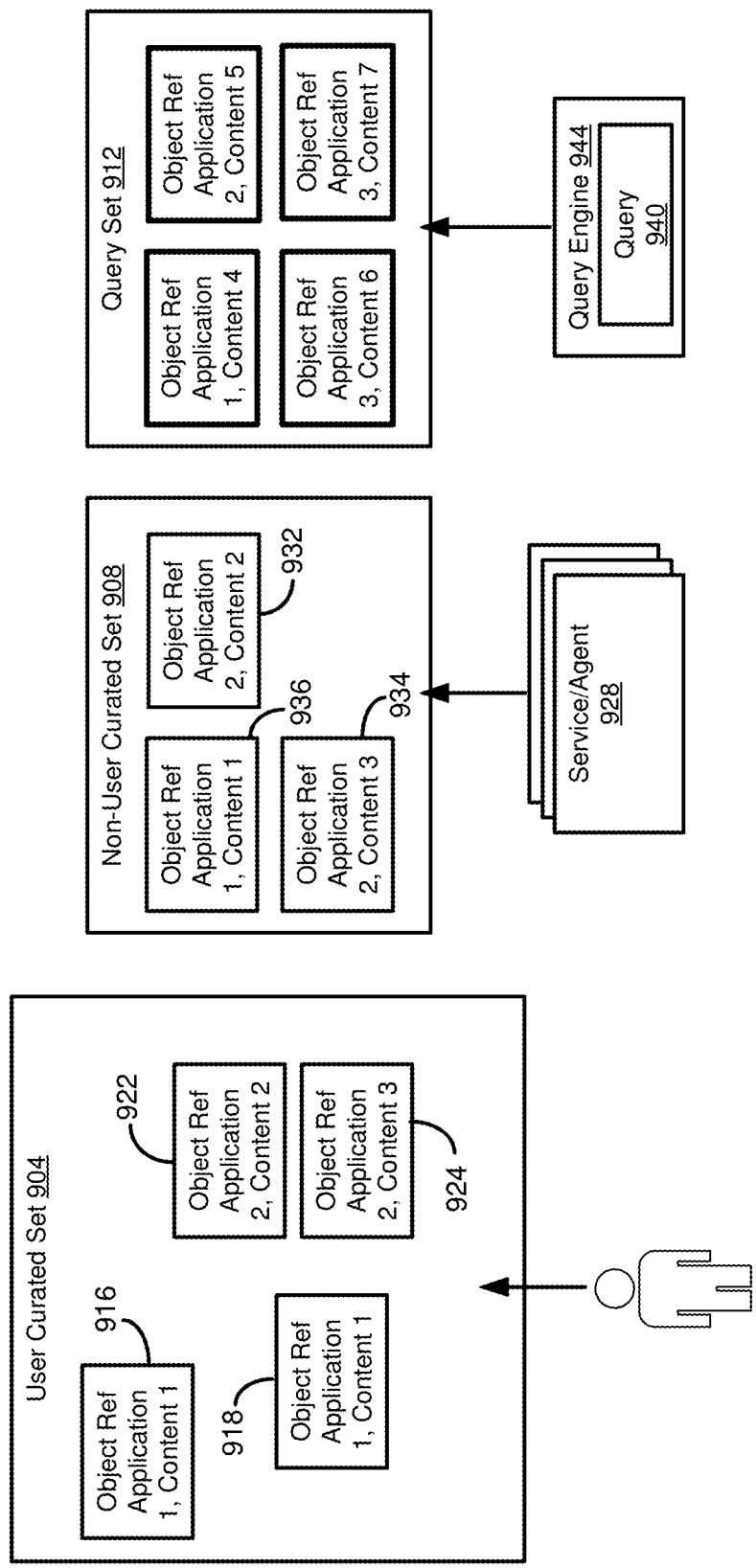
FIG. 9 is a block diagram illustrating different types of sets of interaction representations.

FIG. 9 illustrates example collections, or sets, of interaction representation data types or serialized interaction representations. As described with respect to FIG. 8, a collection can be implemented as a serialized interaction representation, such as a serialized interaction representation having a schema associated with sets of interaction representation data types or serialized interaction representation equivalents thereof. In addition to indicating that the serialized interaction representation represents a set, the serialized interaction representation for the set can include an identifier for a type of the set. The type of the set can be used to implement rules for the set, including rules implemented in a data type (e.g., an abstract data type) used to represent the particular set type.

FIG. 9 illustrates three types of sets, although a particular implementation need not implement all set types, or can implement additional or alternative set types. The set types shown in FIG. 9 are a user-curated set 904, a non-user curated set 908, and a query set 912.

The user-curated set 904 can represent a set where a user manually creates and modifies the set, or the set is created and modified according to user activity (e.g., an operating system component or application can infer the creation, modification, and deletion of sets based on user activity, including patterns of user activity, or one or more rules, including rules developed from analyzing the behavior of a plurality of users). A user-curated set 904 can maintain information not just about what interaction representations are associated with the set, but also positional information associated with a display of the interaction representations. For instance, when a user has multiple applications open, each application is associated with a particular position on the display (and, in the case where the user has multiple displays, including when multiple devices are being used, a particular display and a particular position on the particular display), and the user-curated set 904 can maintain such positional information. This information can be beneficial, for example, when a user wishes to reengage one or more interaction representations in the set 904, as not only can the application and its associated content be resumed, but it can be resumed at a display position (including on a particular display, and a particular device), where the user last engaged in the activity. Users will often position applications on a display (or displays) so as to facilitate their use of the applications and their associated content, including in combination with other applications/content.

User-curated set 904 includes activities 916, 918 associated with a first application, where the activities are both associated with first content (e.g., two instances of a word processor with the same document being open in both instances, but possibly at different positions within the document, or a music playlist that includes the same song multiple times, because the user really likes the particular song, and different instances of the song in the playlist may have different playback positions within the song). User-curated set 904 also includes activities 922, 924, each associated with a second application, but with different content (e.g., two music applications with different songs active in the applications). Although not shown, user-curated set 904 can include a single instance of an application, and content being accessed by a single application. As the set 904 is user-curated (either directly or indirectly based on user activity), the set in permitted to contain interaction representation where applications and/or their associated content are duplicated in the set.

Although the set 904 is user-curated, in some aspects an operating system or software application can suggest content or interaction representations to be added to the set. For instance, user activity can be analyzed to determine other interaction representations that could be added to the set 904, including based on analysis of the user's prior behavior, or the behavior of a plurality of users. Interaction representations can also be suggested for addition to the set 904 by a service or agent. For instance, if a user engages with some content in a set 904, and then interacts with other content, the other content (an interaction representation therefor) may be suggested for possible addition to the set.

Non-user curated set 908 can represent a set formed by one or more services or agents 928, which can be local to a particular application or computer device, or can be located at a remote computer device. A service or agent 928 can select particular interaction representations to include in the set 908, including based on various rules. At least some of the interaction representations in the set 908 may be based at least in part on user activities with software applications. However, typically one or more rules are used to select particular interaction representations to include in the set 908, such as activities carried out at a particular time or with which a user has more prominently engaged within a particular timeframe. In some cases, the service or agent 928 can incorporate user feedback, such as a user "favoriting" or "pinning" a particular item (e.g., content item), which then is added to a non-user curated set 908.

A service or agent 928 can also include interaction representations in the set 908 that are not directly based on user activities. For instance, the service or agent 928 can add an interaction representation associated with a news outlet (e.g., a web browser and a particular story on a particular web page).

In contrast to the user-curated set 904, in at least some aspects of the present disclosure, a non-user curated set 908 does not include exact duplicates of interaction representations. That is, while multiple instances of an application can be included in the non-user-curated set 908, the instances are associated with different content. The set 908 does not include multiple instances of the same application and the same content. In some cases, a non-user curated set 908 can include multiple instances of the same content if associated with different applications. In other cases, the set 908 does not include multiple instances of the same content, even if different applications are associated with the content.

As shown in FIG. 9, non-user-curated set 908 includes two instances 932, 934 of application 2, associated with, respectively, second and third content, where the second and third content are different from each other. The non-user-curated set 908 also includes an instance 936 of a first application, associated with first content, where the first content is different than the second or third content. Accordingly, the non-user-curated set 908 does not include any interaction representations that duplicate particular content.

In the described embodiment, in a non-user-curated set 908, particular content is either in the set or is not. Correspondingly, the non-user-curated set 908 does not include positional information to determine the relative position of interaction representations in a display of the set. In at least some cases, a display of the set 908 can be associated with an ordering rule. In a more specific example, the ordering rule can be the rule (or rules) used to select interaction representations for inclusion in the set 908.

In at least some aspects, a user may be permitted to modify the contents of a non-user-curated set 908, either by modifying the set or by converting the set to a user-curated set 904. In at least some aspects, if a user is allowed to modify a non-user-curated set 908, the user is not allowed to deviate from rules associated with the set (such as associating interaction representations with particular positional information in a display, apart from altering a rule used to select or display interaction representations, or including duplicate activity information in a set).

The query set 912 includes interaction representations associated with a particular query 940 executed by a query engine 944. A query 940 can be, for example, for interaction representations meeting particular criteria. Typically, rules for a query set 912 are similar to rules for a non-user curated set 908, in that a query set typically is not allowed to contain duplicate items, and the interaction representations are not associated with a user-selected display position. Rather, the interaction representations are typically displayed in an order associated with the query 940, such as by relevancy, type, chronology, etc. In at least one implementation, a query set 912 is not modifiable by a user (although it may be converted to another type of set, such as a user-curated set 904, and then modified). However, the items in a query set 912 can change, such as when the query 940 is modified or the queried items change.

Although FIG. 9 illustrates sets 904, 908, 912 having interaction representations, at least in some aspects, sets can have additional components. For instance, a set can include one or more navigational mnemonics. In addition, content items, such as a file or image, can be added to a set. In at least some cases, when a content item is added to a set, an interaction representation can be generated for the content item, and can include a URI to access the content (and, in some cases, the content can be moved or copied to a particular location to facilitate future access).

Example Update of Interaction Representations

Figure 10:
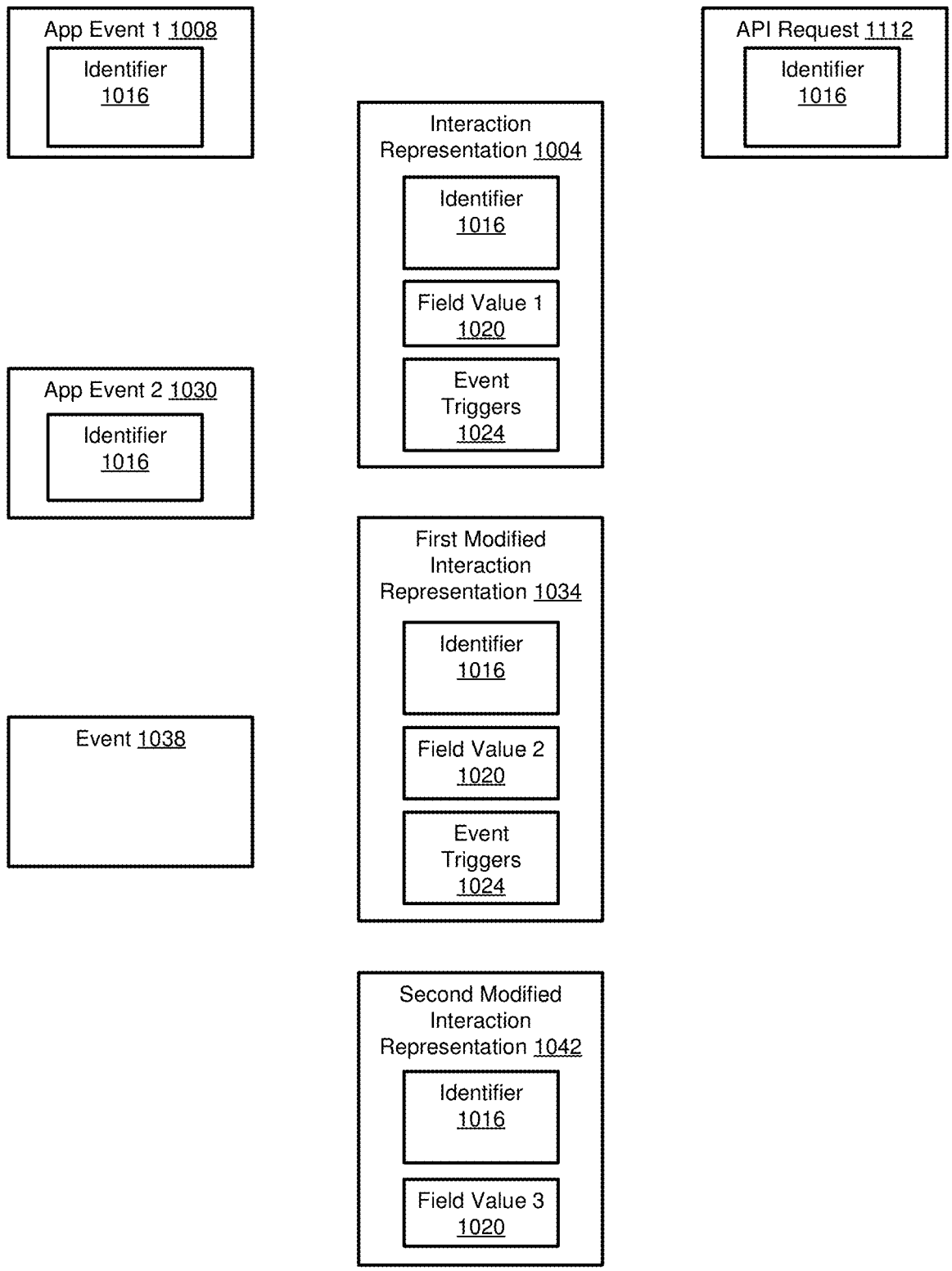
FIG. 10 is a block diagram illustrating a scenario for updating data in an interaction representation.

FIG. 10 illustrates how an interaction representation 1004 (e.g., an instance of a particular data type for an interaction representation or a serialized interaction representation) can be updatable. The interaction representation 1004 can be originally created by an application event 1008 or an external request 1012, such as a request through an API. The created interaction representation 1004 includes an identifier 1016 for the interaction representation, a first field value 1020, and, optionally, one or more event triggers 1024. The application can also maintain the identifier 1016.

A second application event 1030 can result in the modification of the first field value 1020. In some cases, the application can modify the first field value in a copy of the interaction representation accessible by the application. The change to the interaction representation by the application can be eventually propagated to the interaction representation 1004. For instance, the application can change the field value and then call a method to update related interaction representations. Or, a service can periodically check the interaction representation maintained by the application to determine if the representation has changed. Alternatively, the application need not maintain a version of the interaction representation, but can include a method to update related interaction representations (e.g., interaction representations including a suitable reference to the identifier 1016).

Updating the interaction representation 1004 as a result of the second application event 1030 provides first modified interaction representation 1034. First modified interaction representation has field 1020 updated to the second value.

The occurrence of an event 1038 matching one of the event triggers 1024 can produce a second modified interaction representation 1042, having a third value for the field 1020. In some cases the third value can be supplied by the event 1038. In other cases, the third value can be supplied in another manner, including a defined value associated with the event trigger 1024.

As an example of an updateable interaction representation 1004, the interaction representation can represent a webpage for tracking a package. The first application event 1008 can represent a user initially visiting a webpage, or an interaction representation created by a shipping company or a party shipping a package. The second application event 1030 can represent a change in the shipping status of the package, such as a change in a current location of the package. An event specified in an event trigger can be, for example, the passage of a defined period of time. For instance, the application trigger 1024 may be configured to check periodically for an updated package status. In some cases, checking updated package status may not result in updating a value for the field 1020. For example, if the package status has not changed, no changes may be made to the interaction representation 1004 (other than, at least in some cases, updating the event trigger 1024, such as to start the next time interval after which another status check will occur).

Some interaction representations can be configured to be indefinitely updatable. Other interaction representations may have limited updatability. For instance, in the package tracking example, no further updates may occur after the package is delivered (or some other final disposition is made, such as the package being determined to have been lost or damaged). In yet further examples, some interaction representations may not be updateable.

In particular aspects, a common activity (e.g., a particular user-interaction with an application and particular content) can be associated with a plurality of interaction representations, some of which may be updateable and some of which may not be updateable. For instance, when an interaction representation is associated with a set of related interaction representations (e.g., a particular work project), it may be beneficial to periodically update the associated interaction representations, including, for example, to account for user activity that may have occurred on a different device. In a particular scenario, a user may be reading a document on a first device, and may reach a first page. The user may continue reading the document on a second device, and may reach a second page. An interaction representation on the first device can be related to a corresponding interaction representation on the second device, including via an identifier. The identifier can be used to update the interaction representation on the first device with the updated page number from the interaction representation on the second device. In this way, if the use beings reading the document on the first device again, they can pick up reading from where they left off on the second device.

In other contexts, it may be undesirable to update interaction representations. For instance, a user can be provided with records of their historical application activity. Thus, if a user wishes to view or resume an activity they previously engaged in, at a particular point in time, it would be disruptive to change that interaction representation based on later user activity. So, continuing the example above, if a user wished to view or resume their reading activity on a particular day, a user interface may provide the non-updatable interaction representation. If a user instead uses an interface for the interaction representation set, the updateable set interaction representation can be provided. Again, the same application and the same content can be associated with multiple interaction representations, which can have different properties, can be of different types (e.g., one can be of a first data type and another can be of a second data type, or one can be of a first data type and another can be a serialized interaction representation).

Figure 11:
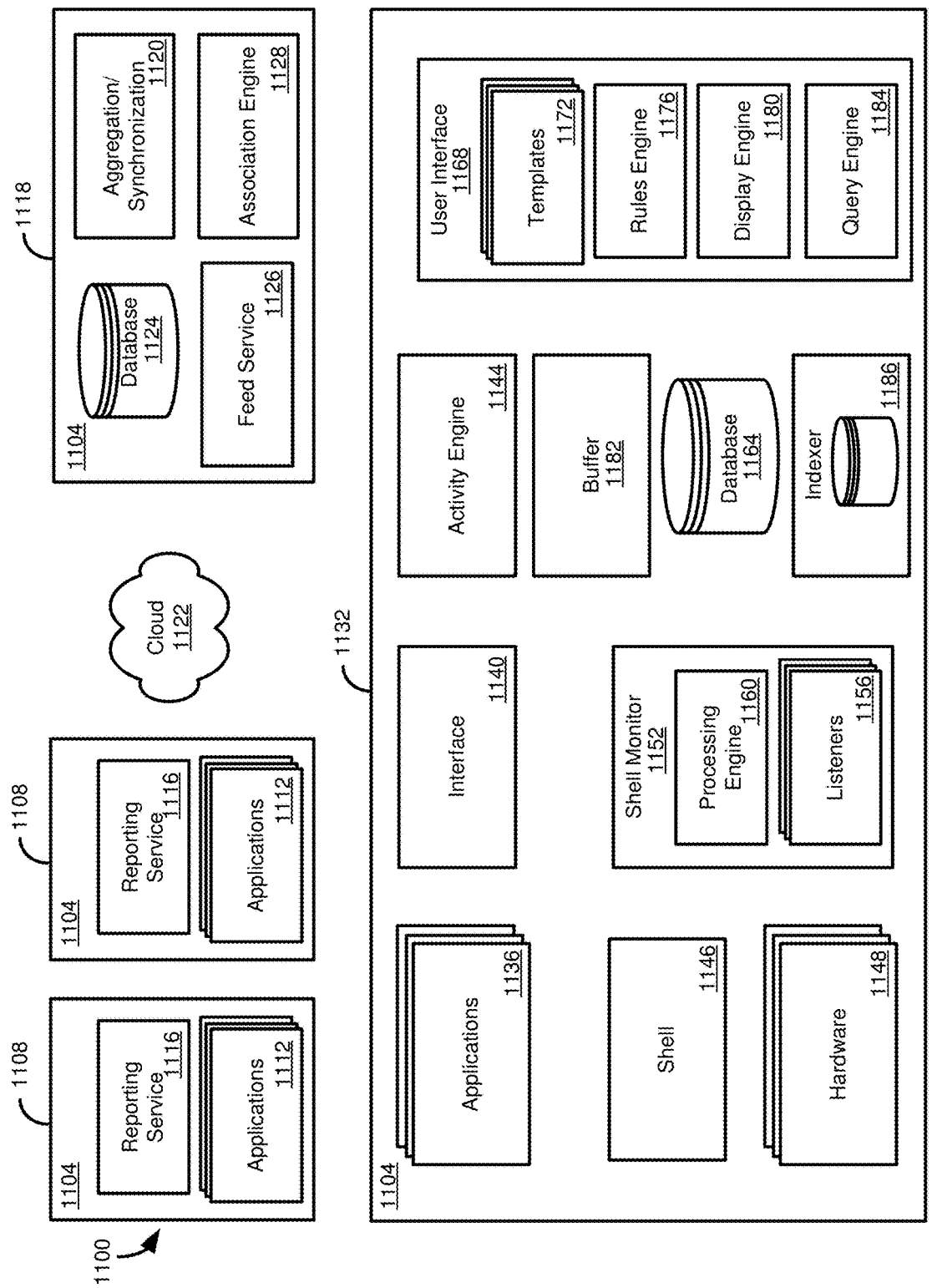
FIG. 11 is diagram of an example architecture in which the described technologies can be implemented.

Example Architecture for Capturing, Transferring, and Displaying Interaction Representations and Navigational Mnemonics FIG. 11 illustrates an example architecture 1100 that can be used to implement technologies of the present disclosure. The architecture 1100 includes a plurality of computer devices 1104. The computer devices 1104 can include, for example desktop computers, laptop computers, tablet computers, smartphones, game consoles, smart televisions and appliances, and wearable technologies, such as smartwatches and smart glass. The computer devices 1104 can include lightweight or heavyweight implementations of navigational mnemonic and interaction representation monitoring or reporting, and user interfaces for accessing the results thereof.

For example, computer devices 1108 include lightweight implementations of interaction representation and navigational mnemonic monitoring or reporting. Each of the computer devices 1108 can include a plurality of applications 1112. A reporting service 1116 can collect information reported by the applications 1112, such as through an interface, and send it to a computer device 1118 hosting an aggregation/synchronization component 1120.

The computer devices 1104 can be connected through a network or cloud 1122 (e.g., being connected through an internet, an intranet, another network, or a combination of networks). In some cases, the reporting service 1116 can also send information to other computer devices 1104, including those that include heavyweight implementations of interaction representation and navigational mnemonic monitoring or reporting, such as computer device 1132. The reporting service 1116 can allow applications 1112 to make various calls to an interface, such as an interface that provides for the creation or modification of information regarding interaction representations, including information stored in one or more of task records, activity records, history records, and navigational mnemonic records (e.g., the task records 300, activity records 318, history records 348, and navigational mnemonic records 372 of FIG. 3, or the serialized interaction representation 400 of FIG. 4).

The aggregation/synchronization component 1120 can collect interaction representations from one or more of the computer devices 1104. The collected information may be used to update interaction representations stored on one or more of the computer devices 1104. For example, the computer devices 1108 may represent mobile devices, such as smartphones or tablet computers. Computer device 1132 may represent a desktop or laptop computer. In this scenario, the aggregation/synchronization component 1120 can send information regarding the mobile devices 1108 (e.g., interaction representations) to the desktop/laptop 1132, so that a user of the desktop/laptop can be presented with a comprehensive view of their content-interactions across all of the computer devices 1104, including relative to navigational mnemonics that may be common to multiple computer devices or specific to a particular computer device. In other scenarios, the computer devices 1108 may also be sent information regarding interaction representations on other computer devices 1104, including the computer device 1132.

The aggregation/synchronization component 1120 can carry out other activities. For instance, the aggregation/synchronization component 1120 can supplement or augment data sent by one computer device 1104, including with information sent by another computer device. In some cases, the aggregation/synchronization component can associate history records for an activity carried out on one computer device 1104 with a task having another activity carried out using another of the computer devices.

The aggregation/synchronization component 1120 can also resolve conflicts between data received from different computer devices 1104. For instance, conflicts can be resolved using a rule that prioritizes interaction representations or navigational mnemonics from different devices, prioritizes interaction representations or navigational mnemonics based on when the interaction representations or navigational mnemonics were generated, prioritizes interaction representations or navigational mnemonics based on a reporting source, such as a particular application or a shell monitor component, such as if two computer devices include interaction representations for the same activity at overlapping time periods.

For example, if a user was listening to music on two computer devices 1104, the playback position in the same content may differ between the devices. The aggregation/synchronization component 1120 can determine the appropriate playback position to associate with the activity. Thus, the aggregation/synchronization component 1120 can determine "true" data for an interaction representations, and can send this information to one or more of the computer devices 1104, including a computer device on which the activity was not carried out, or updating data at a device where the activity was carried out with the "true" data.

In particular aspects, information from interaction representations and navigational mnemonics can be shared between different users. Each user can have an account in the computer device 1118, such as stored in a database 1124. Records for interaction representations (including history records therefor) and navigational mnemonics can be stored in the database 1124 in association with an account for each user. Persisting interaction representations and navigational mnemonics in a remote computing system 318 can be beneficial, as it can allow interaction representations and navigational mnemonics to be provided to the user, without including a file-representation that needs to be managed by a user. When information for an interaction representation or navigational mnemonic is received, and is to be shared with one or more other users, the shared information can be stored in the accounts for the other users, such as using the collaborator identifiers 314, 346 of FIG. 3.

The distribution of information between different user accounts can be mediated by the aggregation/synchronization component 1120. In addition to distributing information to different accounts, the aggregation/synchronization component 1120 can translate or format the information between different accounts. For instance, certain properties (e.g., applications used for various types of files, file paths, account information, etc.) of interaction representations or navigational mnemonics may be specific to a user or specific devices of the user. Fields of the various records can be replaced or updated with appropriate information for a different user. Accordingly, a user account can be associated with translation rules (or mappings) defining how various fields should be adapted for the user.

The aggregation/synchronization component 1120 can also synchronize data needed to use any records received from another user, or from another device of the same user. For instance, records shared with a user may require an application or content not present on the user's device. The aggregation/synchronization component can determine, for example, whether a user's computer device has an appropriate application installed to open content associated with an interaction representation. If the application is not present, the application can be downloaded and installed for the user, or the user can be prompted to download and install the application. If the content needed for a record is not present on the user's computer device, the content can be sent to the user's computer device along with the record, or the user can be prompted to download the content. In other examples, interaction representations can be analyzed by a receiving computer device, and any missing content or software applications downloaded or installed (or other action taken, such as prompting a user to download content or install applications) by the receiving computer device.

In the case of navigational mnemonics for the same content-interaction carried out at different computer devices, in particular aspects, an interaction representation can be simply associated with all of the navigational mnemonics. In some cases, a record for a navigational mnemonic can include an identifier of a device on which the navigational mnemonic was generated, or with which the navigational mnemonic is associated (for instance, a location visited by the user as detected by a smartphone in the user's possession). Thus, this navigational mnemonic may be associated with both the determined location and the particular computer device.

The computer device 1118 can also host a feed service 1126. The feed service 1126 can collect and/or store interaction representations or navigational mnemonics) that may not be reported by a computer device 1104 (although, in some cases, interaction representations or navigational mnemonics of the feed service can overlap or duplicate one or more interaction representations or navigational mnemonics reported by a computer device), and may not be related to user content-interactions carried out on the computer devices 1108, 1122.

The feed service 1126 can be fully or partially curated. For instance, an administrator may determine interaction representations and navigational mnemonics to be added to the feed service 1126. Navigational mnemonics added by the administrator can be, for example, events the administrator thinks are likely to be memorable to many users, a particular class of users, or even a particular user. Curation may include allowing particular sources (e.g. companies, applications, websites) to register navigational mnemonics for the feed service 1126. Similarly, the feed service 1126 can be used to suggest to a user particular content they may wish to interact with, including particular content to be added to a set of content interactions (e.g., a set of interaction representations).

In other aspects, population of the feed service 1126 can be fully or partially automated. Interaction representations and navigational mnemonics of the feed service 1126 can include type or classification information that can be used to help match interaction representations and navigational mnemonics to particular users or classes of users, which may provide interaction representations and navigational mnemonics that are more likely to be useful to a particular user.

For example, the feed service 1126 can include rules to determine interaction representations and navigational mnemonics to be added. A rule may state that the top five most viewed news stories for a day should be added as navigational mnemonics or interaction representations. Interaction representations and navigational mnemonics can also be added based on the analysis of interaction representations and navigational mnemonics reported by multiple users. A rule may state that the top five most popular navigational mnemonics are to be added to the feed service 1126. Rules can be defined at a more granular level, such as stating the top five navigational mnemonics reported by users associated with a particular company will be added to the feed service 1126 for other users associated with the company.

In some cases, content information can be provided to the user in order to provide the user with information that may be of interest to the user. Interaction representations and navigational mnemonics provided by the feed service 1126 may represent news stories, media items (e.g. movies), or events (e.g., concerts, plays) that the user may wish to learn more about. The feed service 1126 can store information to indicate whether a particular content item should be used as a navigation aid (e.g., a navigational mnemonic), as an information suggestion (e.g., an interaction representation), or both. In particular examples, a navigational mnemonic can be provided as a navigation aid, but can be associated with additional information regarding the navigational mnemonic in the event the user was not aware of the subject matter of the navigational mnemonic and wishes to obtain more information about it (e.g., to obtain a copy of the suggested media content or read a news story), or the navigational mnemonic itself is otherwise of specific interest to the user. In this way, a computing environment incorporating the disclosed technologies can provide more value to the user.

In order to help better associate interaction representations and navigational mnemonics, such as interaction representations and navigational mnemonics of the navigational mnemonic feed service 1124, with a particular user, the computer device 1118 can include an association engine 1126. The association engine 1126 can implement one or more techniques for associating particular interaction representations and navigational mnemonics of the feed service 1124 with particular users. The techniques can include machine learning and rules, including heuristics. For instance, a rule can state that navigational mnemonics associated with a particular company will be displayed to users who are also associated with the company. A heuristic can be established that a user typically views a news website every day, and so interaction representations or navigational mnemonics associated with that website will be displayed to the user. Machine learning can be used to analyze what interaction representations and navigational mnemonics are most (or least) used by one or more users in order to develop rules that can be used to associate interaction representations and navigational mnemonics with particular users. Machine learning can also be used to determine what types of interaction representations and navigational mnemonics are most likely to be used by a user under particular circumstances (e.g., for a particular interface or search or browsing modality engaged in by a user).

Turning to the heavyweight implementation of the interaction representation and navigational mnemonic monitoring and reporting service on the computer device 1132, the computer device can include a plurality of applications 1136. The applications 1136 can directly create and modify interaction representations and navigational mnemonics through an interface 1140. The interface 1140 can provide access to methods of an activity engine 1144, which can create or modify interaction representations and navigational mnemonic records.

In addition to interaction representations and navigational mnemonic information received directly from the applications 1136 through the interface 1140, the computer device 1132 can receive interaction representations (or navigational mnemonics) by monitoring user activity, such as user activity associated with the shell 1146 (e.g., an interface to services provided by an operating system of the computer device 1132). Information associated with the shell 1146 can include interactions with hardware devices 1148, such as secondary storage devices, printers, pointing devices, keyboards, and other accessories. Interactions can include, for example, creating, opening, or closing a file, pointing activity (e.g., mouse clicks and cursor manipulation), keyboard input, and commands to print a document.

Shell activities can be monitored by a shell monitor component 1152. The shell monitor component 1152 can include listeners 1156 for various user actions, such as listeners for hardware actions, listeners for keyboard or pointing device input, listeners for network activity, listeners for calls to the audio or video systems of an operating system, listeners for determining open and in-focus applications, and the like.

The shell monitor component 1152 can further include a processing engine 1160. The processing engine 1160 can analyze the various user actions (e.g. opening a file with a particular application) to associate the actions with particular applications 1136 and to create history records or navigational mnemonic records that are provided to the activity engine 1144. The activity engine 1144 can associate the history records with appropriate interaction representations, or create new interaction representations as appropriate. The activity engine 1144 can associate navigational mnemonic records with appropriate interaction representations, or can store a navigational mnemonic record without immediately associating it with interaction representations, or other navigational mnemonics.

As an example of how the activity engine 1144 can create navigational mnemonics based on user activity, a user may engage in audio or video communication with another person using the computer device 1132, such as in a telephone call or using a voice over internet protocol client (e.g., the Skype service of Microsoft Corp. of Redmond, Wash.). This user activity can be associated with the particular person (or people) with whom the conversation was held. In addition, the conversation can be associated with the location of the user during the conversation, such as whether the user was at a coffee shop, their place of work, their home, in an airport, etc. The location can be determined, in some aspects, using a hardware device 1148, such as a GNSS receiver, by analyzing a location associated with a Wi-Fi access point, or by determining a location associated with an internet protocol address associated with the computer device 1132.

The identities of the person (or people) with whom the conversation was held, the location of the user during the conversation, or both, can be used as navigational mnemonics. For instance, if the user sees a name or an image of a person with whom they were speaking, and/or a location associated with the conversation, the user may associate that information with the subject matter of the conversation, including activities the user may associate with a conversation, such as a document they were editing or a website they browsed that was the subject matter of the conversation. Or perhaps the conversation was regarding a media item (such as a movie) that the user watched at a later time based on a recommendation the user received during the conversation.

While a navigational mnemonic is not an activity, it can have elements that are common to activities, including to activities that a user engaged in that occurred in temporal proximity to a navigational mnemonic, or which otherwise have a relationship to a navigational mnemonic. In the above example, the conversation can be an activity, which can be associated with an activity record, or a particular history record. The activity or history records can include the identities of the people involved in the conversation, and information regarding the location of the user during the conversion. However, the navigational mnemonic is not the conversation, but a person with whom the conversation was held or a location of the user during the conversation.

While the navigational mnemonic may be associated with the conversation (the activity), in the mind of the user, in the records for the navigational mnemonic or activity, or both, the navigational mnemonic may be used to locate other activities or navigational mnemonics, including activities or navigational mnemonics that are not directly related to the navigational mnemonic associated with the conversation. For instance, the user may be looking for an activity that they recall engaging in before or after the conversation or that is otherwise unrelated to the conversation. Thus, using navigational mnemonics, the disclosed technologies can facilitate information retrieval by the user even for information that is not directly associated with a navigational mnemonic.

The activity engine 1144 can also create, or suggest for creation, interaction representations representing a set of interaction representations, or add or suggest for adding interaction representations to an existing set. As an example, if a user is engaged with multiple applications over a period of the time, the activity engine 1144 may determine that the user is likely carrying out a common purpose using the applications. Similarly, if the user routinely uses several applications in combination, the activity engine 1144 may determine that when the combination of applications is in use that the use likely relates to a common purpose, and so may create, or suggest for creation, a set interaction representation. If the user creates a set interaction representation using less than all of these typically associated applications, and then later opens another application that is typically associated with the combination, the activity engine 1144 can suggest that the newly opened application be added to the set. In further examples, all open applications can be used to generate interactions representations that are added to a set, or a set can be formed from applications open when the user shuts down or reboots a computer device. Or, tabs open during a recent meeting held by the user can be added to a set, or suggested for addition to a set.

The activity engine 1144, another component of the computer device 1132, or the computer device in communication with the association engine 1128, can employ rules, including heuristics, machine learning, other techniques, or combinations thereof in order to evaluate whether particular content with which a user is interacting is likely to be part of a common activity, or should be otherwise included in a set. In particular, the association engine 1128 can be used to determine whether content with which a user is engaged across multiple computer devices (e.g., the devices 1108 and the device 1132) are likely to be part of a common task. In addition to data associated with a particular user, in some aspects, the association engine 1128 can access data of the database 1124 to use data from other users to help more accurately associate user-content interactions with a set, including a set representing a common task.

In some cases, the activity engine 1144 can maintain some or all currently-engaged in content interactions a putative set members. When the user ceases one or more of the interactions, including shutting down or logging of a computer device, the user can be prompted to create a formal set for the putative set, including editing the interaction representations associated with the putative set. If the user elects not to create a set interaction representation, the information for the putative set can be deleted. Information regarding putative sets can be displayed to a user in displays of interaction representations and navigational mnemonics, and the user given the option to delete the putative set or convert the putative set to a persistent set interaction representation.

For example, a user may be working on a project using a web browser, a presentation authorizing program, a word processor, and a database program. The user may also be listening to music and have a communications program running A software service (which can be an operating system component or another component), such as the activity engine 1144, can track these activities as a putative task. If the user enters a command to shut down the computer device, the user can be prompted to save the putative set, including editing the component interaction representation. The user may, for example, leave the project-related activities in the set, but may remove one or both of the music program and the communications program from the set. The user can then save the set interaction representation, giving the set a name (e.g., equivalent to a file name), or can use a default name provided in the prompt.

As discussed above, the activity engine 1144 may be in communication with the aggregation/synchronization component 1120, and may also be in communication with the computer devices 1108. Information regarding interaction representations and navigational mnemonics created on the computer device 1132, or received from the aggregation/synchronization component 1120 or the computer devices 1108, can be stored in a database 1164. In at least some aspects, the database 1164 serves to cache a portion of the information of the aggregation/synchronization component 1120 (or the database 1124), where the aggregation/synchronization component (or the database 1124) remains the authoritative repository of interaction representation and navigational mnemonic information. In other aspects, the database 1164 can include additional functionality.

The database 1164 can periodically be garbage-collected, such as to remove interaction representations and navigational mnemonic information older than a particular threshold date, or relating to content-interactions in which the user has not been actively engaged, or navigational mnemonics that the user has not used, for a period of time. In some cases, rather than being garbage-collected, or at a stage prior to being garbage collected, individual records can be combined or merged. For example, all relevant history records can be maintained for recent user activity. For older user content-interactions, individual history records can be combined-such as combining individual history records for a day into a single history record, combining all history records for a week into a single history record, etc. Entries older than a particular threshold can simply be deleted. The database 1164 can also be periodically analyzed to determine if any interaction representations contain event triggers that may result in an activity record being modified or deleted.

The computer device 1132 includes a user interface 1168 (which can be, or can include, a graphical user interface) that can allow a user to view information regarding their content-interactions in conjunction with one or more navigational mnemonics, and optionally content-interactions, access content associated with an interaction representation, or modify, create, or delete interaction representations. The user interface 1168 can include one or more templates 1172 specifying various ways the user may view or interact with interaction representations and navigational mnemonic information. The user interface 1168 can also include a rules engine 1176, which can determine the appropriate content to provide for a particular template 1172 in response to a particular user request. A display engine 1180 of the user interface 1168 can render displays (including user interface elements associated therewith) for output, such as to a buffer 1182, based on the templates 1172 and, at least for some templates, data specified by the rules engine 1176.

The user interface 1168 can be associated with a query engine 1184. The query engine 1184 can receive queries from a user (or specified in a template 1172) and query the database 1164 for relevant data. In some cases, the query can be for interaction representations (or individual history records thereof), or navigational mnemonics meeting particular criteria, such as being conducted before or after a certain date, have a particular keyword in the title, being associated with particular content or a particular application, having a particular type (e.g., productivity, entertainment, games, movie, etc.), or combinations thereof. In addition, or instead of, specifying a query with regard to a task or activity, a user can be allowed to search for interaction representation using navigational mnemonics. For instance, a user may formulate a query such as "show me the document I was working on before I met with Michael" or "what was that song I listened to after I got coffee last week?" Another query might be "Show me all of my recent communications with Ken." The query engine 1184 can include logic to convert informal or freeform queries provided by a user into a format (e.g., in the structured query language) that can be processed by the database 1164.

In some cases, the computer device 1132 can include an indexer 1186. The indexer 1186 can index information regarding tasks, activities, history records, and navigational mnemonics of the database 1164, such as to improve performance of the user interface 1168 by making data for populating a template 1172 more readily available.

The architecture 1100 can include more or fewer components than shown, and may be organized in other manners. For example, functionality of a particular component can be carried out by another component. In addition, in at least some cases, functionality can be carried out using multiple components. At least certain functionality shown as occurring at the computer device 1132, such as the functionality of the processing engine 1160 or the activity engine 1144, can be carried out at the aggregation/synchronization component 1120.

Display of Interaction Representations and Navigational Mnemonic Information

Figure 12:
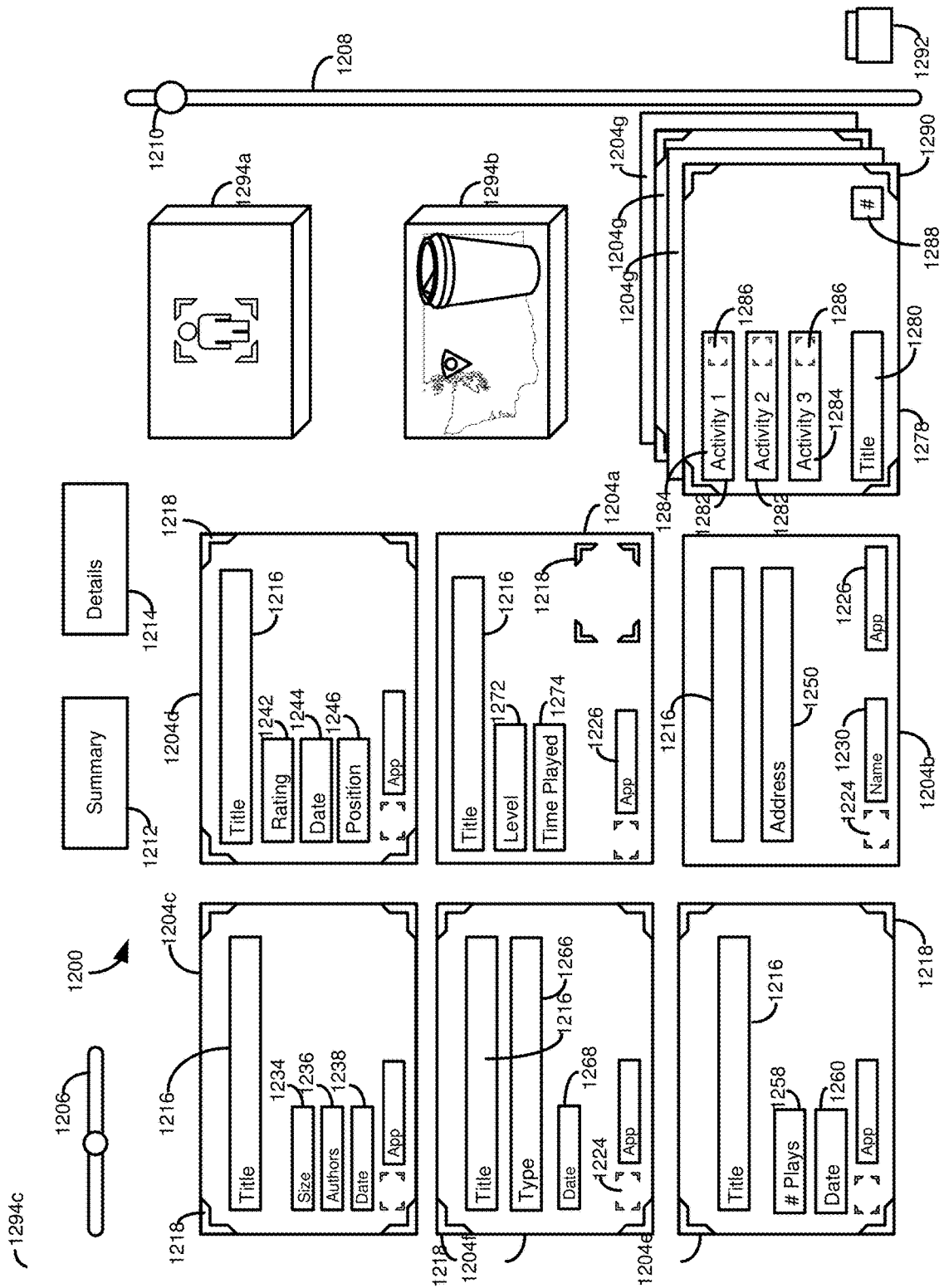
FIG. 12 is an example screen displaying a summary of a user's tasks and activities in relation to a plurality of navigational mnemonics.

FIG. 12 illustrates an example user interface display 1200 that can be used to present a user with information regarding their content-interactions in association with one or more navigational mnemonics. The display 1200 can be one of the templates 372 of the user interface 368 of FIG. 3, and can be populated using the rules engine 376 and the indexer 384. The populated display 1200 can be rendered for display to a buffer, such as using the display engine 1180 and the buffer 1182.

The display 1200 presents a plurality of interaction representation display elements 1204 (e.g., 1204a-1204f). Each interaction representation display element 1204 provides information about an activity in which the user engaged in over a period of time. The interaction representation display elements 1204 can provide information corresponding to a single instance of the activity (e.g., corresponding to a single history record) or can include information derived from multiple instances of the activity (e.g., information from multiple history records associated with the same activity).

The display 1200 can represent a summary view of user activity, where only the most relevant activities over a time period are displayed. In at least some implementations, the display 1200 can include tasks and activities carried out at multiple computer devices, including a computer device other than the computer device on which the display is rendered. Although not shown, if desired, an interaction representation display element 1204 can display an indicator of which device the activity was carried out on, or can otherwise be displayed in a manner to provide such information.

In some cases, the time period (or other display window parameter) can be adjusted, such as using user input, such that a particular screen state (e.g., corresponding to a position on a timeline, such as represented by a position on a scrollbar 1208) represents a longer or shorter time window. Longer time windows may include a larger number of interaction representation display elements 1204. If the window is larger, and includes a larger number of interaction representation display elements 1204, the size of the interaction representation display element can be made smaller to accommodate a display of more interaction representation display elements on the display 1200. Or, the size of the interaction representation display elements 1204 can be maintained, but the number of relevant interaction representation display elements, such as by showing only interaction representation display elements meeting a higher threshold relevance level. In some cases, a user interface element, such as the scrollbar 1206, can be provided to allow a user to change the relevance criteria, or time window, used to select interaction representation display elements 1204 to include in the display 1200.

The interaction representation display elements 1204 can be positioned on the display 1200 in a particular order. In some cases, the order can be chronological (e.g., chronological or reverse-chronological). In other cases, the order can be based on relevance, with more relevant interaction representation display elements 1204 being listed before less relevant interaction representation display elements. In further cases, the ordering can be an alphabetical ordering, such as an ordering by application name 1226 or by title 1216. Or, a different type of ordering can be used, or the interaction representation display elements 1204 can be unordered.

When interaction representation display elements 1204 are listed in an order, the order may be defined as desired. In particular examples, interaction representation display elements 1204 are listed in the order from left to right, and then from top to bottom. For instance, for reverse-chronological order, the most recent interaction representation display element 1204 would be placed at the top left corner of the display 1200, and additional interaction representation display elements would be placed in the row left to right accordingly to their recency. Once a row is filled, the process would be repeated starting at the leftmost position of the next lower row.

A scrollbar 1208 can including a positional indicator 1210, indicating a currently displayed timeline position or value. A user can select the indicator 1210 and adjust its position to view more or less recent interaction representation display elements 1204, such as by clicking and dragging the indictor, or though other input using a pointing device, keyboard, or other input device. The interaction representation display elements 1204 displayed on the display 1200, as well as their position, can change as the position of the indicator 1210 changes.

A user may be given the option to view their activities in another format (e.g., using another template 372). The user may be given the option to select the current, summary, view (e.g., the display 1200) using an icon 1212, and an alternative view, such as a detail or verbose view providing a view of more, including all, of the user's activity by selecting an icon 1214.

In some cases, a user can select to resume an activity associated with an interaction representation display element 1204 (or an interaction representation display element provided in another display or interface of the present disclosure) by selecting (e.g., clicking or an analogous input) an interaction representation display element or a particular portion of an interaction representation display element. Resuming an activity can include launching an application associated with the interaction representation display element 1204, loading relevant content, and resuming a prior state of the application with respect to the content. Resuming an activity can include resuming the activity at a computer device other than the device on which the display 1200 is presented (e.g., an application may be launched on a smartphone when a user selects an interaction representation display element 1204 displayed on a desktop computer). Or, resuming an activity can include resuming the activity on a computer device other than the device on which the activity was originally, or last, carried out (e.g., an activity last carried out on a smartphone can be resumed on a desktop computer). When the activity is resumed on a different computer device, resuming the activity can include one or more of installing an application on the computer device where the activity will be resumed, transferring content to the computer device where the activity will be resumed, and transferring application state information to the computer device where the activity will be resumed.

The display 1200 can display a variety of information in each interaction representation display element 1204. Each interaction representation display element 1204 typically includes a title 1216. The title 1216 can be the value specified by the title 328 of FIG. 3 (or, in other cases, the value specified by the titles 308 or 362, or metadata associated with a serialized interaction representation 400 of FIG. 4), which can be a default value, or can be supplied in another manner (e.g., a default value that is not specified by value of the title 328). The title 1216 can vary depending on the type of application or content associated with the interaction representation display element 1204.

Interaction representation display elements 1204 can optionally include a displayed image 1218 that is associated with the activity of the interaction representation display element 1204 (e.g., the image specified by fields 330 or 310 of FIG. 3, or a serialized interaction representation 400 of FIG. 4). In some cases, such as in interaction representation display element 1204c, the image 1218 can form the background of the interaction representation display element (e.g., being displayed behind the entire display area used to display information regarding a particular interaction representation display element 1204). In other cases, such as in interaction representation display element 1204a, the image 1218 can occupy less than all of the display area used to display information regarding a particular interaction representation display element 1204. In further cases, the displayed image 1218 can be displayed in another manner, including as a background for a canvas associated with the display 1200. In some cases the image 1218 can be a single static image, in other cases, the image can change between different images, or can include a short video or animation. In at least some examples, an interaction representation display element 1204 can be associated with an image 1218, and an operating system, application, or both, can determine the position of the image 1218 (as well as positions of the interaction representation display elements and their associated content, including textual content).

Typically, an interaction representation display element 1204 includes information regarding an application used (or useable) to engage in the activity associated with the interaction representation display element. For example, the interaction representation display elements 1204 can include an icon 1224 (e.g., an image, such as specified in field 340 or in the serialized interaction representation 400) representing, or otherwise associated with, the application. The name 1226 (e.g., the name specified in field 238) of the application can also be displayed on the interaction representation display element 1204. In at least some cases, such as in the case of an interaction representation display element 1204b associated with web browsing activity, the icon 1224 can represent a web page associated with the web browsing activity of the interaction representation display element (e.g., an image extracted from or otherwise associated with a particular website represented in the interaction representation display element), and, in addition to the name of the application, a name 1230 of the website (e.g., a host name, which may be stored, for example, in the Properties field 392 or in the serialized interaction representation 400) can be displayed on the interaction representation display element. In particular aspects, the web page icon or image 1218 and the web page name 1230 are extracted from metadata associated with the webpage (and may correspond, for example, to an image and name displayed in a title bar of the web browser when the user visited the web page).

Interaction representation display element 1204c can represent activity involving a document, such as a presentation document, a word processing document, or another type of document. The title 1216 of the interaction representation display element 1204c can be the name of a file corresponding to the document, optionally including the file path. The interaction representation display element 1204c can provide details regarding the file, such as its size 1234, one or more authors 1236 of the file, and a date 1238 the file was created or last modified. The image 1218 in the interaction representation display element 1204c can be, for example, a portion of the contents of a document associated with the interaction representation display element.

Interaction representation display element 1204d can represent a user viewing a video. The title 1216 can be the name of the video (e.g., a name of a movie or a television program). The interaction representation display element 1204d can include additional information regarding the video, such as a rating 1242 (for instance, an MPAA rating, a popularity rating, or a critical rating), a date 1244 the video was produced (or, alternatively, a date the video was last viewed), and a position 1246 at which the user previously ceased viewing the video. The image 1218 displayed with the interaction representation display element 1204d can be a frame of the video or a particular image associated with the video (e.g., equivalent to a movie poster).

Interaction representation display element 1204b, as discussed above, can represent a website visited by the user. The title 1216 can be a title of the web page (e.g., a title specified in metadata associated with the web page). The interaction representation display element 1204b can include additional information about the website, such as its address or URL 1250. Although not shown, the interaction representation display element 1204b can include additional information about the web page, such as a date the user last visited the webpage or a time spent engaged with the website, which can be a total time spent engaged with the website or the time spent engaged with the website on the date the user last visited the webpage (which can be for a particular date, or for a particular interaction, such as a particular history record associated with the interaction representation display element 1204b).

As mentioned above, the interaction representation display element 1204b can include an icon 1224 that is associated with a website visited as part of the web browsing activity of the interaction representation display element 1204b, such as specified by metadata of the website. Although not shown, the interaction representation display element 1204b can include an image 1218, such as an image of a visited webpage. The interaction representation display element 1204b includes, in addition to the address 1250, a name 1230 associated with the visited webpage and the name 1226 of the application (e.g., a specific web browser) used to view the webpage.

Interaction representation display element 1204e can represent activity related to audio content, such as a user listening to a song or album. The title 1216 of the interaction representation display element 1204e can be, for example, the name of the artist and/or name of the song/album. The interaction representation display element 1204e can display additional information regarding the audio content, such as a number of times 1258 the user played the content, and a date 1260 the album or song was released, or a time the user last listened to the album or song. The image 1218 displayed for the interaction representation display element 1204e can represent artwork designated for the musical content (e.g., corresponding to an album cover).

Some interaction representation display elements 1204 can relate to photographs viewed, or taken, by a user. For instance, interaction representation display element 1204f can represent a single photo viewed by the user or a collection of photos, or a photo of a collection of photos, viewed by the user. The title 1216 of interaction representation display element 1204f can be a file path for a photo or a name of the collection. The interaction representation display element 1204f can include type information 1266, which can indicate whether the photo is an individual photo or a collection of photos. If the photo is from a collection, the number of photos in the collection can be displayed. The interaction representation display element 1204f can also include a date 1268, which can be a date the photo (or a photo of the collection) was taken, or a date the user last viewed the photo (or collection). The image 1218 displayed in the interaction representation display element 1204f can be the photograph or a photograph of a collection or a collage of photographs in the collection.

Interaction representation display element 1204a can represent game play activity by a user. The title 1216 of the game play interaction representation display element 1204a can be the name of the game. The interaction representation display element 1204a can display additional information about the game content played, such as a level or accomplishment 1272 last achieved by the user, and a total time 1274 spent by the user playing the game. Although not shown in FIG. 12, a game play interaction representation display element 1204a can include additional information, such as an amount of game content completed by the player to date, or a date the user last played the game. The interaction representation display element 1204a for gaming activity can include an image 1218, which can be, for example, a screenshot of the user's last session playing the game, or another image associated with the game (e.g., corresponding to packaging cover art for the game).

The display 1200 includes a task representation 1278. Although a single task representation is 1278 shown, displays (including summary displays, detail displays, displays of search results, or other displays) can include multiple task representations. The task representation 1278 can include a name 1280, which can be a human understandable title or description of the task, such as the value of the field 306 of the task record 300 of FIG. 3. The task representation 1278 can also display a list of activities 1282 associated with the task. Each activity 1282 can be associated with a title 1284 and an icon or image 1286. The title 1284 can be, for example, the value of the field 228 of the activity record 318 of FIG. 3, and the icon or image can correspond to the image 330 or icon 340 fields. In other cases, information for the task representation 1278 can be obtained from the serialized interaction representation of FIG. 4.

In some cases, the activities 1282 displayed on a task representation 1278 can be less than all of the activities associated with the task. For instance, a user may only have a limited number of the activities 1282 currently open, or may have only had a limited number of the activities open when the user last engaged in the task associated with the task representation 1278. The activities 1282 displayed may be the currently open activities, or the activities used in the prior instance of the task associated with the task representation 1278. In other cases, all of the activities 1282 can be displayed on a task representation 1278, or the activities to be displayed can be selected in another manner. The task representation 1278 can display a number 1288 indicating the number of activities, overall, associated with the corresponding task.

The task representation 1278 can be displayed in a particular style, format, or layout, such as specified by the field 316 of the task record 300 of FIG. 3 (or in the serialized interaction representation 400 of FIG. 4). The style, format, and/or layout can specify which activities 1282 are to be displayed on the task representation 1278, a color associated with the task representation, and an image or icon 1290 (e.g., the field 308 of the task record 300 of FIG. 3, or in the serialized interaction representation 400) displayed in association with the task representation. As shown, the image 1290 forms the background of the task representation 1278. However, the image 1290 can be displayed in other manners (e.g., as specified in a schema indicated by the field 316, or associated with the serialized interaction representation 400), including as a smaller image on the display representation 1278.

A user interface associated with the display 1200 can provide options for creating or modifying a task associated with a task representation. For instance, the user can select a task creation icon 1292 that initiates the creation of a task. Or, a user may choose to select one or more activities and enter a command to create or modify a task (e.g. "right clicking" to pull up a menu and then selecting a "create task" or "add to task" option). Similarly, the interface may provide commands to allow a task representation 1278 to be modified, including renaming the task, changing a schema associated with the task, deleting the task, or adding or removing activities 1282 to or from the task.

In the interface and display 1200 of FIG. 12, in addition to the activities 1282 listed on the interaction representation display element 1278, interaction representation display elements 1204g associated with the task representation can be displayed in association with the task representation. In FIG. 12, the task representation 1278 and its associated interaction representation display elements 1204g are shown as a stack. A user may be allowed to selectively expand and collapse the stack, such as to select a particular activity associated with an activity record 1204g to resume, or to obtain more information about the interaction representation display elements associated with the task representation 1278. As described above, the interaction representation display elements 1204g can represent the specific activities associated with the task representation 1278 that a user engaged in during a particular instance of the task, which can be less the all of the activities associated with the task. In some cases, the interaction representation display elements 1204g are only those activities in which the user actively engaged in that instance of the task associated with the task representation 1278. In other cases, the interaction representation display elements 1204g can be selected in another manner, such as including all of the interaction representation display elements associated with the task representation 1278 in the stack, even if the user did not engage in all of the activities during that instance of the task.

The interaction representation display elements 1204 and task representation 1278 are shown next to navigational mnemonic representations 1294 (e.g., 1294a-1294c). The navigational mnemonic representations 1294 can represent various types of navigational mnemonics, including a person 1294a and a location 1294b (e.g. a particular coffee shop). Of course, these navigational mnemonics are provided by way of example only, and navigational mnemonic representations 1294 can represent any type of navigational mnemonic.

The navigational mnemonic representations 1294 can be positioned relative to one or more of the interaction representation display elements 1204 or task representations 1278 using one or more criteria. For instance, if the interaction representation display elements 1204 and task representations 1278 are displayed chronologically, the navigational mnemonic representations 1294 can also be displayed chronologically. If the interaction representation display elements 1204 and task representations 1278 are displayed according to a different criteria, the navigational mnemonic representations can be displayed proximate the interaction representation display elements to which they are relevant. In particular aspects, the interaction representation display elements 1204, task representations 1278, and the navigational mnemonic representations 1294 are organized relative to one another and the collections of navigational mnemonic representations and their associated activity and task representations are then displayed in an order.

The navigational mnemonic representations 1294, task representations 1278, and interaction representation display elements 1204 are typically displayed in visually distinct styles, so that a user can discern between them. However, the interaction representation display elements 1204, the task representations 1278, and the navigational mnemonic representations 1294 can be displayed in any desired manner. In some examples, rather than having navigational mnemonic representations 1294 displayed in a discrete section of the display 1200, the navigational mnemonic representations can be interspersed between interaction representation display elements 1204 and task representations 1278. The navigational mnemonic representations 1294 can also be displayed in a more transient manner, such as being displayed as, optionally partially transparent, popups when a user navigates to a new series of interaction representation display elements 1204 and task representations 1278 or if the user moves a pointing device to a particular location. For instance, navigational mnemonic representations 1294 associated with a particular interaction representation display element 1204 may be displayed as popups if the user hovers a cursor over the interaction representation display element, or selects an interface element on the interaction representation display element.

As shown in FIG. 12, a navigational mnemonic representation 1294c can be an image that forms the background of the display 1200. The navigational mnemonic representation 1294c may be useful when it is relevant to all or a substantial portion of the interaction representation display elements 1204 and task representations 1278 currently being displayed. For instance, if the displayed interaction representation display elements 1204 and task representations 1278 are for a particular time period, the navigational mnemonic representation 1294c can be associated with that time period. If the user navigates to another time period, the navigational mnemonic displayed in the navigational mnemonic representation 1294c can change to a new navigational mnemonic relevant to the new time period.

As discussed above, in at least some aspects, selecting a navigational mnemonic representation 1294 can cause a display of information relating to the navigational mnemonic or can generate a new display, such as a display of interaction representation display elements 1204 and/or task representations 1278 organized according to different criteria.

In some cases, a user may be allowed to influence the navigational mnemonic representations 1294 included in the display 1200. For instance, a user may "pin" one or more interaction representation display elements 1204 and task representations 1278 to one or more navigational mnemonic representations 1294. Pinning may result in a permanent (or, at least permanent until the user modifies the association) association between the interaction representation display element 1204 and/or task representation 1278 and the navigational mnemonic representation 1294.

The user can also be given the option to create or define navigational mnemonics 1294. For instance, the user may choose a person from a contact list, a location, media content, etc. to serve as a navigational mnemonic for a particular display, or a particular group of interaction representation display elements 1204 and task representations 1278 currently shown in a display. The user may be allowed to pin interaction representation display elements 1204 and task representations 1278 to such user defined navigational mnemonic representations 1294.

User activity creating and modifying (including removing) navigational mnemonic representations 1294, and associations between navigational mnemonic representations and interaction representation display elements 1204 and task representations 1278, can influence content that is selected as navigational mnemonics and which navigational mnemonics are selected to be displayed as navigational mnemonic representations 1294 in association with particular interaction representation display elements 1204 and task representations 1278 on the display. For instance, the user's actions can serve as input for the rules engine 1176 or query engine 1184 of FIG. 11. Or, the actions can be used to train the association engine 1128.

The display 1200 can include additional user interface elements. For example, the display 1200 can include a search element, where a user can enter search criteria to locate interaction representation display elements 1204, task representations 1278, and navigational mnemonic representations 1294 meeting the search criteria.

Although the display 1200 is shown as a summary display, where selected interaction representation display elements 1204 and task representations 1278 are displayed (in conjunction with associated navigational mnemonic representations 1294), interaction representation display elements, task representations, and navigational mnemonic representations can be used analogously in other types of displays. For instance, a display can include all interaction representation display elements 1204 and task representations 1278, or can display interaction representation display elements or task representations relevant to search criteria (including search criteria specified relative to a navigational mnemonic).

As will be further described, user interfaces can allow a user to create and edit task representations 1278 from a display of interaction representation display elements 1204 and task representations. In particular, displays of past activities can be used to create tasks. That is, while a task can be created or edited while a user is currently engaging in an activity or task, a user can create a task from the activities, or edit the task, at a later date.

Figures 13A, 13B, 13C:
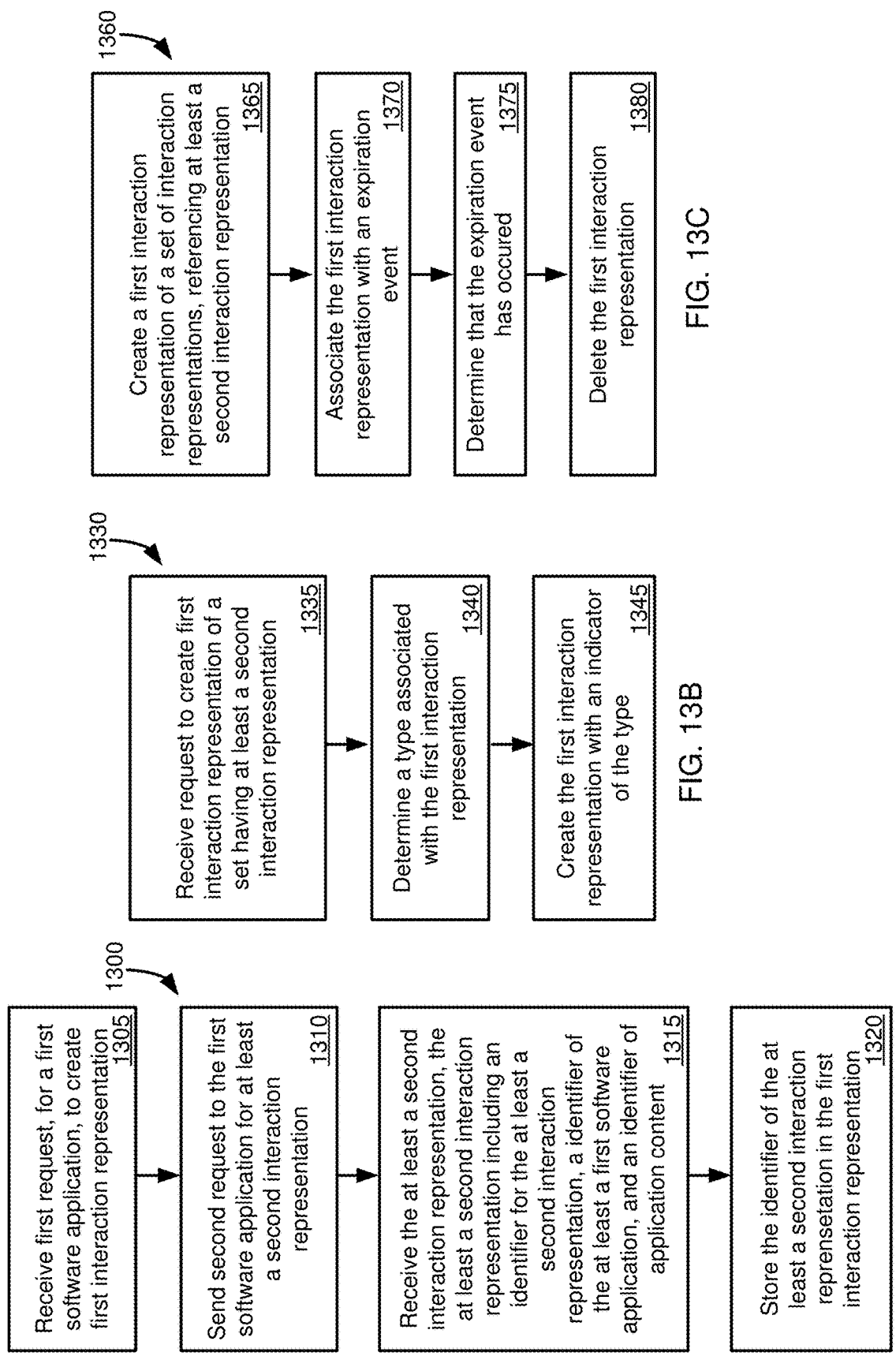
FIG. 13A is a flowchart of an example method for requesting an interaction representation from a software application in order to create an interaction representation of a set of interaction representations.
FIG. 13B is a flowchart of an example method for creating an interaction representation representing a set of interaction representations, the set having a type.
FIG. 13C is a flowchart of an example method of creating an interaction representation representing a set of interaction representations, the set having an expiration event.

Methods for Creating and Managing Interaction Representations Representing Sets of Interaction Representations FIG. 13A presents a flowchart of an example method 1300 for requesting an interaction representation from a first software application for use in creating an interaction representation for a set of interaction representations. At 1305, a first request is received to create a first interaction representation associated with a first software application. A second request is sent to the first software application at 1310. The second request is for at least a second interaction representation, which can represent a current user-content interaction associated with the first software application. At 1315, the at least a second interaction representation is received. The at least a second interaction representation includes an identifier for the at least a second interaction representation, an identifier of the first software application, and an identifier of application content. The identifier of the at least a second interaction representation is stored in the first interaction representation at 1320.

FIG. 13B presents a flowchart of an example method 1330 for creating an interaction representation for a set of interaction representations, the set associated with a type, where the type can determine what interaction representations can be added to the set. At 1335, a request is received to create a first interaction representation of a set having at least a second interaction representation. A type associated with the first interaction representation is determined at 1340. The first interaction representation is created at 1345 with an indicator of the type.

FIG. 13C presents a flowchart of an example method 1360 for creating an interaction representation for a set of interaction representations, the set associated with an expiration event. At 1365, a first interaction representation of a set of interaction representations is created that references at least a second interaction representation. The first interaction representation is associated with an expiration event at 1370. At 1375, it is determined that the expiration event has occurred. The first interaction representation is deleted at 1380.

Computing Systems

Figure 14:
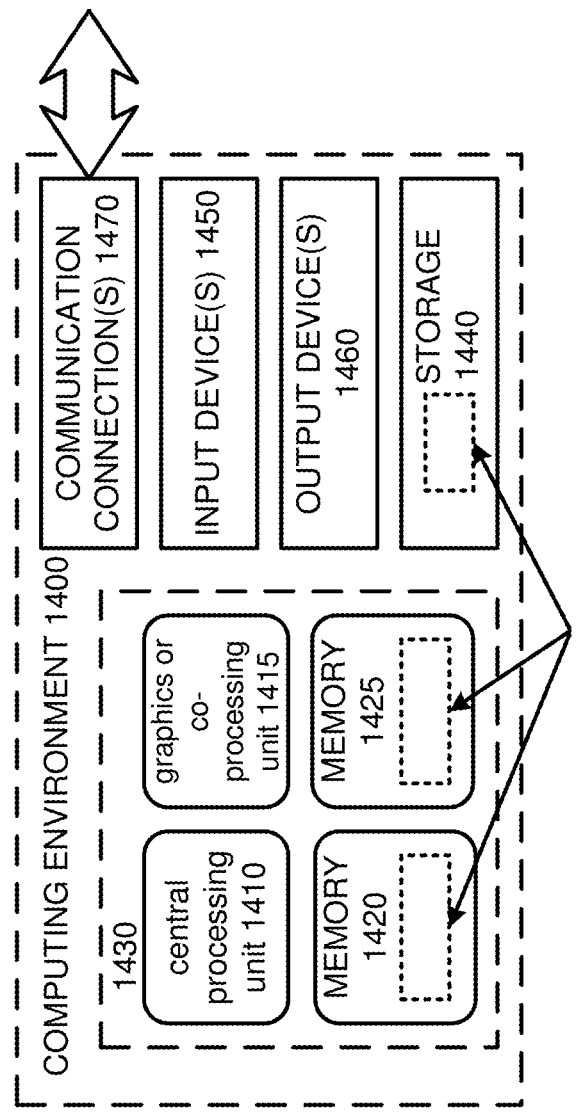
FIG. 14 is a diagram of an example computing system in which some described embodiments can be implemented.

FIG. 14 depicts a generalized example of a suitable computing system 1400 in which the described technologies may be implemented. The computing system 1400 is not intended to suggest any limitation as to scope of use or functionality, as the technologies may be implemented in diverse general-purpose or special-purpose computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 may be volatile memory (e.g., registers, cache, RAM), nonvolatile memory (e.g., ROM, EEPROM, flash memory, etc.), or some combination of the two, accessible by the processing unit(s). The memory 1420, 1425 stores software 1480 implementing one or more technologies described herein, in the form of computer-executable instructions suitable for execution by the processing unit(s).

A computing system may have additional features. For example, the computing system 1400 includes storage 1440, one or more input devices 1450, one or more output devices 1460, and one or more communication connections 1470. An interconnection mechanism (not shown) such as a bus, controller, or network interconnects the components of the computing system 1400. Typically, operating system software provides an operating environment for other software executing in the computing system 1400, and coordinates activities of the components of the computing system 1400.

The tangible storage 1440 may be removable or non-removable, and includes magnetic disks, magnetic tapes or cassettes, CD-ROMs, DVDs, or any other medium which can be used to store information and which can be accessed within the computing system 1400. The storage 1440 stores instructions for the software 1480 implementing one or more technologies described herein.

The input device(s) 1450 may be a touch input device such as a keyboard, mouse, pen, or trackball, a voice input device, a scanning device, or another device that provides input to the computing system 1400. For video encoding, the input device(s) 1450 may be a camera, video card, TV tuner card, or similar device that accepts video input in analog or digital form, or a CD-ROM or CD-RW that reads video samples into the computing system 1400. The output device(s) 1460 may be a display, printer, speaker, CD-writer, or another device that provides output from the computing system 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computer device. In general, a computing system or computer device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into one or more programs, such as one or more lines of code in one or more larger programs, or a general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 15:
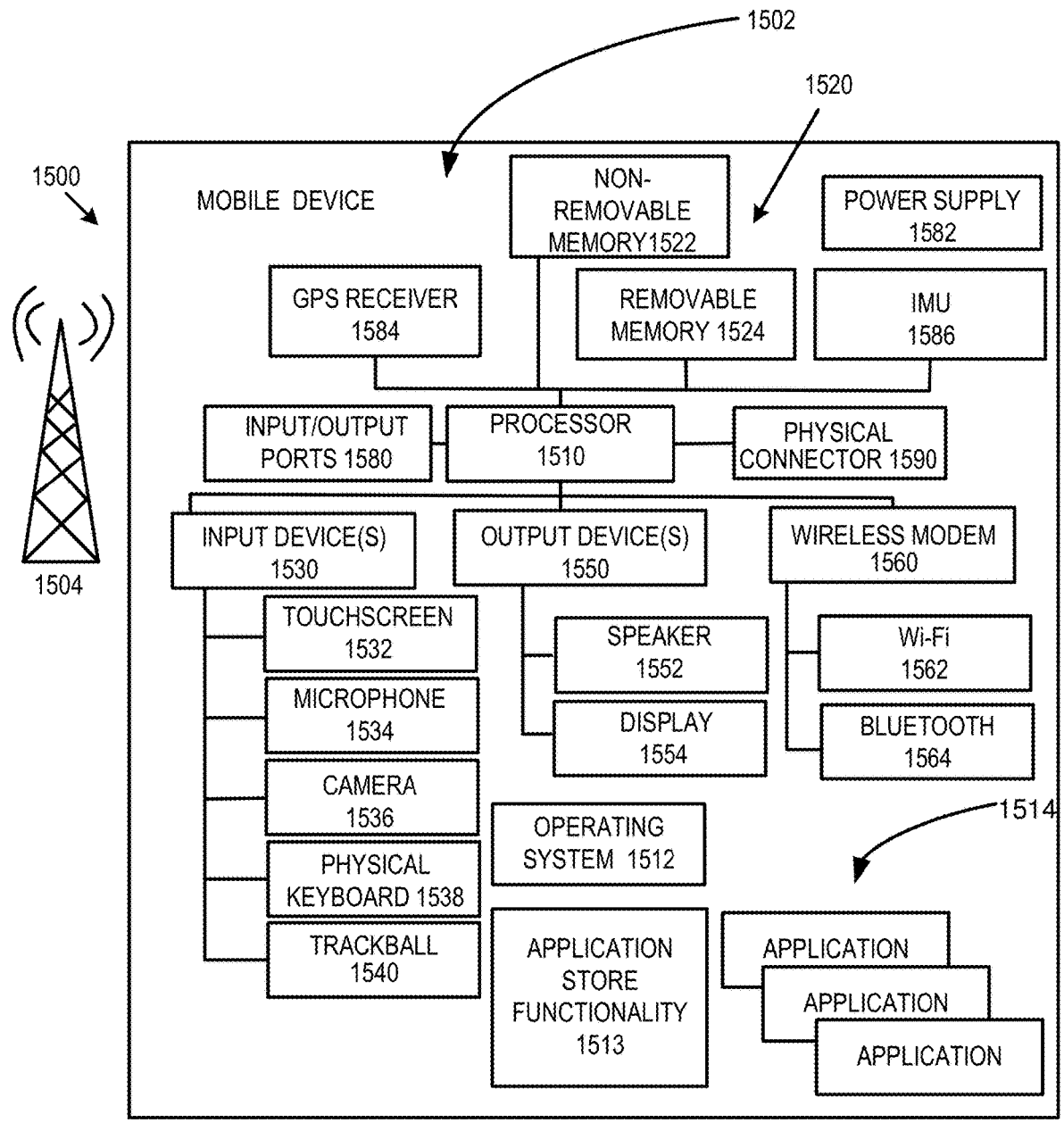
FIG. 15 is an example mobile device that can be used in conjunction with the technologies described herein.

FIG. 15 is a system diagram depicting an example mobile device 1500 including a variety of optional hardware and software components, shown generally at 1502. Any components 1502 in the mobile device can communicate with any other component, although not all connections are shown, for ease of illustration. The mobile device can be any of a variety of computer devices (e.g., cell phone, smartphone, handheld computer, Personal Digital Assistant (PDA), etc.) and can allow wireless two-way communications with one or more mobile communications networks 1504, such as a cellular, satellite, or other network.

The illustrated mobile device 1500 can include a controller or processor 1510 (e.g., signal processor, microprocessor, ASIC, or other control and processing logic circuitry) for performing such tasks as signal coding, data processing, input/output processing, power control, and/or other functions. An operating system 1512 can control the allocation and usage of the components 1502 and support for one or more application programs 1514. The application programs can include common mobile computing applications (e.g., email applications, calendars, contact managers, web browsers, messaging applications), or any other computing application. Functionality 1513 for accessing an application store can also be used for acquiring and updating application programs 1514.

The illustrated mobile device 1500 can include memory 1520. Memory 1520 can include non-removable memory 1522 and/or removable memory 1524. The non-removable memory 1522 can include RAM, ROM, flash memory, a hard disk, or other well-known memory storage technologies. The removable memory 1524 can include flash memory or a Subscriber Identity Module (SIM) card, which is well known in GSM communication systems, or other well-known memory storage technologies, such as "smart cards." The memory 1520 can be used for storing data and/or code for running the operating system 1512 and the applications 1514. Example data can include web pages, text, images, sound files, video data, or other data sets to be sent to and/or received from one or more network servers or other devices via one or more wired or wireless networks. The memory 1520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1500 can support one or more input devices 1530, such as a touchscreen 1532, microphone 1534, camera 1536, physical keyboard 1538 and/or trackball 1540 and one or more output devices 1550, such as a speaker 1552 and a display 1554. Other possible output devices (not shown) can include piezoelectric or other haptic output devices. Some devices can serve more than one input/output function. For example, touchscreen 1532 and display 1554 can be combined in a single input/output device.

The input devices 1530 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1512 or applications 1514 can comprise speech-recognition software as part of a voice user interface that allows a user to operate the device 1500 via voice commands. Further, the device 1500 can comprise input devices and software that allows for user interaction via a user's spatial gestures, such as detecting and interpreting gestures to provide input to a gaming application.

A wireless modem 1560 can be coupled to an antenna (not shown) and can support two-way communications between the processor 1510 and external devices, as is well understood in the art. The modem 1560 is shown generically and can include a cellular modem for communicating with the mobile communication network 1504 and/or other radio-based modems (e.g., Bluetooth 1564 or Wi-Fi 1562). The wireless modem 1560 is typically configured for communication with one or more cellular networks, such as a GSM network for data and voice communications within a single cellular network, between cellular networks, or between the mobile device and a public switched telephone network (PSTN).

The mobile device can further include at least one input/output port 1580, a power supply 1582, a satellite navigation system receiver 1584, such as a Global Positioning System (GPS) receiver, an inertial measurement unit (IMU) 1586 (or one or more components thereof, such as a magnetometer, an accelerometer, or a gyroscope, or similar types of sensors), and/or a physical connector 1590, which can be a USB port, IEEE 1394 (FireWire) port, and/or RS-232 port. The illustrated components 1502 are not required or all-inclusive, as any components can be deleted and other components can be added.

Cloud-Supported Environment

Figure 16:
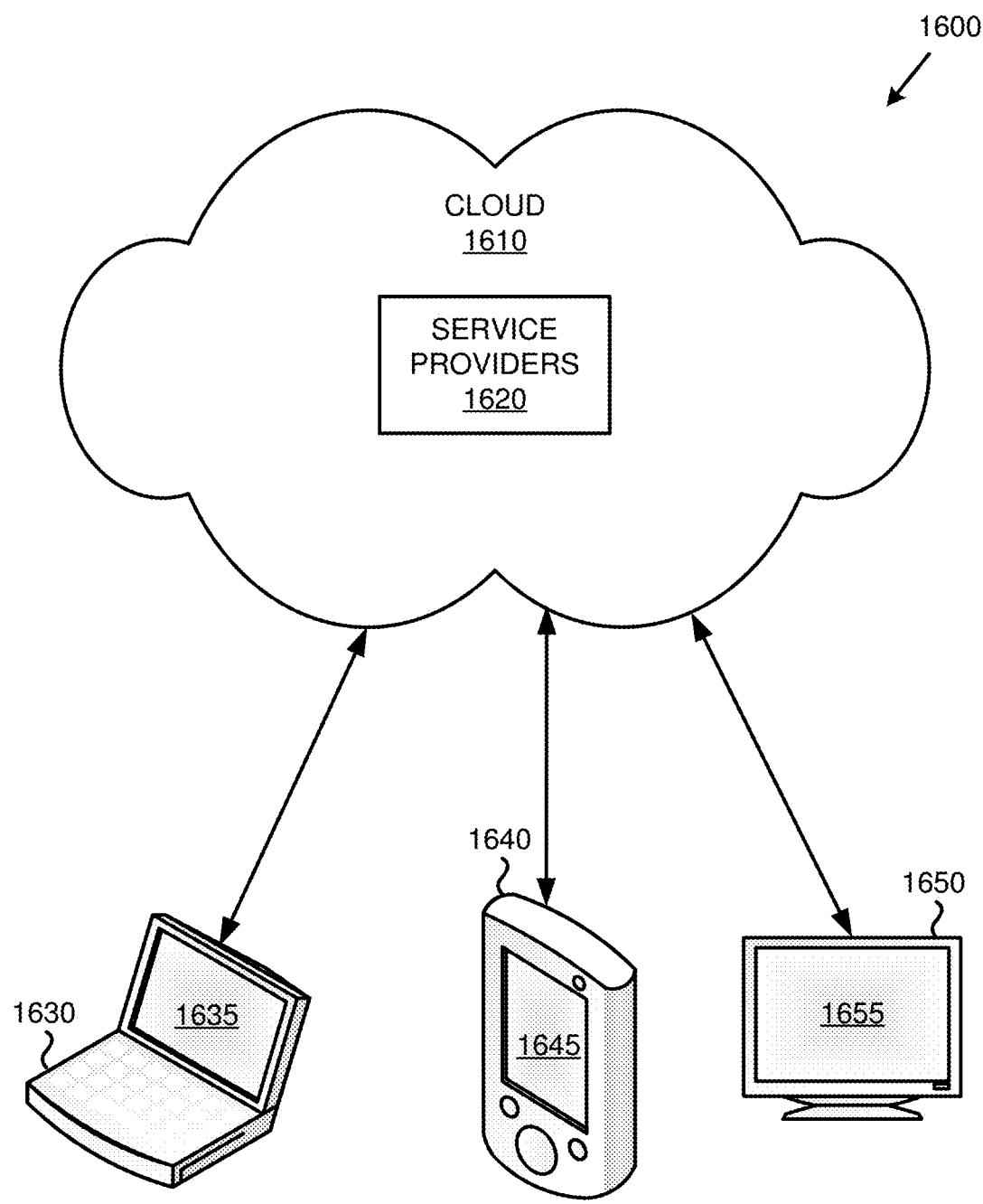
FIG. 16 is an example cloud-support environment that can be used in conjunction with the technologies described herein.

FIG. 16 illustrates a generalized example of a suitable cloud-supported environment 1600 in which described embodiments, techniques, and technologies may be implemented. In the example environment 1600, various types of services (e.g., computing services) are provided by a cloud 1610 (e.g., network 1122 of FIG. 11). For example, the cloud 1610 can comprise a collection of computer devices, which may be located centrally or distributed, that provide cloud-based services to various types of users and devices connected via a network such as the Internet. The implementation environment 1600 can be used in different ways to accomplish computing tasks. For example, some tasks (e.g., processing user input and presenting a user interface) can be performed on local computer devices (e.g., connected devices 1630, 1640, 1650, which can correspond to the computer devices 1104 of FIG. 11) while other tasks (e.g., storage of data to be used in subsequent processing) can be performed in the cloud 1610.

In example environment 1600, the cloud 1610 provides services for connected devices 1630, 1640, 1650 with a variety of screen capabilities. Connected device 1630 represents a device with a computer screen 1635 (e.g., a mid-size screen). For example, connected device 1630 could be a personal computer such as desktop computer, laptop, notebook, netbook, or the like. Connected device 1640 represents a device with a mobile device screen 1645 (e.g., a small size screen). For example, connected device 1640 could be a mobile phone, smart phone, personal digital assistant, tablet computer, and the like. Connected device 1650 represents a device with a large screen 1655. For example, connected device 1650 could be a television screen (e.g., a smart television) or another device connected to a television (e.g., a set-top box or game console) or the like.

One or more of the connected devices 1630, 1640, 1650 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1600. For example, the cloud 1610 can provide services for one or more computers (e.g., server computers) without displays.

Services can be provided by the cloud 1610 through service providers 1620, or through other providers of online services (not depicted). For example, cloud services can be customized to the screen size, display capability, and/or touchscreen capability of a particular connected device (e.g., connected devices 1630, 1640, 1650).

In example environment 1600, the cloud 1610 provides the technologies and solutions described herein to the various connected devices 1630, 1640, 1650 using, at least in part, the service providers 1620. For example, the service providers 1620 can provide a centralized solution for various cloud-based services. The service providers 1620 can manage service subscriptions for users and/or devices (e.g., for the connected devices 1630, 1640, 1650 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computer device (i.e., any available computer device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 14, computer-readable storage media include memory 1420 and 1425, and storage 1440. By way of example and with reference to FIG. 14, computer-readable storage media include memory and storage 1420, 1422, and 1424. The term computer-readable storage media does not include signals and carrier waves. In addition, the term computer-readable storage media does not include communication connections, such as 1470, 1460, 1462, and 1464.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computer device configured to facilitate user engagement with content on the computer device, the computer device comprising:
   a processing unit; and
   a memory configured to store computer-executable instructions;
   the processing unit configured, via the computer-executable instructions stored on the memory, to perform operations for creating a first interaction representation for a set comprising at least a second interaction representation, the operations comprising:
      receiving a first request to create the first interaction representation, the first request being associated with at least a first software application;
      sending a second request to the first software application for the second interaction representation;
      receiving the second interaction representation from the first software application, the second interaction representation comprising an identifier for the second interaction representation, an identifier for the first software application, and an identifier for content currently associated with the first software application, wherein the second interaction representation includes activation data for resuming interaction with the content using the first software application, the activation data including a plurality of application settings representing a prior state of the first software application;
      analyzing the first interaction representation and the second interaction representation using a machine learning model trained to analyze first content associated with the first interaction representation and second content associated with the second interaction representation and to output a determination whether the first interaction representation and the second interaction representation are associated with a common task, wherein the common task serves as a navigational mnemonic for other tasks of a user, and the navigational mnemonic aids the user in determining whether the other tasks and the first and second interaction representations are related to information the user is seeking; and
   responsive to the machine learning model determining that the first interaction representation and the second interaction representation are associated with the common task, storing the identifier for the second interaction representation in the first interaction representation.

2. The computer device of claim 1, wherein the processing unit is further configured to perform operations of:
   serializing the first interaction representation to provide a serialized interaction representation.

3. The computer device of claim 1, wherein the processing unit is further configured to perform operations of:
   receiving a request to update data of the second interaction representation; and
   updating the data of the second interaction representation.

4. The computer device of claim 3, wherein the request to update data comprises a request to modify a user access position associated with content referenced by the second interaction representation.

5. The computer device of claim 3, wherein the request to update data comprises a request to modify metadata describing content referenced by the second interaction representation.

6. The computer device of claim 3, wherein the request to update data comprises a request to modify a visualization associated with content referenced by the second interaction representation.

7. The computer device of claim 1, wherein the processing unit is further configured to perform operations of:
receiving a request to add a reference to a third interaction representation to the first interaction representation;
determining a type associated with the first interaction representation;
determining that the request complies with a rule associated with the type; and
storing the reference to the third interaction representation in the first interaction representation.

8. The computer device of claim 7, wherein determining that the request complies with a rule comprises determining that content referenced by the third interaction representation is not the same as content referenced by the second interaction representation.

9. The computer device of claim 7, wherein determining that the request complies with a rule comprises determining that the type permits additional interaction representations to be added to the first interaction representation.

10. The computer device of claim 7, wherein determining that the request complies with a rule comprises determining that the type maintains display positions of interaction representations referenced by the first interaction representation; wherein the processing unit is further configured to perform operations of:
associating a display position with the third interaction representation; and
storing the display position.

11. The computer device of claim 1, wherein the processing unit is further configured to perform operations of:
analyzing user interaction with the first content;
determining that the first content may be associated with the first interaction representation;
generating a third interaction representation referencing the first content; and
adding a reference to the third interaction representation to the first interaction representation.

12. The computer device of claim 1, wherein the processing unit is further configured to perform operations of:
analyzing user interaction with the first content;
determining that the first content may be associated with the first interaction representation;
generating a third interaction representation referencing the first content;
receiving user input to add a reference to the third interaction representation to the first interaction representation; and
adding a reference to the third interaction representation to the first interaction representation.

13. The computer device of claim 12, wherein the processing unit is further configured to perform operations of:
analyzing the interaction of a plurality of users with a plurality of content items;
determining a content addition rule based on the analyzing;
analyzing the first content with the rule to determine whether the first content may be associable with the first interaction representation;
generating a third interaction representation referencing the first content; and
adding a reference to the third interaction representation to the first interaction representation.

14. A computer-readable storage device storing computer-executable instructions for execution on a computer device to perform operations for creating a set of user-content interactions, the operations comprising:
receiving a request to create a first interaction representation representing a set comprising a second interaction representation;
determining a first type associated with the first interaction representation by analyzing the first interaction representation using a machine learning model configured to receive a respective interaction representation as an input and to output a respective type associated with the interaction representation based on a collection of activities associated with the respective first or second interaction representation, the first type being associated with one or more rules determining which types of interaction representations may be added to the set based upon the first type, the one or more rules determining, at least in part, whether a third interaction representation can be added to the set, wherein the first interaction representation or the second interaction representation are associated with a common task which serves as a navigational mnemonic for other tasks, and the navigational mnemonic aids a user in determining whether the other tasks and the first and second interaction representations are related to information the user is seeking; and
creating the first interaction representation with an indicator of the first type;
wherein the one or more rules include selecting activities with which the user has more prominently engaged within a particular timeframe.

15. The computer-readable storage device of claim 14, wherein the first type is a user-curated set and the third interaction representation can always be added to the set.

16. The computer-readable storage device of claim 14, wherein the first type is a non-user curated set and the third interaction representation can be added to the set if content referenced by the third interaction representation does not duplicate content referenced by another interaction representation of the set.

17. The computer-readable storage device of claim 14, wherein the first type is a query set and the third interaction representation cannot be added to the set.

18. The computer-readable storage device of claim 14, wherein the operations further comprise:
receiving a request to convert the first type to a second type; and
changing the indicator of the first type associated with the first interaction representation from the indicator of the first type to an indicator of the second type.

19. The computer device of claim 1, wherein the second interaction representation includes information identifying at least one second software application suitable for accessing content associated with the second interaction representation when the first software application is unavailable, wherein the information identifying the at least one second software application includes at least one Universal Resource Indicator (URI) for downloading a copy of the at least one second software application.

20. The computer device of claim 1, wherein the plurality of application settings representing the prior state of the first software application include a plurality of key-value pairs, wherein a key represents a respective application setting of the plurality of application settings, and the value represents a value for the respective application setting for the prior state of the first software application.

21. The computer device of claim 1, wherein the machine learning model is trained using data that indicates kinds of activities likely to occur together as part of the common task.

\* \* \* \* \*